(12) United States Patent
Tanaka et al.

(10) Patent No.: US 8,223,634 B2
(45) Date of Patent: Jul. 17, 2012

(54) MECHANISM FOR IMPLEMENTING LOAD BALANCING IN A NETWORK

(75) Inventors: Bert H. Tanaka, Saratoga, CA (US); Daniel J. Maltbie, Menlo Park, CA (US); Joseph R. Mihelich, Folsom, CA (US)

(73) Assignee: Fortinet, Inc., Sunnyvale, CA (US)

( * ) Notice: Subject to any disclaimer, the term of this patent is extended or adjusted under 35 U.S.C. 154(b) by 299 days.

(21) Appl. No.: 11/732,601

(22) Filed: Apr. 3, 2007

(65) Prior Publication Data

US 2009/0303882 A1 Dec. 10, 2009

Related U.S. Application Data

(63) Continuation-in-part of application No. 11/336,713, filed on Jan. 20, 2006, which is a continuation-in-part of application No. 11/056,436, filed on Feb. 10, 2005, now Pat. No. 7,463,588.

(60) Provisional application No. 60/545,788, filed on Feb. 18, 2004.

(51) Int. Cl.
*G01R 31/08* (2006.01)

(52) U.S. Cl. .................................. 370/229; 370/230

(58) Field of Classification Search .................. None
See application file for complete search history.

(56) References Cited

U.S. PATENT DOCUMENTS

| | | | |
|---|---|---|---|
| 4,736,363 A | 4/1988 | Aubin et al. | |
| 5,590,122 A | 12/1996 | Sandorfi et al. | |
| 5,592,610 A | 1/1997 | Chittor | |
| 5,805,705 A | 9/1998 | Gray et al. | |
| 6,052,805 A | 4/2000 | Chen et al. | |
| 6,122,674 A * | 9/2000 | Olnowich | 709/250 |
| 6,188,694 B1 * | 2/2001 | Fine et al. | 370/402 |
| 6,256,295 B1 | 7/2001 | Callon | |
| 6,389,017 B1 * | 5/2002 | Patel et al. | 370/389 |

(Continued)

FOREIGN PATENT DOCUMENTS

EP   1109376 A2   6/2001

(Continued)

OTHER PUBLICATIONS

Gusat, M. et al., "Extended Ethernet Congestion Management (E2CM): Per Path ECM—A Hybrid Proposal", IBM Research GmbH, Zurich, Mar. 14, 2007, 43 pages.

(Continued)

*Primary Examiner* — John Blanton
(74) *Attorney, Agent, or Firm* — Hamilton, DeSanctis & Cha LLP

(57) ABSTRACT

A mechanism is disclosed for enabling load balancing to be achieved in a network. In one implementation, load balancing is implemented on a "per flow" basis. At the time that a new flow starts, a path is selected. Packets associated with the flow are thereafter sent along that particular path. As the packets associated with the flow are forwarded along the particular path, a congestion metric is determined for the particular path as well as for a set of one or more other paths. Based at least partially upon the congestion metrics, a determination is made as to whether the flow should be moved. If so, then the flow is moved to an alternate path. By determining the congestion metrics for the multiple paths, and by moving the flow in response, it is possible to adapt to changing traffic conditions to keep the loads on the paths relatively balanced.

198 Claims, 12 Drawing Sheets

U.S. PATENT DOCUMENTS

| | | | |
|---|---|---|---|
| 6,438,603 B1 * | 8/2002 | Ogus | 709/233 |
| 6,470,031 B1 | 10/2002 | Loy et al. | |
| 6,535,482 B1 * | 3/2003 | Salim et al. | 370/229 |
| 6,563,818 B1 | 5/2003 | Sang et al. | |
| 6,580,715 B1 * | 6/2003 | Bare | 370/396 |
| 6,590,861 B1 * | 7/2003 | Vepa et al. | 370/216 |
| 6,614,787 B1 | 9/2003 | Jain et al. | |
| 6,738,352 B1 | 5/2004 | Yamada et al. | |
| 6,781,989 B1 | 8/2004 | Acharya | |
| 6,804,201 B1 | 10/2004 | Gelenbe | |
| 8,130,644 B2 | 3/2012 | Tanaka | |
| 2003/0039212 A1 * | 2/2003 | Lloyd et al. | 370/235 |
| 2003/0048750 A1 | 3/2003 | Kobayashi | |
| 2003/0123448 A1 | 7/2003 | Chang | |
| 2004/0010618 A1 | 1/2004 | Thomas | |
| 2004/0151180 A1 | 8/2004 | Hu et al. | |
| 2005/0122983 A1 * | 6/2005 | Gilmartin et al. | 370/395.53 |
| 2009/0316584 A1 | 12/2009 | Tanaka | |
| 2010/0290343 A1 | 11/2010 | Tanaka | |
| 2010/0296392 A1 | 11/2010 | Tanaka | |
| 2010/0309811 A1 | 12/2010 | Tanaka | |

FOREIGN PATENT DOCUMENTS

| | | |
|---|---|---|
| WO | WO 00/13376 A1 | 3/2000 |

OTHER PUBLICATIONS

Minkenburg, Cyriel et al., "Source-based E@CM Validation of the Orlando Proposal", IBM Research GmbH, Zurich, Mar. 22, 2007, 10 pages.

Becker, Donald, "Beowulf Ethernet Channel Bonding", retrieved from web at -http://beowulf.es.embret.org/software/bonding.html —, printed on Jul. 19, 2005, 1 page.

Brigljevic, V. et al., "The CMS Event Builder", Computing in High Energy and Nuclear Physics, Mar. 24, 2003, 12 pages.

Antchev, G . et al., "The CMS event builder demonstrator and results with Ethernet and Myrinet switch technologies", CERN, Real Time Conference, 1999, retrieved from Internet—http://www.ihep.ac.cn/~chep01/paper/a-029.pdf—4 pages.

Moon, Sue B., Measurement and Analysis of End-To-End Delay and Loss in the Internet, submitted to the Graduate School of the University of Massachusetts Amherst, Feb. 2000, 134 pages.

Paxson, Vern, "Measurements and Analysis of End-To-End Internet Dynamics", Ph. D. Thesis, Computer Science Division, University of California, Berkeley, Apr. 1997, 417 pages.

Liu, Jiuxing et al., "Building Multirail InfiniBand Clusters: MPI-Level Design and Performance Evaluation", Technical Report, Computer Science and Engineering, The Ohio State University, 2004, 13 pages.

McAlpine, Gary, "Congestion Control for Switched Ethernet", Intel Corporation, Jul. 2005, 8 pages.

Tomohiro Kudoh, "Subject: Re: Your VLAN-based multi-path L2 Ethernet network", Email Printout, Email sent Feb. 10, 2004, 5 pages.

Coll, Salvador et al., "Using Multirail Networks in High Performance Clusters", CCS-3 Modeling, Algorithms, & Informatics Group, Computer & Computational Sciences Division, Los Alamos National Laboratory, 2001, 27 pages.

Meijers, Frans, "The CMS Event Builder and results with Ethernet and Myrinet switch technologies", Presentation, CHEP 2001, Beijing, China, Sep. 2001, 35 pages.

IEEE, "IEEE Standards for Local and metropolitan area networks, Virtual Bridged Local Area Networks", 802.1Q 2003 Edition, IEEE Computer Society, May 7, 2003, 141 pages.

Mellanox Technologies, "InfiniBand Clustering—Delivering Better Price/Performance than Ethernet", Mellanox Technologies Inc., Document No. 2271G1, White Paper, printed Dec. 2007, 8 pages.

Myricom, "Myricom Unites High-Performance Computing and 10-Gigabit Ethernet", Myricom, retrieved from internet at : http://www.mellanox.com/pdf/whitepapers/IB_vs_Ethernet_Clustering_WP_100.pdf, Printed on Jun. 22, 2005, 3 pages.

SGI, "SGI Network Load Balancing Software", SGI, Copyright Silicon Graphics Inc, 2000, 2 pages.

Sharma, Srikant et al., "Viking: A Multi-Spanning-Tree Ethernet Architecture for Metropolitan Area and Cluster Networks", Proceedings of IEEE INFOCOM, 2004, 12 pages.

Otsuka, Tomohiro et al., "VLAN-based Minimal Paths in PC Cluster with Ethernet on Mesh and Torus", Department of Information and Computer Science, Keio University, Japan, ICPP, Jun. 2005, 10 pages.

Kudoh, Tomohiro et al., "VLAN-based Routing: Multi-path L2 Ethernet Network for HPC Clusters", Cluster 2004 Poster Abstracts, 2004, 1 page.

Non-Final Office Action for U.S. Appl. No. 12/490,938 mailed Jul. 13, 2011.

Notice of Allowance for U.S. Appl. No. 11/056,436 mailed Oct. 1, 2008.

Non-Final Rejection for U.S. Appl. No. 11/056,436 mailed Mar. 10, 2008.

Notice of Allowance for U.S. Appl. No. 11/732,599 mailed Jun. 18, 2010.

Passmore, D. et al., The Virtual LAN Technology Report. 22 Pages. May 1996.

White Paper. Virtual Networks. SysKonnect. 20 pages.

Understanding Multiple Spanning Tree Protocol (802.1S). Document ID: 24248. Apr. 17, 2007, 13 pages.

User Guide for Campus Manager 4.0. CiscoWorks. 10-68. 102 Pages, Dec. 2005.

Notice of Allowance for U.S. Appl. No. 12/490,938 mailed Jan. 9, 2012.

* cited by examiner

MECHANISM FOR IMPLEMENTING LOAD BALANCING IN A NETWORK

PRIORITY INFORMATION

This application is a continuation-in-part of U.S. application Ser. No. 11/336,713, entitled MECHANISM FOR ENABLING LOAD BALANCING TO BE ACHIEVED IN A LOOP-FREE SWITCHING PATH, REVERSE PATH LEARNING NETWORK, filed on Jan. 20, 2006, which is a continuation-in-part of U.S. application Ser. No. 11/056,436, entitled MECHANISM FOR ENABLING LOAD BALANCING TO BE ACHIEVED IN A LOOP-FREE SWITCHING PATH, REVERSE PATH LEARNING NETWORK, filed on Feb. 10, 2005 now U.S. Pat. No. 7,463,588, which claims the benefit of U.S. Provisional Application Ser. No. 60/545,788, entitled A MECHANISM FOR LOAD BALANCING TRAFFIC IN A LOOP-FREE SWITCHING PATH, REVERSE PATH LEARNING NETWORK, filed on Feb. 18, 2004. The contents of these applications are incorporated herein in their entirety by this reference.

BACKGROUND

Over the past several years, the computing and storage server industries have been migrating towards a network-based computing and storage model to take advantage of lower cost, high-performance commodity processors and lower cost, high-density storage media. This server industry trend has created a need for a highly scalable interconnect technology to enable the various computing and storage resources to be efficiently and effectively coupled. One type of interconnect that has been considered for this purpose is an Ethernet network.

An Ethernet network is a loop-free switching path, reverse path learning network. By "loop-free", it is meant that there is only one path between any pair of nodes in the network. Because of this loop-free property, it is possible for the switches in an Ethernet network to forward packets by broadcast flooding, and to populate their forwarding tables through reverse path learning.

Specifically, when an Ethernet switch encounters a packet with a destination node address that it does not have in its forwarding tables, the switch broadcasts that packet on all outgoing links, except for the link on which the packet was received. All subsequent switches that receive the packet that do not have the destination node address in their forwarding tables do the same thing. Eventually, the packet will be delivered to the destination node. Because there is only one path to the destination node, it is assured that broadcasting the packet in this way will not create an infinite loop of broadcasts.

In addition to broadcasting the packet, a switch also determines, from the packet, the address of the source node that sent the packet. It also notes the link on which the packet was received. This address and link association is stored in the forwarding tables of the switch. In the future, if the switch receives any packet destined for the source node, it will know, based upon the address and link association in the forwarding tables, which link to switch the packet to. It will not need to broadcast the packet. In this way, an Ethernet switch learns the reverse path of a packet. Because of this reverse path learning capability, it is not necessary to pre-configure the forwarding tables of Ethernet switches. The switches can build these forwarding tables on the fly. This self learning capability of Ethernet switches is a key "plug and play" attribute of an Ethernet network, and is one of the reasons why Ethernet is so widely deployed.

While the loop-free aspect of an Ethernet network gives rise to certain advantages, it also is the root of several significant drawbacks. First, because there is only one path between each pair of nodes, the network does not recover from failure as quickly as would be desired. When a link in a path is disabled, another path has to be determined and deployed. This takes a relatively long time, and during that time, nodes coupled via that link cannot communicate. Another drawback is that the single path between each pair of nodes limits the cross section bandwidth of the network; thus, the switching capacity of the network is underutilized. Furthermore, because there is only one path between each pair of nodes, it is not possible to spread and balance the traffic across a plurality of paths. For these and other reasons, Ethernet, as it has been implemented, has not been an effective interconnect for coupling computing and storage resources in a network-based, high-performance system.

SUMMARY

In accordance with one embodiment of the present invention, there is provided a mechanism for implementing load balancing in a network. This load balancing mechanism may be implemented in any network in which there are multiple paths between components pairs. In one embodiment, the load balancing mechanism is implemented in a loop free switching path, reverse path learning network, such as an Ethernet network, that provides multiple paths between component pairs.

As noted previously, in a typical Ethernet network, there is only one path between any pair of components. Because there is only one path, it is not possible to balance the traffic load between a pair of components across a plurality of paths. To enable load balancing, multiple paths need to be provided. In one embodiment, multiple paths are provided by way of virtual networks. More specifically, the network is divided into a plurality of virtual networks, and each virtual network provides a different path through the network from one component to another. The virtual networks are implemented in such a way that the switches in the network may still broadcast packets without causing infinite broadcast loops, and may still perform reverse path learning. Thus, despite the fact that there are multiple possible paths between components, the overall network is still a loop-free switching path, reverse path learning network. Because it remains this type of network, it retains all of the associated advantages, including the "plug and play" capability mentioned above. In such a network, at the time a first component sends a packet to a second component, the first component selects a virtual network to use. By selecting the virtual network, the first component is in effect selecting the path through the network that is to be used to transport the packet from the first component to the second component.

Given the presence of multiple paths between component pairs, load balancing can be performed. In one embodiment, load balancing is carried out to spread traffic across the multiple paths and to minimize the congestion on the multiple paths.

In one embodiment, load balancing is implemented on a "per flow" basis. That is, packets are grouped into flows, and are sent onto paths as flows. For example, the packets associated with a first flow may be sent along a first path, while the packets associated with a second flow may be sent along a second path. For purposes of the present invention, packets may be associated with a flow based upon any desired criteria. So long as a set of packets has some commonality, they can be grouped together and be associated with a flow. A flow may be a long-lived flow having a large number of packets, or it may be a short-lived flow having a relatively small number of packets.

At the time that a new flow starts, a path is selected for that flow. Packets associated with the flow are thereafter sent along that selected path. In some instances, it may be desirable to move the flow from the selected path onto another path. That is, it may be desirable to move the flow from one path to another in "mid-flow" (as used herein, "mid-flow" means that the flow has not yet terminated and that the packets associated with the flow are still being received and forwarded from one component to another). In one embodiment of the present invention, it is possible to move a flow from one path to another in mid-flow. With this capability, it is possible to balance the traffic load across multiple paths in a very dynamic manner. As traffic conditions on the different paths change, flows can be moved from path to path to dynamically adapt to the changes in traffic conditions. By moving flows in this manner, congestion on the multiple paths can be kept relatively balanced and minimized.

In accordance with one embodiment of the present invention, load balancing may be carried out by a forwarding component as follows. When a first component wishes to forward packets associated with a flow to a second component, it may do so by forwarding one or more initial packets associated with the flow to the second component via a particular path. This particular path may be the path that is initially selected for the flow when the flow starts.

As the packets associated with the flow are forwarded to the second component along the particular path, the first component determines a congestion metric for the particular path. This congestion metric provides an indication of how congested the particular path currently is. In one embodiment, the congestion metric comprises one or more latency values and one or more latency variation values. The first component also determines a congestion metric for at least a set of one or more other paths that can be used to transport information from the first component to the second component. Basically, the first component is determining how congested the paths currently are.

Based at least partially upon the congestion metrics, the first component determines whether to move the flow. In one embodiment, the first component may make this determination by comparing the congestion metric for the particular path with the congestion metric for the set of one or more other paths to derive an imbalance metric. The first component may further determine whether the imbalance metric exceeds a threshold so that it would be worthwhile to move the flow. If the first component determines that the flow should be moved, then it moves the flow onto an alternate path so that at least some future packets associated with the flow are forwarded to the second component via the alternate path instead of the particular path. The alternate path is one of the paths in the set of one or more other paths. In one embodiment, the first component moves the flow in such a manner that it is ensured that the packets associated with the flow will not arrive out of order at the second component. By determining the congestion metrics for the multiple paths, and by moving the flow in the above manner, the first component is able to adapt to changing traffic conditions. This in turn enables the first component to keep the load on the multiple paths relatively balanced, thereby preventing any one path from being overly congested.

In one embodiment, the first component determines the congestion metrics for the multiple paths by determining the latencies on those paths. These latencies may include one-way latencies (indicating how much time is needed to transfer a set of information from the first component to the second component) and/or roundtrip latencies (indicating how much time is needed to transfer a set of information from the first component to the second component and back to the first component). Determining the congestion metrics may also involve determining latency variations for the multiple paths.

In one embodiment, the first component determines the latencies for the paths by exchanging latency packets with the second component. For example, to determine the latencies for the particular path, the first component may send a latency request packet to the second component via the particular path. This latency request packet may comprise an initial timestamp provided by a first clock of the first component. When the second component receives this latency request packet, it sends a latency response packet back to the first component. This latency response packet may comprise one or more timestamps provided by a second clock of the second component. When the first component receives this latency response packet, it may obtain a received timestamp from the first clock. Based upon the various timestamps, the first component determines a one-way latency for the particular path and/or a roundtrip latency. In one embodiment, the first component repeats this process to obtain a plurality of latency values for the particular path. With these latency values, it is possible to derive one or more latency variation values. Based on the latency values and the latency variation value(s), it is possible to determine how congested the particular path currently is.

A similar process may be used to determine the congestion metric for the set of one or more other paths. Based upon the congestion metrics, the first component can determine how congested the paths currently are. Given this information, the first component can determine whether to move the flow to balance the traffic on the multiple paths.

In most implementations, the first clock of the first component and the second clock of the second component are not synchronized; thus, the timestamp values that they provide at any particular time will not be the same. To account for this discrepancy, one embodiment of the present invention determines a clock offset value for the two clocks, which represents the difference in time values provided by the two clocks. This clock offset value is used in determining the latencies on the multiple paths. By taking the clock offset value into account, the first component is able to compute more accurate absolute latency values for the multiple paths.

DETAILED DESCRIPTION OF EMBODIMENT(S)

One embodiment of the present invention is implemented in a loop-free switching path, reverse path learning network, such as an Ethernet network. Before describing this embodiment in detail, some additional information on Ethernet networks will be provided to facilitate a complete understanding of the invention.

Ethernet Networks

Figure 1:
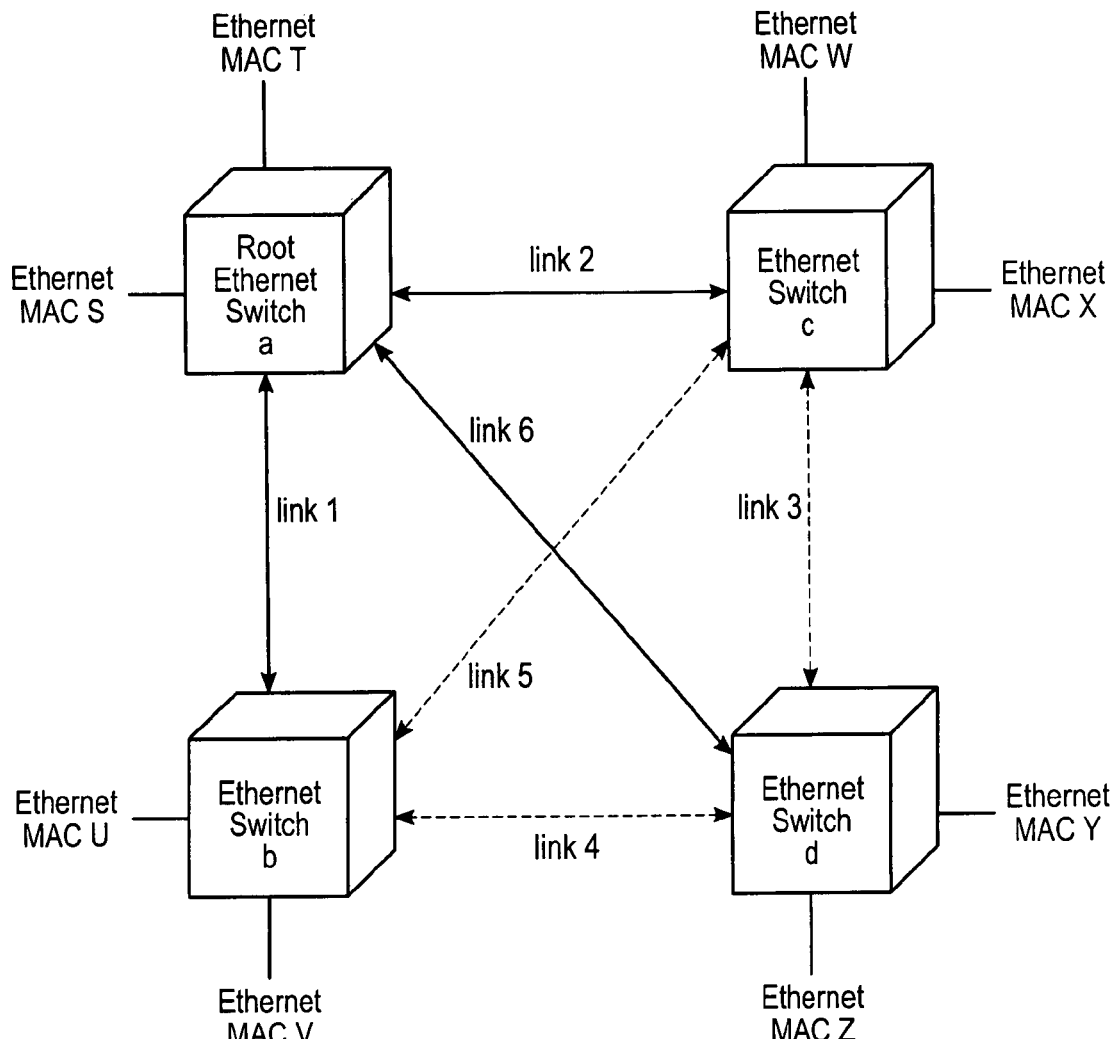
FIG. 1 shows a sample Ethernet network.

FIG. 1 shows a sample Ethernet network. As shown, the network 100 comprises four Ethernet switches a, b, c, and d. The switches are connected to each other by links 1 through 6. Coupled to each switch are two end nodes, identified by their Ethernet MAC (media access control) addresses. Specifically, switch a is coupled to the nodes with MAC addresses S and T. Switch b is coupled to the nodes with MAC addresses U and V. Switch c is coupled to the nodes with MAC addresses W and X, and switch d is coupled to the nodes with MAC addresses Y and Z.

In an Ethernet network, the path between each pair of nodes is determined using a spanning tree protocol (STP). The STP ensures that there is no more than one path between each pair of nodes so that the network 100 is "loop-free". If an STP is applied to the network 100 of FIG. 1 with switch a being designated as the root switch, then the link configuration shown in FIG. 1 may result, where links 1, 2, and 6 (shown in solid lines) are put into a forwarding state, and links 3, 4, and 5 (shown in dashed lines) are blocked. Because links 3, 4, and 5 are blocked, they cannot be used to carry traffic; thus, for example, switch c cannot send any information to switch d using link 3. Blocking some of the links in this manner enforces the requirement that there be one and only one path between each pair of nodes. The resulting tree structure composed of links 1, 2, and 6 allows all switches to forward packets to each other without encountering a forwarding loop.

Suppose now that one of the nodes (say the one with MAC address Z) wants to send an Ethernet packet to the node with MAC address U. To do so, it first sends the packet to switch d. Switch d looks into its forwarding table, and if it does not find MAC address U, it broadcasts the packet to its outgoing ports, in this case the port to link 6 and the port connected to the node with MAC address Y. Ethernet packets that arrive at nodes for which the MAC address does not match will be dropped; thus, the node with MAC address Y will drop the packet. Switch a then receives the packet and looks into its forwarding table for MAC address U. If it does not find MAC address U, it broadcasts the packet to its outgoing links, in this case links 1 and 2, and to both of its connected nodes. When the packet arrives at switch b, switch b looks into its forwarding table, and if it does not find MAC address U in the forwarding table, it broadcasts the packet to its outgoing links, in this case to the nodes with MAC address U and MAC address V. The node with MAC address U thus receives the packet. In this way, the node with MAC address Z is able to send an Ethernet packet to the node with MAC address U without the nodes or the intermediate switches knowing the forwarding path beforehand.

This broadcast or flooding mechanism, while effective, can cause unnecessary traffic over the switching links. Ethernet solves this problem by using reverse path learning to create a forwarding table association between MAC addresses and ports. In reverse path learning, the switches look at the source MAC address of the Ethernet packets that they receive, and populate their forwarding tables with the MAC address/received port associations. In the above example, when the node with MAC address U later sends a packet to the node with MAC address Z, all of the switches in the path (switch b, switch a and switch d) will have "learned" the association of the MAC address Z with the respective received port from the previous received Ethernet packet. Therefore, switch b will know to forward Ethernet packets with MAC address Z as the destination address on link 1 since that was the link on which it received Ethernet packets with MAC address Z as the source MAC address. Likewise, switch a will know to switch such packets to link 6. Similarly, switch d will know to forward such packets to the port connected to the node with MAC address Z. In this way, the network self-learns the reverse paths so that broadcast and flooding is performed in very few instances. The key ingredient to making reverse path learning possible is the fact that there is only one path between each pair of nodes.

Virtual Networks within Ethernet Networks

In an Ethernet network, it is possible to divide the network into one or more virtual networks (also referred to herein as virtual local area networks, or VLAN's). Doing so allows the network to be divided into multiple switching domains to limit the links on which packet broadcasts are performed. Virtual networks also allow nodes to be segregated so that only certain nodes are allowed to communicate with each other.

Figure 2:
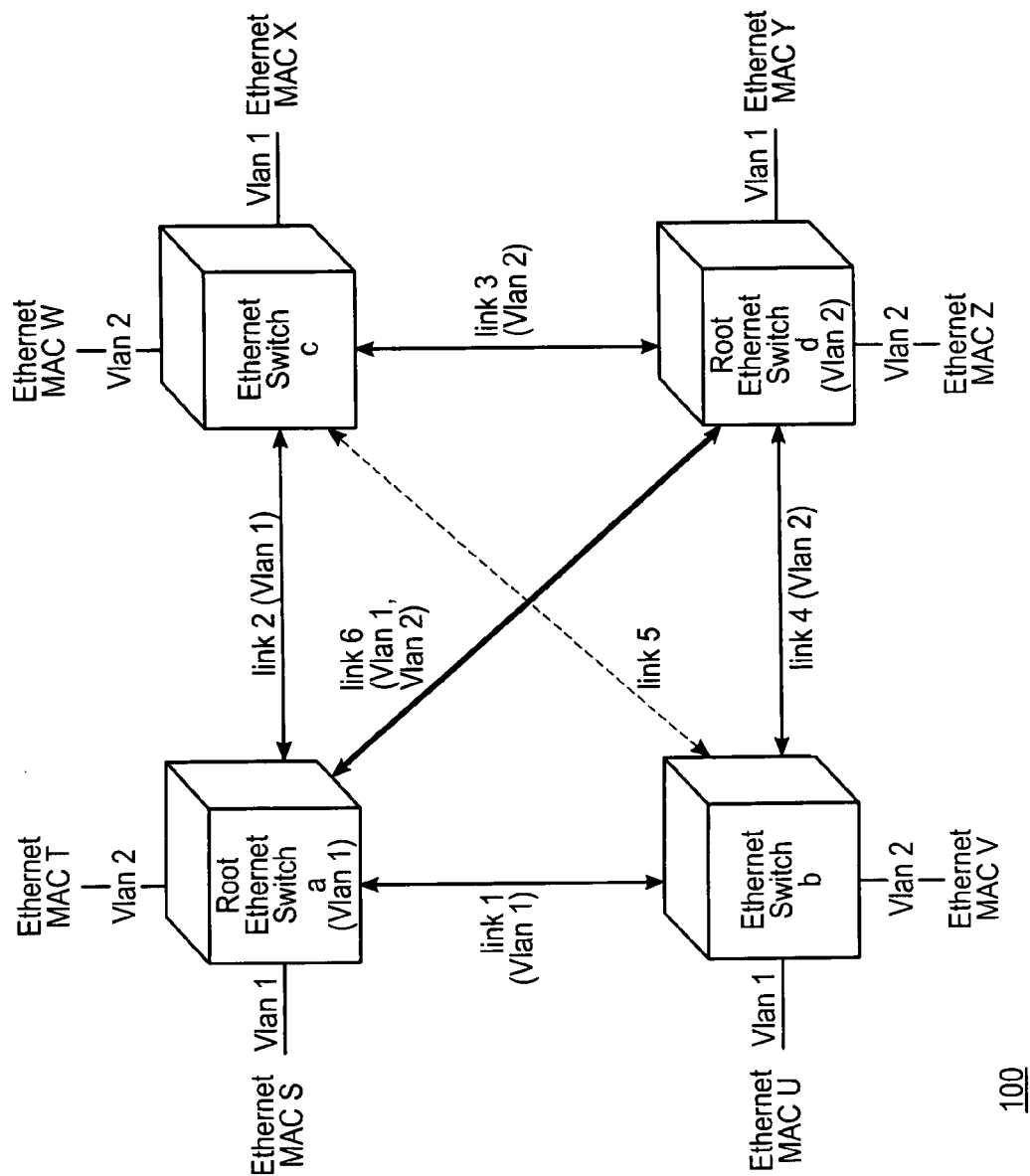
FIG. 2 shows the sample Ethernet network of FIG. 1 after it has been divided into two virtual networks.

FIG. 2 shows an example of the network 100 of FIG. 1 after it has been divided into two VLANs, VLAN 1 and VLAN 2. In this example, switch a is the STP root for VLAN 1 and switch d is the STP for VLAN 2. In this example, VLAN 1 is configured in the same way as that described previously for FIG. 1, namely, links 1, 2 and 6 are placed in a forwarding state and links 3, 4 and 5 are blocked. For VLAN 2, links 3, 4, and 6 are placed in a forwarding state and links 1, 2 and 5 are blocked. Thus, in this configuration link 5 is always blocked and link 6 carries traffic for both VLAN 1 and VLAN 2.

Each end node is associated with one of the VLAN's. Specifically, the nodes with MAC addresses S, U, X, and Y are on VLAN 1, and the nodes with MAC addresses T, V, W, and Z are on VLAN 2. Set up in this way, the nodes with MAC addresses S, U, X, and Y will be able to communicate with each other but not with the nodes with MAC addresses T, V, W, and Z. Similarly, the nodes with MAC addresses T, V, W, and Z will be able to communicate with each other but not with the nodes with MAC addresses S, U, X, and Y. In this way, the VLAN's separate the various nodes into different domains such that the nodes are treated as if they are in separate networks even though they are in the same physical network.

VLAN's also enable the broadcasting of packets to be limited to certain links. To illustrate this point, suppose that the node with MAC address W wishes to send an Ethernet packet on VLAN 2 to the node with MAC address V. To do so, it first sends the packet to switch c. Switch c looks into its forwarding table, and if it does not find MAC address V, it broadcasts the packet to its outgoing ports which support VLAN 2, in this case the port to link 3. It does not broadcast to link 2 or to the port coupled to the node with MAC address X since these ports support VLAN 1 only. Switch d then receives the packet and looks into its forwarding table for MAC address V. If it does not find MAC address V, it broadcasts the packet to its outgoing links that support VLAN 2, in this case links 4 and 6, and to the node with MAC address Z. When the packet arrives at switch b, switch b looks into its forwarding table, and if it does not find MAC address V in the forwarding table, it broadcasts the packet to its outgoing links that support VLAN 2, in this case to the node with MAC address V. In this way, the node with MAC address V receives the packet. With the use of a VLAN, the packet reaches the destination with broadcasts over a fewer number of links.

A point to note about VLAN's is that they in and of themselves are loop-free switching path, reverse path learning networks. Each VLAN provides one and only one path between each pair of nodes; thus, packet broadcast and reverse path learning can still be performed. Consequently, VLAN's implemented within an Ethernet network retain the advantages of Ethernet networks.

Multiple Switching Paths

VLAN's have primarily been used to segregate traffic within a network. It has been observed by Applicants, however, that VLAN's may also be used to provide multiple paths between node pairs. For example, if all of the nodes in FIG. 2 are associated with both VLAN 1 and VLAN 2, then various nodes would have two possible paths to various other nodes. For example, the node with MAC address Y would have two paths to the node with MAC address V. Using VLAN 1, the path would be from switch d to link 6 to switch a to link 1 to switch b. Using VLAN 2, the path would be from switch d to link 4 to switch b. Thus, by setting up multiple VLAN's, and by associating nodes with multiple VLAN's, it is possible to provide multiple paths between each pair of nodes. These multiple paths will enable load balancing to be performed, fault tolerance to be enhanced, and switching capacity to be more fully utilized. As an additional point, these benefits can be realized without losing the advantages of a loop-free switching path, reverse path learning network. As noted above, VLAN's do not violate any of the fundamentals of a loop-free switching path, reverse path learning network. Thus, by setting up multiple VLAN's, and by associating nodes with multiple VLAN's, it is possible to provide multiple paths between node pairs, even in a loop-free switching path, reverse path learning network, such as an Ethernet network.

Sample Multi-Path Network

Figure 3:
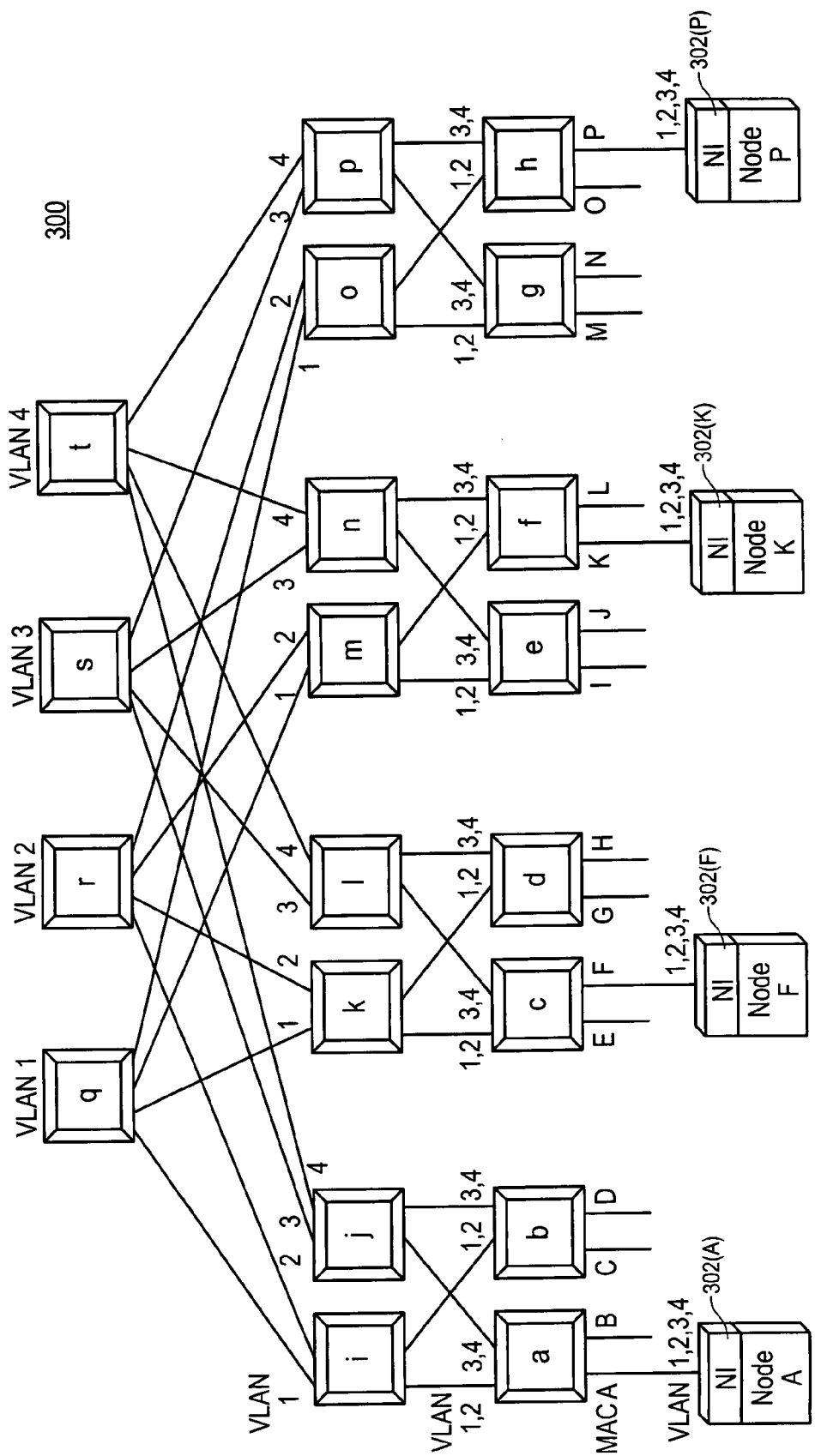
FIG. 3 shows a sample loop-free switching path, reverse path learning network in which multiple virtual networks have been established to provide multiple paths between each pair of nodes.

FIG. 3 shows an example of a loop-free switching path, reverse path learning network 300 in which multiple VLAN's have been established to provide multiple paths between each pair of nodes. Specifically, in network 300, there are four VLAN's (VLAN's 1 through 4); thus, there are four possible paths between each pair of nodes.

In FIG. 3, the components labeled with lower case letters are switches, and the components identified with capital letters are nodes. For the sake of convenience, the same capital letter is used to identify both a node and its MAC address. Thus, node A has MAC address A, node F has MAC address F, and so forth. For the sake of simplicity, only some of the nodes in the network 300 are shown. Each link has one or more numbers placed next to it. This number indicates the VLAN that is supported on that link. For example, the link between switch a and switch j has the label "3,4". This means that the link supports VLAN's 3 and 4. Given this labeling system, it can be seen that each of the links going to and from a node supports all four VLAN's. Thus, each node can use and can be reached via any of the four VLAN's.

In network 300, switch q is the root switch for VLAN 1, switch r is the root switch for VLAN 2, switch s is the root switch for VLAN 3, and switch t is the root switch for VLAN 4. Applying an STP to network 300 using each of the above switches as root switches will cause four spanning trees to be produced. Each spanning tree will represent one of the VLAN's, and each spanning tree will specify the loop-free paths between all of the nodes. The topology shown in FIG. 3 may be the result of this process. To enforce the spanning trees, the various switches may be configured, either manually or by an automated network manager (not shown), to associate each link with one or more VLAN's. For example, switches a and j may be configured to associate the link between them with VLAN's 3 and 4. By configuring the switches in this way, each switch will know which links can be used with which VLAN or VLAN's. In one embodiment, each spanning tree and hence, each VLAN, provides a different path from a source node to a destination node. For example, on VLAN 1, the path from node A to node K would be from switch a to switch i to switch q to switch m to switch f. On VLAN 4, the path from node A to node K would be from switch a to switch j to switch t to switch n to switch f. By choosing different VLAN's, packets can be sent from a source node to a destination node along different paths.

Figure 4A:
FIG. 4a shows a sample Ethernet packet before path-selection virtual network information is added.
Figure 4B:
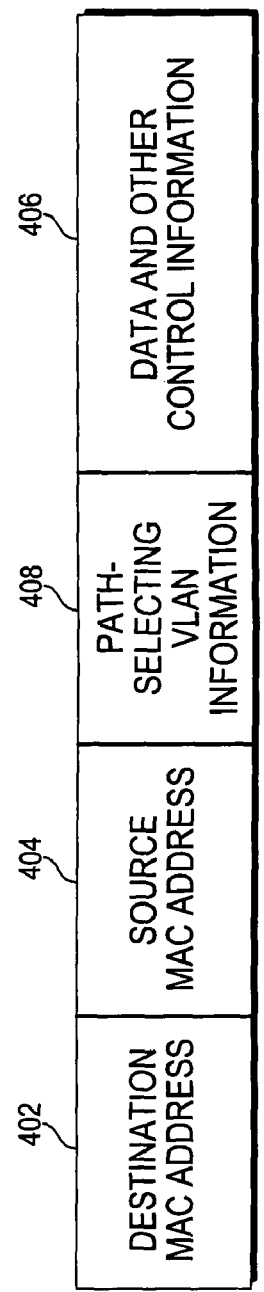
FIG. 4b shows the Ethernet packet of FIG. 4a after path-selection virtual network information has been added.

To enable an Ethernet packet to be properly switched according to VLAN's, some information is added to each packet. FIG. 4a shows a standard Ethernet packet comprising a destination MAC address 402, a source MAC address 404, and data and other control information 406. In one embodiment, to VLAN enable a packet, a set of path-selecting VLAN information 408 is inserted into the packet between the source MAC address 404 and the data and other control information 406, as shown in FIG. 4b. The VLAN information 408 may include information (e.g. a VLAN ID) indicating which VLAN is to be used to switch the packet, as well as any other information (e.g. control information) needed by the switches to switch the packet properly. The VLAN information 408 enables the switches to determine the correct VLAN, and hence, the correct path to take to switch the packet to the destination node. In one embodiment, the path-selecting VLAN information 408 is removed from the packet when the packet is received. Thus, by the time the destination node gets the packet, the VLAN information 408 will no longer be there. As a result, the destination node can remain unaware that the path-selecting VLAN information 408 was ever in the packet. This in turn enables the path-selection to be carried out without changing any networking protocols implemented by the source and destinations nodes.

Figure 4C:
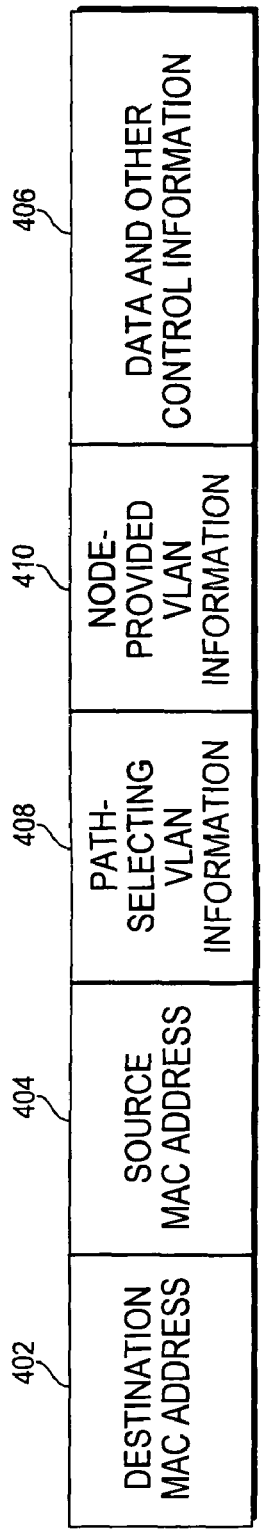
FIG. 4c shows a sample Ethernet packet that contains both path-selection virtual network information and node-provided virtual network information.

In some implementations, the source and destination nodes may already be implementing VLAN's (for example, for segregation purposes). Thus, an Ethernet packet may already contain a set of VLAN information. Even in such a case, a set of path-selecting VLAN information may still be added to the Ethernet packet. This is shown in FIG. 4c, where the path-selecting VLAN information 408 is inserted into the packet between the source MAC address 404 and the node-provided VLAN information 410. In this case, it will be the path-selecting VLAN information 408, not the node-provided VLAN information 410, that will be used by the switches to switch the packet through the network 300 to the destination node. As this example shows, path selection can be implemented even with packets that already contain node-provided VLAN information.

To show that the network 300 of FIG. 3 still behaves like a loop-free switching path, reverse path learning network, reference will now be made to an example. Suppose that node A wishes to send an Ethernet packet to Node P. Suppose further that VLAN 1 is to be used; thus, the packet is updated with information indicating VLAN 1 as the VLAN of choice. Suppose further that the switches in the path have not yet learned the MAC address/switch port association. In such a case, when the packet is sent to switch a, switch a will broadcast the packet to all of its outgoing ports on which VLAN 1 is enabled. These ports include the port attached to MAC address B and the port labeled VLAN 1,2. The port labeled 3,4 is not part of VLAN 1 and therefore would be blocked for the broadcast of this packet. The packet is sent to switch i, which in turn, broadcasts the packet onto those ports which are part of VLAN 1. In this case, these would be the link labeled 1,2 which connects switch i to switch b, and the link labeled VLAN 1, which connects switch i to switch q. Switch b broadcasts the packet to the ports attached to MAC addresses C and D but not to switch j. Switch q broadcasts the packet to switches k, m and o. Switch k broadcasts the packet to switches c and d but not to switch r since that link is only enabled for VLAN 2. Likewise, switch m broadcasts the packet to switches e and f and not to switch r, and switch o broadcasts the packet to switches g and k and not to switch r. Switch c forwards the packet to the ports connected to MAC addresses E and F, switch d forwards to ports connected to MAC addresses G and H, switch e forwards to ports connected to MAC addresses I and J, switch f forwards to ports connected to MAC addresses K and L, switch g forwards to ports connected to MAC addresses M and N, and switch h forwards to ports connected to MAC addresses O and P. Node P thus receives the packet. Note that because of the tree structure on which VLAN 1 is defined, there are no loops in the switching topology; hence, there is only one path between each pair of end nodes for which VLAN 1 is enabled. This example demonstrates how an Ethernet packet in network 300 can reach its destination without apriori knowledge of the switching path, and is consistent with how Ethernet typically performs flooding.

As each switch switches the packet, it is also carrying out reverse path learning. Thus, each switch (switches h, o, q, i, a) along the path populates its forwarding tables with an association between source MAC address A, VLAN 1, and the port on which the packet was received. That way, when node P sends an Ethernet packet destined for node A on VLAN 1, the switches will already know how to switch that packet. Namely, the packet will be forwarded from node P to switch h then to switch o over the link marked 1,2 to switch q over the link marked 1 to switch i over the link marked 1 to switch a over the link marked VLAN 1,2 to the port connected to MAC address A, which is Node A. No flooding or broadcasting is necessary. As illustrated by this example, the reverse path learning for a VLAN-based multi-path switching topology is just an extension (e.g. taking the VLAN into account) of the reverse path learning methodology carried out for non-VLAN based switching topology.

Continuing the example, assume that node P wants to send an Ethernet packet to node A, but this time over VLAN 4. Further assume that the switches have populated their forwarding tables via reverse path learning from a previous Ethernet packet sent from node A to node P over VLAN 4. The Ethernet packet with VLAN 4 and destination MAC address A will be forwarded from node P to switch h then to switch p over the link marked 3,4 to switch t over the link marked 4 to switch j over the link marked 4 to switch a over the link marked 3,4 to the port connected to node A.

With the multiple VLAN's defined between each pair of nodes, any node can send an Ethernet packet to another node using one of the four VLAN's, and hence, one of the four switching paths through the switching topology. The ability to use the four switching paths between each pair of nodes effectively increases the cross section switching capacity of the network. In the example above, there are four VLAN paths defined so there is an increase by a factor of four to the cross section switching capacity. The presence of the four switching paths also provides four paths across which traffic can be spread. As a result, load balancing can be performed. The manner in which load balancing can be carried out in accordance with one embodiment of the present invention will be elaborated upon in a later section.

Network Interface

As shown in FIG. 3, each node is coupled to the network 300 through a corresponding network interface 302. Basically, the network interface 302 interfaces the node with the network 300 to enable the node to send and receive sets of information (e.g. packets). In one embodiment, it is the network interface 302 that selects which VLAN to use to transport a set of information to a destination node. It is also the network interface that performs the load balancing function. These aspects will be discussed in greater detail in a later section.

For purposes of the present invention, a network interface 302 may take on any desired form and its functionality may be implemented in any desired manner. For example, a network interface 302 may be a physical interface (e.g. a network interface card) that is coupled to but is separate from the node. As an alternative, a network interface 302 may be a physical component that is part of the node (e.g. integrated into the node's motherboard, integrated into the node's processor or processors, etc.). As a further alternative, a network interface 302 may be a logical component (e.g. a computer program) that resides and runs on the node. These and other embodiments are within the scope of the present invention. In any embodiment, the functionality of the network interface 302 may be realized using hardware (e.g. hardware logic components, ASIC's, etc.), software (e.g. having one or more processors execute one or more sets of instructions), or a combination of both.

For purposes of the present invention, a node may be any component that communicates on the network. In one embodiment, a node comprises one or more processors, and executes an operating system and one or more applications. In such a node, the applications and operating system may perform some networking functions, such as preparing sets of information (e.g. packets) for sending into the network, implementing network protocols, determining destinations nodes, etc. However, in one embodiment, the operating system and the applications do not participate in the selection of the VLAN, and hence, the selection of the path to be taken to transport a set of information to a destination node. In fact, the operating system and applications do not even need to be aware of the multiple VLAN's. Rather, in one embodiment, selection of the VLAN to use in transporting a set of information is the responsibility of the network interface 302. By delegating this responsibility to the network interface 302, it is possible to shield the operating system and applications from the complexities of the network. As a result, it is possible to implement the methodology of the present invention without modifying any existing operating systems and applications.

Figure 5:
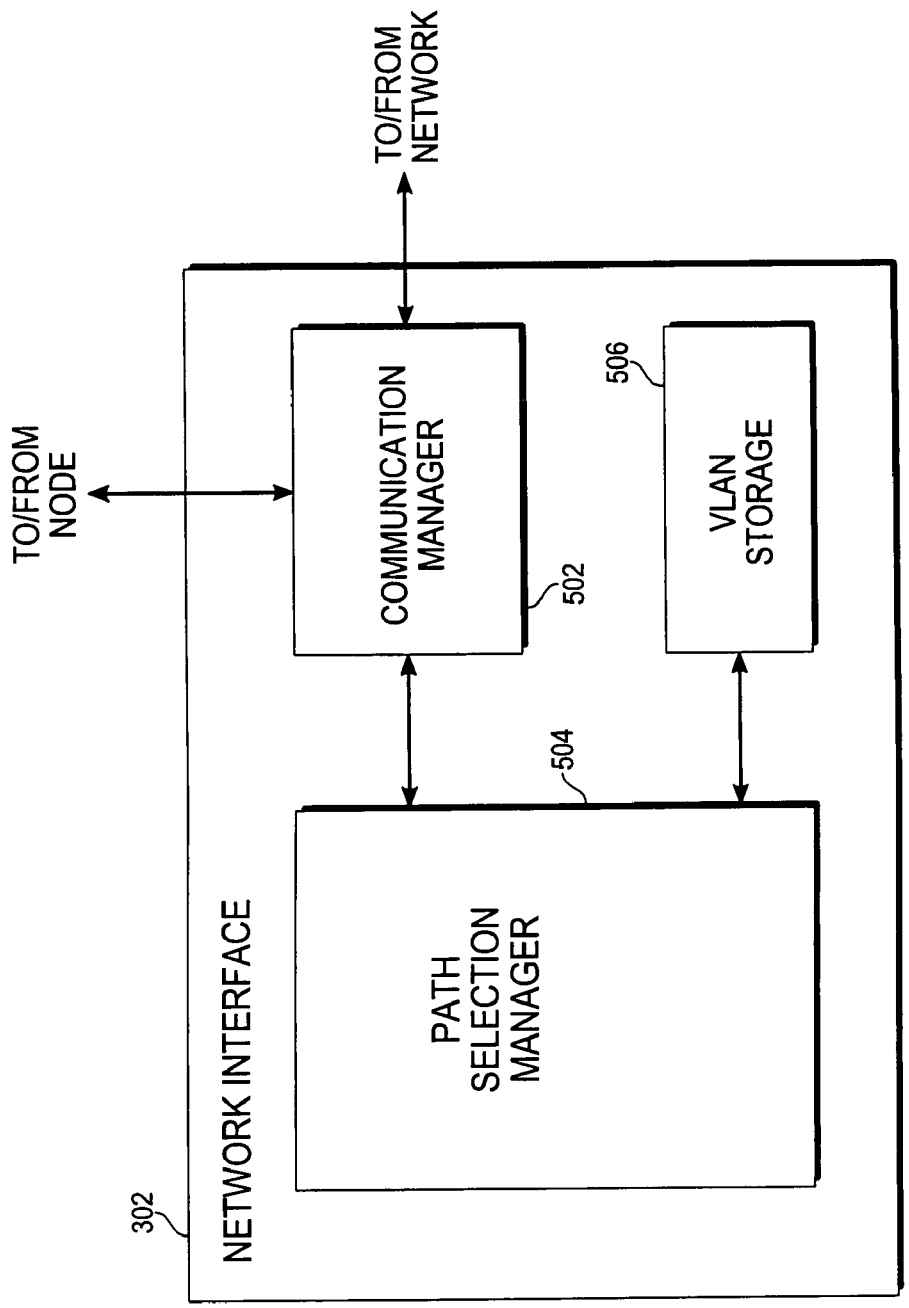
FIG. 5 is a functional block diagram of a network interface, in accordance with one embodiment of the present invention.

FIG. 5 shows a functional block diagram of a network interface 302 in accordance with one embodiment of the present invention. As shown, the network interface 302 comprises a communication manager 502, a path selection manager 504, and a VLAN storage 506. Generally, the communication manager 502 is responsible for sending and receiving communications to and from its corresponding node and the network. The path selection manager 504 is responsible for selecting a VLAN, and hence, a path for outgoing sets of information. The VLAN storage 506 is used to store information pertaining to the one or more VLAN's that can be used to transport a set of information from the corresponding node to a destination node. The functions performed by these components will be elaborated upon in the following discussion.

Sample Network Interface Operation

Figure 6:
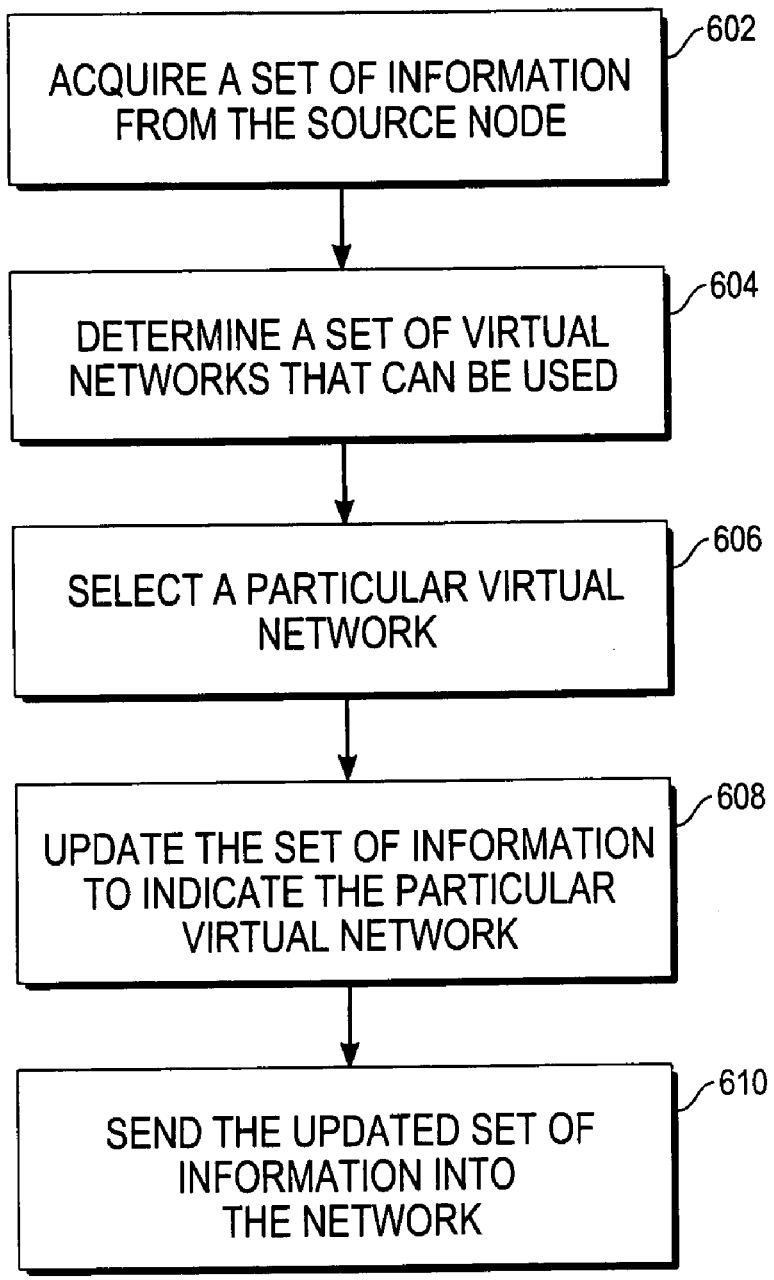
FIG. 6 is a flow diagram illustrating the operation of a network interface in accordance with one embodiment of the present invention.

FIG. 6 shows a flow diagram which illustrates the manner in which a network interface 302 operates in accordance with one embodiment of the present invention. Before the operations shown in FIG. 6 are performed, a network, such as network 300 in FIG. 3, is first configured. The network 300 may be configured by a network administrator by selecting the four switches q, r, s, and t as the root switches for their respective VLAN's, and then running an STP for each root switch. This will produce a spanning tree for each VLAN, which defines the paths between all of the node pairs in the VLAN. After the four spanning trees are derived, the switches are configured such that they recognize which links support which VLAN's, in accordance with the derived spanning trees. Once that is done, each of the network interfaces 302 is informed of the VLAN's that it can use to transport information from a source node to a destination node. In network 300, the usable VLAN's are VLAN's 1, 2, 3, and 4. This set of VLAN's is stored by each network interface 302 in its VLAN storage 506 (FIG. 5). With the network 300 thus configured, the network interfaces 302 are ready to facilitate communication by their respective nodes. In the following discussion, it will be assumed for the sake of example that node A is the source node, node P is the destination node, and network interface 302(A) is the interface whose operation is being described.

To send a set of information (e.g. an Ethernet packet) from node A to node P, network interface 302(A), and more specifically, the communication manager 502 on network interface 302(A), acquires (block 602 of FIG. 6) a set of information from node A. Network interface 302(A) may acquire this set of information in any number of ways. For example, node A may simply provide the set of information to network interface 302(A). Node A may also provide a reference or a pointer to the set of information, which the network interface 302(A) would use to access the set of information. Network interface 302(A) may also acquire the set of information in other ways.

In one embodiment, the set of information specifies an address for the destination node or comprises information from which the address of the destination node may be derived. For example, the set of information may actually include the address for node P. Alternatively, the set of information may include some other information (such as a memory location) from which the address for node P can be derived. In such a case, the communication manager 502 on network interface 302(A) derives the address for node P. As a further alternative, the set of information may comprise other information that can be used to derive the address of node P.

Network interface 302(A), and more specifically, the path selection manager 504 on network interface 302(A), determines (block 604) a set of virtual networks that can be used to transport the set of information to node P. As discussed above, at the time the network 300 is configured, each network interface 302 is informed of and stores the set of VLAN's (in its VLAN storage 506) that it can use to transport sets of information. Thus, network interface 302(A) accesses and consults this information, and determines that, in the current example, it can use VLAN's 1, 2, 3, and 4.

Thereafter, network interface 302(A), and more specifically, the path selection manager 504 on network interace 302(A), selects (block 606) one of the VLAN's to use to transport the set of information. For the sake of example, it will be assumed VLAN 1 is selected. In one embodiment, this selection is made after the address of the destination node is specified or derived. Also, in one embodiment, this selection is made in a manner that tends to balance the traffic load across the multiple VLAN's. For example, the network interface 302(A) may select the VLAN randomly (if the selection process is truly random, this should spread traffic across the various VLAN's relatively evenly). The network interface 302(A) may also select the VLAN in a round-robin fashion. Furthermore, the network interface 302(A) may select the VLAN based upon current traffic conditions. For example, the network interface 302(A) may select the VLAN with the path that is currently experiencing the lowest traffic load, or the VLAN with the path that currently has the most available capacity for carrying traffic. Information on current traffic conditions may be provided to the path selection manager 504 of network interface 302(A) by a central traffic monitoring component (not shown) or may be derived based upon information gathered by the path selection manager 504 of network interface 302(A). Based upon this information, network interface 302(A) can select the VLAN in such a manner as to balance the traffic load across the multiple paths. The manner in which load balancing can be carried out in accordance with one embodiment of the present invention will be elaborated upon in a later section.

After the VLAN (VLAN 1 in the current example) is selected, the network interface 302(A), and more specifically, the path selection manager 504 of network interface 302(A), updates (block 608) the set of information to include information indicating the particular VLAN that was selected. In one embodiment, this may be done as shown in FIGS. 4b and 4c, wherein the path selecting VLAN information 408 is inserted into the set of information. After the set of information is updated, it is sent (block 610) by the network interface 302(A), and more specifically, by the communication manager 502 of network interface 302(A), into the network 300. The switches in the network 300 then use the address and VLAN information in the set of information to switch the set of information to node P along VLAN 1.

On the receiving end, the network interface 302(P), and more specifically, the communication manager 502 on network interface 302(P), receives the set of information, and removes the path-selecting VLAN information 408 therefrom. The network interface 302(P) then passes the set of information to node P for processing. The set of information is thus delivered from node A to node P.

In one embodiment, the network interface 302(A) processes every set of information destined for node P in this way. Thus, network interface 302(A) may acquire another set of information from node A that is destined for node P. For this set of information, network interface 302(A) would perform the same operations as that shown in FIG. 5. However, the network interface 302(A) may select a different VLAN (VLAN 2, for example) for this set of information. In general, the network interface 302(A) may acquire a series of information sets from node A that are destined for node P, and may select different VLAN's for different information sets. By doing so, the network interface 302(A) distributes the traffic across the multiple VLAN's, and hence, the multiple paths. If each network interface 302 does this, then load balancing can be achieved throughout the network 300. In this manner, load balancing may be implemented on a dynamic, packet by packet basis.

Alternative Embodiment

Figure 7:
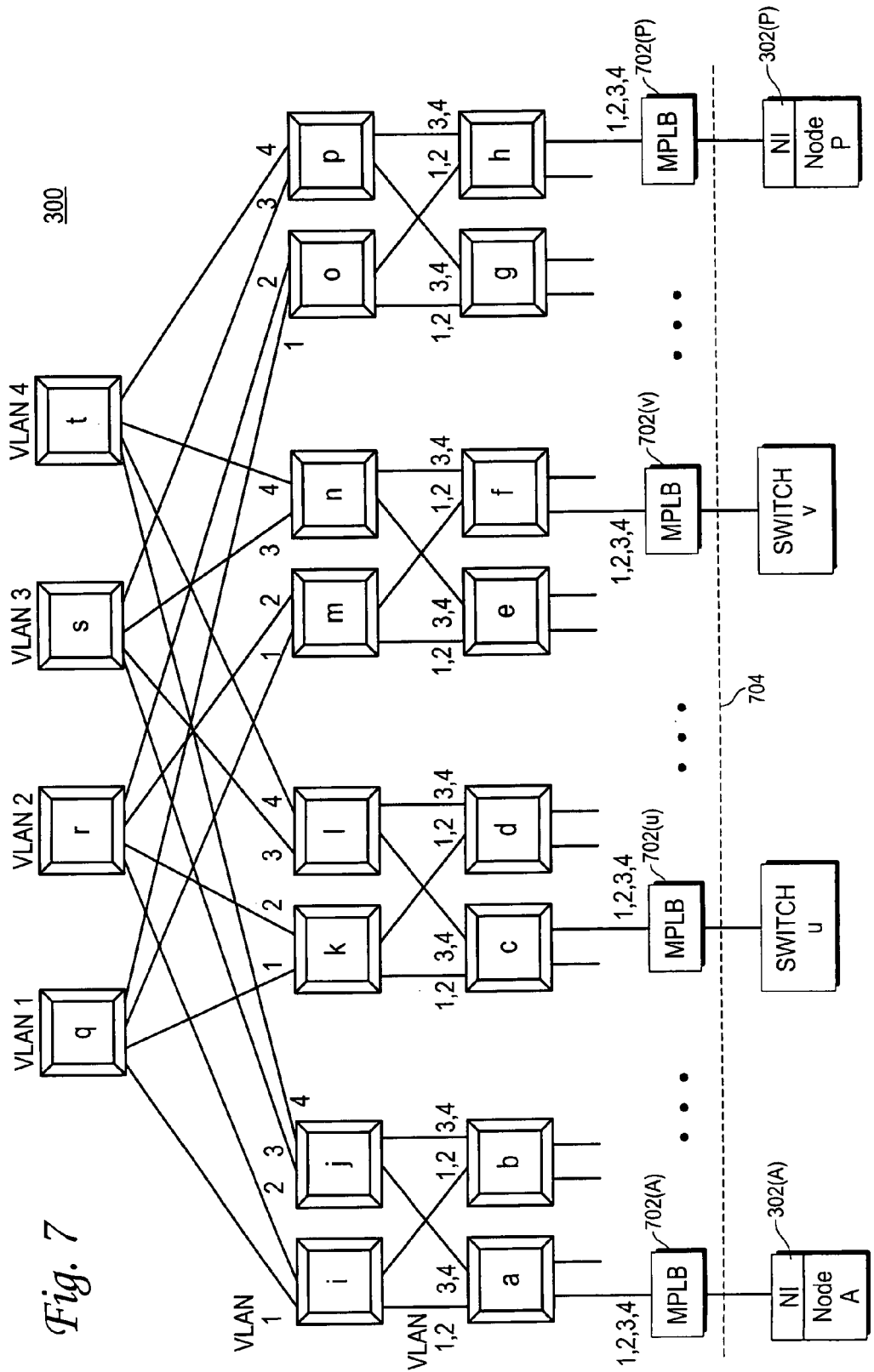
FIG. 7 shows a multi-path load balancing (MPLB) component implemented in the sample network of FIG. 3, in accordance with one embodiment of the present invention.

Thus far, the path selection and load balancing functions have been described as being implemented by the network interface 302. While this is an advantageous embodiment, it is not the only one. As an alternative, the path selection and load balancing functions may be implemented by a multi-path load balancing (MPLB) component that is separate from the network interface 302. Such a component deployed in the network 300 of FIG. 3 is shown in FIG. 7. As shown, an MPLB 702 may be deployed between the network interface 302 of a node (e.g. network interface 302(A) of node A) and one of the switches (e.g. switch a) of the network 300. One of the advantages of this arrangement is that it relieves the network interface 302 of all path selection and load balancing responsibilities. Thus, any standard network interface 302 may be used to couple a node to the network 300. An MPLB 702 may also be used to couple other non-node components to the network 300. These non-node components may be switches (e.g. switch u, switch v), routers, or any other type of network component.

In one embodiment, the MPLB's 702 are implemented at the edge of the network 300. More specifically, an MPLB 702 is coupled to each of the edge links of the network 300. In network 300, the switches a through h are on the edge of the network 300, and each of these switches has two edge links that allow external components to couple to the network 300. In such a network 300, an MPLB 702 would be coupled to each of these edge links. Implemented in this way, the MPLB's 702 act as the border of the network 300. Everything above the dashed line 704 is considered internal to the network 300. Everything below the dashed line 704 is considered external to the network 300. The significance of this internal/external distinction is that components external to the network 300 need not be aware of the multiple VLAN's implemented within the network 300. Hence, none of the external components (e.g. node A, node P, switch u, switch v) need to perform any path selection or load balancing functions. Instead, it is up to the MPLB's 702 to perform these functions. When a set of information (e.g. a packet) from an external component enters the network 300, it is up to the MPLB 702 to (when appropriate) select a VLAN, and hence, a path, to use to switch the packet through the network 300. As discussed previously in connection with the network interface 302, this may involve inserting a set of path-selecting VLAN information into the packet. When a packet leaves the network 300 to go to an external component, it is up to the MPLB 702 to remove any path-selecting VLAN information from the packet before sending it on. By doing so, the MPLB 702 makes the path selection and load balancing details completely transparent to the external components.

In the implementation where the path selection and load balancing functions are performed by a network interface 302, it is known that the network interface 302 is coupled to a node. Because of this, certain assumptions can be made as to the types of packets that the network interface 302 will be handling. In the implementation where the path selection and load balancing functions are performed by an MPLB 702, however, such assumptions cannot be made because an MPLB 702 may be coupled not just to a node but also to any other type of network component. As a result, an MPLB 702 needs to know how to handle more types of packets than a network interface 302. For some types of packets, it may not be appropriate to implement a path selection or load balancing function. For other types of packets, some additional processing may be needed. Because of this variety, the MPLB 702 needs to be endowed with additional capability to handle more types of packets. The handling of different packet types will be discussed in greater detail in later sections.

As noted above, an MPLB 702, in one embodiment, is deployed at the border of the network 300. As a result, an MPLB 702 behaves as an access point to the network 300 for external components. This access point function is typically performed by an edge port of an edge switch (for example, if MPLB 702(*u*) were not deployed, the access point function would be performed by the edge ports of edge switch c). Because an MPLB 702 is now taking on the access point function of an edge port, the MPLB 702, in one embodiment, performs the functions that are typically performed by an edge port. This is in addition to the path selection and load balancing functions noted above.

Multi-Path Load Balancing Component

Figure 8:
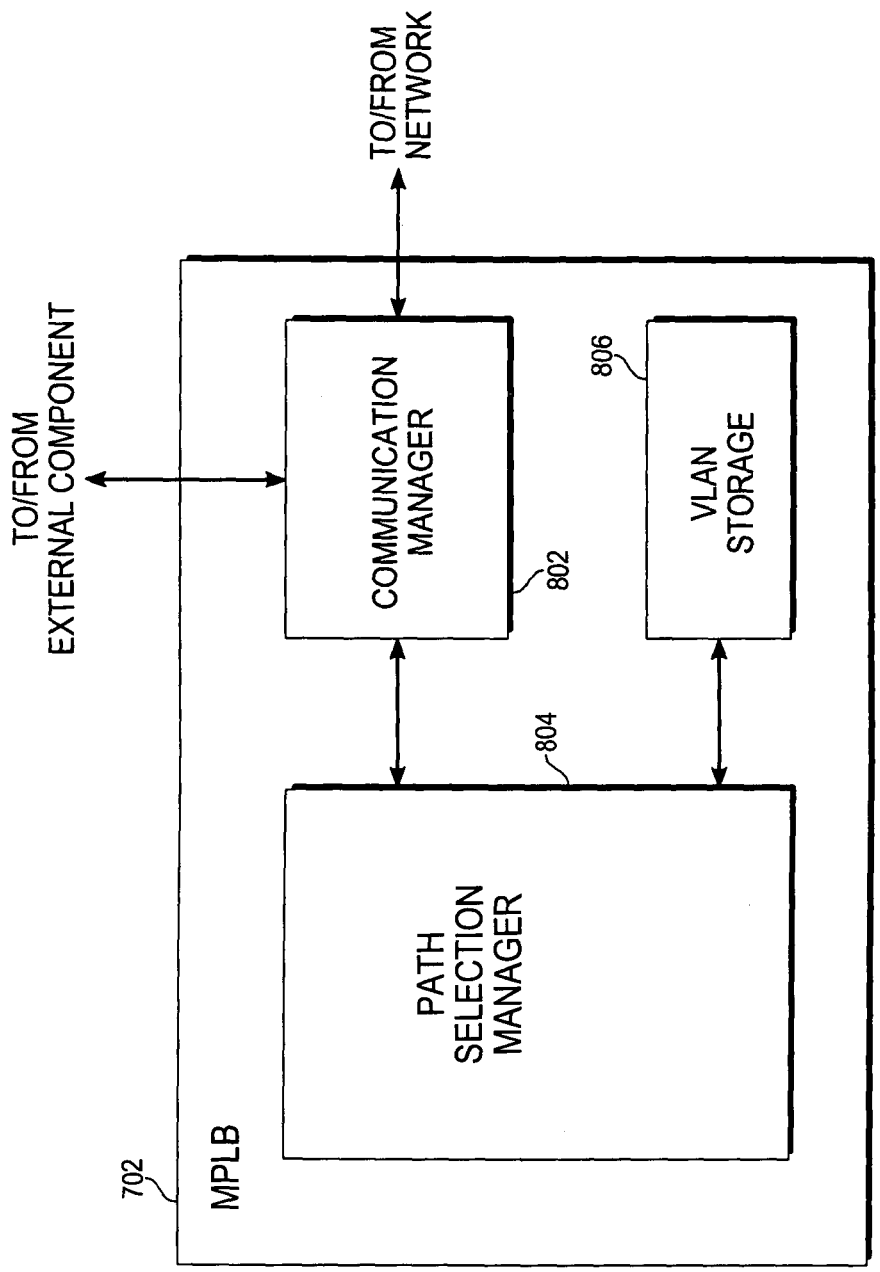
FIG. 8 is a functional block diagram of an MPLB, in accordance with one embodiment of the present invention.

FIG. 8 shows a functional block diagram of an MPLB 702 in accordance with one embodiment of the present invention. For the most part, the MPLB 702 comprises the same general components as the network interface 302 of FIG. 5. These components include a communication manager 802, a path selection manager 804, and a VLAN storage 806. Generally, the path selection manager 804 is responsible for selecting a VLAN, and hence, a path, to use to switch a set of information through the network 300. The VLAN storage 806 is used to store information pertaining to the one or more active VLAN's that can be used to switch a set of information through the network. The VLAN storage 806 may be populated with VLAN information in the same manner as the VLAN storage 506 of the network interface 302 is populated with VLAN information. The communication manager 802 is responsible for interfacing an external component with the network 300. Unlike the communication manager 502 of network interface 302, this communication manager 802 may be coupled not just to a node but to any other type of network component. Because of this, the communication manager 802 may receive various types of packets (the terms "packet" and "set of information" are used interchangeably hereinafter). In one embodiment, additional functionality is imparted to the communication manager 802 to enable it to handle various different types of packets. In addition, in one embodiment, the communication manager 802 is endowed with additional functionality to enable it to perform the functions typically performed by an edge port. The operation of these components will be elaborated upon in later sections. As was the case with the network interface 302, for purposes of the present invention, the functionality of the MPLB 702 may be realized using hardware (e.g. hardware logic components, ASIC's, etc.), software (e.g. having one or more processors execute one or more sets of instructions), or a combination thereof.

Operational Overview

Figure 9:
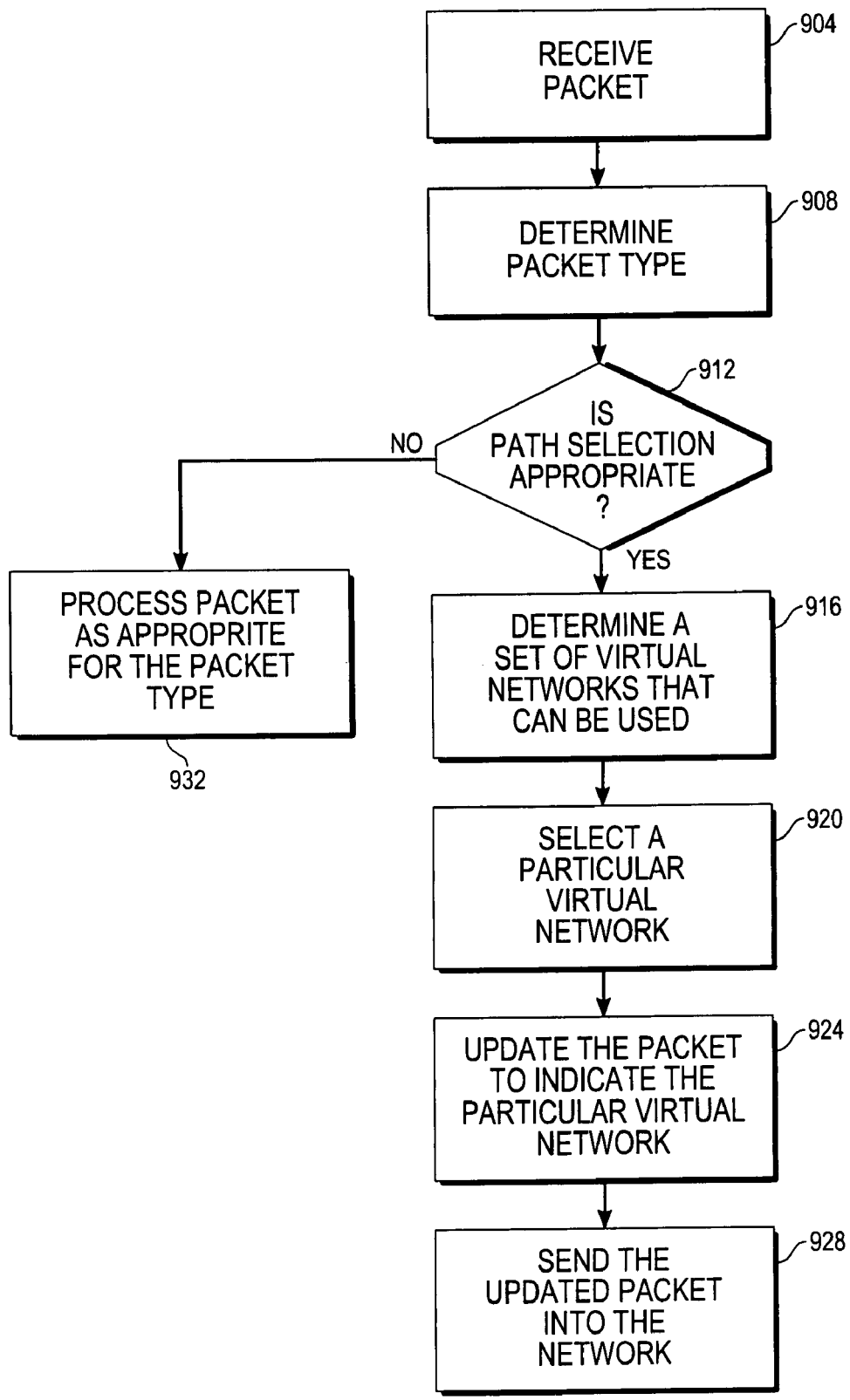
FIG. 9 is a flow diagram illustrating the operation of an MPLB in accordance with one embodiment of the present invention.

Each MPLB 702 may be used for ingress (to forward one or more packets from an external component into the network 300) or egress (to forward one or more packets from the network 300 out to an external component). FIG. 9 shows a high level operational flow diagram for the ingress functionality of an MPLB 702, in accordance with one embodiment of the present invention. The following discussion assumes that the network 300 has already been configured and that the VLAN'S 1, 2, 3, 4 have already been established in the manner described previously.

In operation, an MPLB 702, and more specifically, the communication manager 802 on the MPLB 702, receives (block 904) a packet from an external component. This packet may be received from a node, a switch, or any other type of external network component. In response, the communication manager 802 determines (block 908) a packet type for the packet. This determination may be made, for example, based upon the control information and data in the packet. Once the packet type is determined, the communication manager 802 further determines (block 912) whether path selection is appropriate for this type of packet. If it is not, then the communication manager 802 proceeds to process (block 932) the packet in a manner that is appropriate for that packet type. On the other hand, if path selection is appropriate for this type of packet, then the MPLB 702, and more specifically, the path selection manager 804 of the MPLB 702, proceeds to select a path to use to transport the packet through the network 300.

In one embodiment, the path selection manager 804 selects a path by first determining (block 916) a set of virtual networks that it can use to transport the packet through the network 300. In one embodiment, the path selection manager 804 makes this determination by accessing and consulting the information stored in the VLAN storage 806, which sets forth all of the active VLAN's within network 300. In the current example, the active VLAN's are VLAN's 1, 2, 3, and 4. Given this information, the path selection manager 804 selects (block 920) one of the VLAN's to use to transport the packet. By selecting a VLAN, the path section manager 804 in effect selects a path (since each VLAN defines a different path through the network 300).

In one embodiment, this selection is made in a manner that tends to balance the traffic load across the multiple VLANs. For example, the path selection manager 804 may select the VLAN randomly (if the selection process is truly random, this should spread traffic across the various VLANs relatively evenly). The path selection manager 804 may also select the VLAN in a round-robin fashion. Furthermore, the path selection manager 804 may select the VLAN based upon current traffic conditions. For example, the path selection manager 804 may select the VLAN with the path that is currently experiencing the lowest traffic load, or the VLAN with the path that currently has the most available capacity for carrying traffic. The path selection manager 804 may also select the VLAN with the path that has the lowest current latency. Information on current traffic conditions may be provided to the path selection manager 804 by a central traffic monitoring component (not shown) or may be derived based upon information gathered by the path selection manager 804. Based upon this information, the path selection manager 804 can select the VLAN in such a manner as to balance the traffic load across the multiple paths. The presence of the four switching paths also provides four paths across which traffic can be spread. As a result, load balancing can be performed. The manner in which load balancing can be carious out in accordance with one embodiment of the present invention will be elaborated upon in a later section.

After the VLAN is selected, the path selection manager 804 updates (block 924) the packet to include information indicating the particular VLAN that was selected. In one embodiment, this may be done as shown in FIGS. 4b and 4c, wherein the path selecting VLAN information 408 is inserted into the packet. After the packet is updated, it is sent (block 928) by the MPLB 702, and more specifically, by the communication manager 802 of the MPLB 702, into the network 300. The switches in the network 300 thereafter use the VLAN information in the packet to switch the packet through the network 300 along the selected path.

The above discussion provides a high level description of the operation of the MPLB 702. To illustrate how the MPLB 702 handles specific types of packets, reference will now be made to several specific examples.

TCP/IP and UDP/IP Packets

Suppose that an MPLB 702, and more specifically, the communication manager 802 of the MPLB 702, receives a TCP/IP or a UDP/IP packet from an external component. This packet may be received from a node coupled to the MPLB 702, from an external switch that has forwarded the packet to the MPLB 702, or from some other external network component. In addition to data, this type of packet comprises header information. The header information includes an Ethernet portion, which includes a source MAC address, a destination MAC address, and a type (which would be IP in this case). The header information further comprises a source IP address, a destination IP address, a protocol type (which would be either TCP or UDP), a TCP or UDP source port number, and a TCP or UDP destination port number. Upon receiving the packet, the communication manager 802 extracts the header information therefrom, and uses the header information to determine the packet type. From the header information described above, the communication manager 802 determines that this packet is of the TCP/IP or UDP/IP type. In one embodiment, path selection is appropriate for this type of packet. Therefore, the communication manager 802 invokes the path selection manager 804 to select a path through the network 300 for this packet.

In response to being invoked, the path selection manager 804 accesses the VLAN storage 806 and uses the VLAN information contained therein to determine a set of VLAN's that can be used to transport the packet through the network 300. After the available VLAN's are determined, the path selection manager 804 selects one of the VLAN's. By selecting a VLAN, the path section manager 804 in effect selects a path through the network 300. In one embodiment, this VLAN selection is made in a manner that tends to balance the traffic load across the multiple VLAN's.

After the VLAN is selected, the path selection manager 804 updates the packet to include information indicating the particular VLAN that was selected. In one embodiment, this may be done as shown in FIGS. 4b and 4c, wherein the path selecting VLAN information 408 is inserted into the packet. After the packet is updated, it is sent by the communication manager 802 into the network 300. The switches in the network 300 thereafter use the address and VLAN information in the packet to switch the packet through the network 300. In this manner, the MPLB 702 implements path selection and load balancing on a TCP/IP or UDP/IP type of packet.

In the above example, the path selection manager 804 performs path selection on a packet-by-packet basis. In some implementations, it may be desirable to group certain packets together into a flow, and to use the same VLAN (and hence, the same path) for all of the packets in that flow. To accommodate such an implementation, the path selection manager 804, in one embodiment, may process the TCP/IP or UDP/IP packet as follows.

Before selecting a VLAN from the available VLAN's specified in the VLAN storage 806, the path selection manager 804 derives a flow label for the packet. The flow label may be derived, for example, by processing the header information in the packet through a hashing algorithm and deriving a hash code therefrom. This hash code semi-uniquely or uniquely identifies the flow of which the packet is a part. Once the flow label is derived, the path selection manager 804 determines whether other packets having this flow label have been processed before. In one embodiment, to make this determination, the path selection manager 804 determines whether there is an already existing flow data structure associated with this flow label.

If such a data structure already exists (thereby, indicating that packets associated with this flow were previously processed), then the path selection manager 804 accesses that data structure, and extracts therefrom a VLAN ID. This VLAN ID indicates the VLAN that was selected for the previously processed packets in the flow. After the VLAN ID is extracted, it is compared against the available VLAN's specified in the VLAN storage 806. If this VLAN is still available, it is selected as the VLAN to be used for this packet. If it is no longer available, then another VLAN is selected from the list of available VLAN's, and that VLAN ID is stored into the flow data structure. That VLAN will be used for this packet and for future packets of the flow.

If there is no currently existing flow data structure associated with the derived flow label, then the path selection manager 804 creates a new flow data structure, and associates the flow label with that new data structure. In addition, the path selection manager 804 selects one of the available VLANs specified in the VLAN storage 806, and stores that VLAN ID into the new flow data structure. By doing so, the path selection manager 804 associates the selected VLAN with the flow. This will cause this packet and future packets of the flow to use the selected VLAN. In this manner, the path selection manager 804 can cause all of the packets of a flow to use the same VLAN. BY using different VLANs for different flows, the path selection manager 804 can load balance across the multiple VLANs.

Topology Control Packets

As shown in FIG. 7, an MPLB 702 may be coupled to an external switch, such as switch u or v. One of the consequences of being coupled to a switch is that the MPLB 702 may receive some of the topology control packets sent by that switch. In one embodiment, the MPLB 702, and more specifically, the communication manager 802 of the MPLB 702, knows how to recognize and handle these topology control packets.

Spanning Tree BDPU

One type of topology control packet that may be sent by a switch is a spanning tree bridge protocol data unit (spanning tree BPDU) packet. This type of packet is directed to well known and specific MAC addresses (i.e. this type of packet includes within the packet a well known and specific MAC destination address). From the well known MAC destination address, it is possible for the communication manager 802 to determine the packet type of this packet. Once the packet type is known, the communication manager 802 knows how to handle the packet. In one embodiment, path selection is not appropriate for spanning tree BPDU packets; thus, the MPLB 702 neither path selects nor load balances these packets. Instead, in one embodiment, the MPLB 702 just forwards the packet unmodified. Thus, for example, if switch u (see FIG. 7) sends a spanning tree BPDU packet to MPLB 702(u), then MPLB 702(u) just forwards the packet unmodified to the internal switch c.

GVRP BDPU

Another type of topology control packet that may be sent by a switch is a generic attribute registration protocol (GARP) VLAN registration protocol (GVRP) BPDU packet. The purpose of this type of packet is to register a VLAN (or multiple VLAN's) on a particular port or link. For example, if switch u sends a GVRP BDPU packet to MPLB 702(u), and if the packet indicates that VLAN X is to be registered, then it means that switch u is trying to register VLAN X on the external link between switch u and MPLB 702(u).

Like the spanning tree BDPU, this type of packet also uses well known and specific MAC destination addresses. Thus, based upon the MAC destination address in the packet, this type of packet can be readily identified by the communication manager 802 as a GVRP BDPU. Also, like the spanning tree BDPU, path selection and load balancing is not appropriate (in one embodiment) for this type of packet. Thus, in response to receiving a GVRP BDPU packet, the MPLB 702, and more specifically, the communication manager 802, forwards the packet unmodified. In an example where external switch u (see FIG. 7) sends a GVRP BPDU packet to MPLB 702(u), MPLB 702(u) would just forward the packet to the internal switch c unmodified.

In contrast to a spanning tree BDPU packet, however, the MPLB 702(u), in one embodiment, performs additional processing in response to a GVRP BPDU packet. Specifically, the communication manager 802 of MPLB 702(u) interacts with switch c (which is implementing the GVRP protocol) to register the VLAN indicated in the packet on the MPLB's external link. Thus, if, for example, the packet indicates that VLAN X is to be registered, then the communication manager 802 of MPLB 702(u) would register VLAN X on the external link between MPLB 702(u) and external switch u. Once VLAN X is registered in this way, the communication manager 802 of MPLB 702(u) will know that VLAN X is supported on its external link and hence, will allow packets tagged with VLAN X to be sent out on that link. A point to note is that, registered in this way, VLAN X is recognized by MPLB 702(u) as an external VLAN only. That VLAN is not one of the internal VLAN's used to switch a packet through the network 300.

Multicast Registration Packets

Another type of packet that an MPLB 702 may receive from an external component is a multicast registration packet. This type of packet is sent by a node to register that node to receive packets sent to a multicast address. A multicast registration packet may be sent as a GARP multicast registration protocol (GMRP) packet or as an Internet protocol group multicast protocol (IGMP) packet. This type of packet uses well known and specific MAC destination addresses. Thus, based upon the MAC destination address in the packet, this type of packet can be readily identified by the communication manager 802 of an MPLB 702 as a multicast registration packet. Included with a multicast registration packet is a multicast address. This multicast address is the address that is to be programmed into the internal switches of the network 300 to cause the internal switches to forward any packet sent to the multicast address to the node that is originating the multicast registration packet. According to current standards, certain address ranges are reserved for multicast addresses; thus, from inspecting the multicast address, it can be readily determined that the address is a multicast address. A multicast registration packet may also be tagged with an external VLAN ID. This VLAN ID indicates the external VLAN that is to be used to carry a multicast packet to the node that is originating the multicast registration packet. In one embodiment, the communication manager 802 of an MPLB 702 processes a multicast registration packet as follows.

Upon receiving a multicast registration packet, the communication manager 802 inspects the MAC destination address of the packet and determines that it is a multicast registration packet. In one embodiment, path selection is appropriate for this type of packet. Thus, the communication manager 802 invokes the path selection manager 804 to select an internal VLAN. In one embodiment, the path selection manager 804 of each of the MPLB's 702 is preconfigured (e.g. given some configuration information) to associate certain multicast addresses with certain internal VLAN's. This configuration information may cause all multicast addresses to be associated with the same internal VLAN (e.g. VLAN 1), or it may cause certain ranges of multicast addresses to be associated with certain internal VLAN's (e.g. all multicast addresses within a first range may be associated with VLAN 1, all multicast addresses within a second range may be associated with VLAN 2, etc.). Based on the configuration information, and the multicast address specified in the registration packet, the path selection manager 804 determines which internal VLAN it should associate with the multicast address, and selects that VLAN. The multicast address is effectively mapped to this internal VLAN.

After the internal VLAN is selected, the path selection manager 804 proceeds to update the multicast registration packet. Before it does so, however, it checks to see if the packet is currently tagged with an external VLAN ID. If it is not, then the path selection manager 804 updates the packet to include information indicating the selected internal VLAN. This may be done as shown in FIGS. 4b and 4c, wherein the path selecting VLAN information 408 is inserted into the packet. After the packet is updated, it is sent by the communication manager 802 into the network 300.

On the other hand, if the packet is tagged with an external VLAN ID, then the path selection manager 804 updates the packet by overwriting the external VLAN ID in the packet with the ID of the selected internal VLAN. In effect, this maps the external VLAN and the multicast address to the internal VLAN. As part of this mapping, the path selection manager 804 records the external VLAN-multicast address-internal VLAN association. This association enables the path selection manager 804 to perform the reverse mapping when a packet leaves the network 300. After the multicast registration packet is updated to replace the external VLAN ID with the internal VLAN ID, the communication manager 802 forwards the updated packet into the network 300. The multicast registration packet is thus processed by the MPLB 702.

To illustrate the effect of the multicast registration packet on the internal network 300, reference will be made to an example. Suppose that node A of FIG. 7 wishes to register to receive packets sent to multicast address X. In such a case, node A would send a multicast registration packet containing multicast address X to MPLB 702(A). For the sake of simplicity, it will be assumed that this packet does not include an external VLAN ID. Upon receiving this packet, the communication manager 802 of MPLB 702(A) determines that the packet is a multicast registration packet; thus, it invokes the path selection manager 804 to select an internal VLAN. Based upon a set of configuration information and the multicast address X, the path selection manager 804 selects one of the internal VLAN's (assume VLAN 1 for the sake of example). It then updates the packet with the selected VLAN ID. The updated packet is thereafter sent by the communication manager 802 to switch a.

Upon receiving the multicast registration packet, switch a updates its forwarding table to indicate that all packets sent to multicast address X should be forwarded to the port coupled to MPLB 702(A). From the packet, switch a knows that internal VLAN 1 has been associated with multicast address X; thus, it forwards the registration packet on to the next higher switch in VLAN 1, which, in the network of FIG. 7, is switch j. Upon receiving the multicast registration packet, switch j updates its forwarding table to indicate that all packets sent to multicast address X should be forwarded to the port coupled to switch a. From the packet, switch j knows that internal VLAN 1 has been associated with multicast address X; thus, it forwards the registration packet on to the next higher switch in VLAN 1, which, in the network of FIG. 7, is root switch q. Upon receiving the multicast registration packet, root switch q updates its forwarding table to indicate that all packets sent to multicast address X should be forwarded to the port coupled to switch j. Since switch q is the root switch for VLAN 1, it does not forward the multicast registration packet on to any other switch. Node A is thus registered to receive packets sent to the multicast address X.

Suppose now that node P also wishes to register to receive packets sent to multicast address X. In such a case, node P would send a multicast registration packet containing multicast address X to MPLB 702(P). For the sake of simplicity, it will be assumed that this packet does not include an external VLAN IUD. Upon receiving this packet, the communication manager 802 of MPLB 702(P) determines that the packet is a multicast registration packet; thus, it invokes the path selection manager 804 to select an internal VLAN. Based upon a set of configuration information (which should be the same as that used by MPLB 702(A)) and the multicast address X, the path selection manager 804 selects one of the internal VLAN's (this VLAN should be the same (i.e. VLAN 1) as that selected previously by the path selection manager 804 of MPLB 702(A)). The path selection manager 804 then updates the packet with the selected VLAN ID. The updated packet is thereafter sent by the communication manager 802 to switch h.

Upon receiving the multicast registration packet, switch h updates its forwarding table to indicate that all packets sent to multicast address X should be forwarded to the port coupled to MPLB 702(P). From the packet, switch h knows that internal VLAN 1 has been associated with multicast address X; thus, it forwards the registration packet on to the next higher switch in VLAN 1, which, in the network of FIG. 7, is switch o. Upon receiving the multicast registration packet, switch o updates its forwarding table to indicate that all packets sent to multicast address X should be forwarded to the port coupled to switch h. From the packet, switch o knows that internal VLAN 1 has been associated with multicast address X; thus, it forwards the registration packet on to the next higher switch in VLAN 1, which, in the network of FIG. 7, is root switch q. Upon receiving the multicast registration packet, root switch q updates its forwarding table to indicate that all packets sent to multicast address X should be forwarded to the port coupled to switch o. Since switch q is the root switch for VLAN 1, it does not forward the multicast registration packet on to any other switch. Node P is thus registered to receive packets sent to the multicast address X. In the above manner, multiple nodes may be registered to receive packets sent to a multicast address.

Multicast Packets

The above discussion addresses the handling of a multicast registration packet. This discussion will focus on the processing of an actual multicast packet, which is a data packet. To facilitate discussion, reference will be made to an example. In the following example, it will be assumed that both nodes A and P of FIG. 7 have been registered to receive packets sent to multicast address X. It will also be assumed that a set of configuration information has been provided to all of the MPLB's 702, and that the configuration information specifies that internal VLAN 1 is to be used to carry the packets sent to multicast address X.

Suppose now that node P sends a data packet having multicast address X to MPLB 702(P). From the multicast address in the packet, the communication manager 802 of MPLB 702(P) determines that this packet is a multicast packet. In one embodiment, path selection is appropriate for this type of packet. Therefore, the communication manager 802 invokes the path selection manager 804 to select a path through the network 300 for this packet.

In response to being invoked, the path selection manager 804 inspects the multicast address X, and using the configuration information noted above, associates the multicast address X with VLAN 1; thus, VLAN 1 is selected as the internal VLAN to use to transport this packet. As noted previously, the configuration information may specify that certain multicast address ranges be mapped to certain internal VLANs. For example, multicast addresses within a first range may be mapped to VLAN 1, while multicast addresses within a second range may be mapped to VLAN 2, while multicast addresses within a third range may be mapped to VLAN 3, and so forth. By mapping different multicast addresses to different internal VLANs, it is possible to spread multicast traffic across the multiple internal VLANs. Thus, a static version of load balancing can be achieved.

After the internal VLAN is selected, the path selection manager 804 proceeds to update the packet with the ID of the selected VLAN. In one embodiment, before it does so, the path selection manager 804 checks to see if the packet is currently tagged with an external VLAN ID. If it is not, then the path selection manager 804 updates the packet to include information indicating the selected internal VLAN. This may be done as shown in FIGS. 4b and 4c, wherein the path selecting VLAN information 408 is inserted into the packet. On the other hand, if the packet is tagged with an external VLAN ID, then the path selection manager 804 updates the packet by overwriting the external VLAN ID in the packet with the ID of the selected internal VLAN. In effect, this maps the external VLAN and the multicast address to the selected internal VLAN. After the packet is updated with path selecting VLAN information, the communication manager 802 forwards the updated packet to switch h.

When switch h receives the packet, it consults its forwarding table and finds that all packets destined for multicast address X should be forwarded to the port coupled to MPLB 702(P) (this is from the previous registration of node P). However, because the packet was received on that port, switch h does not forward the packet back to that port. Instead, because the packet specifies that internal VLAN 1 is to be used to transport the packet through the network 300, switch h forwards the packet to switch o. When switch o receives the packet, it consults its forwarding table and finds that all packets destined for multicast address X should be forwarded to the port coupled to switch h (again, this is from the previous registration of node P). However, because the packet was received on that port, switch o does not forward the packet back to that port. Instead, because the packet specifies that internal VLAN 1 is to be used to transport the packet through the network 300, switch o forwards the packet to root switch q. Upon receiving the multicast packet, root switch q consults its forwarding table and sees that all packets destined for multicast address X should be forwarded to the port coupled to switch i (this is from the previous registration of node A) and the port coupled to switch o (this is from the previous registration of node P). Since the root switch q received the multicast packet on the port coupled to switch o, it does not forward the packet back to that port; thus, in this example, root switch q forwards the packet just to the port coupled to switch i. When switch i receives the packet, it consults its forwarding table and finds that all packets destined for multicast address X should be forwarded to the port coupled to switch a (this is from the previous registration of node A). Thus, it forwards the packet to switch a. In turn, switch a consults its forwarding table and finds that all packets destined for multicast address X should be forwarded to the port coupled to MPLB 702(A) (again, this is from the previous registration of node A). Thus, it forwards the packet to MPLB 702(A).

When the communication manager 802 of MPLB 702(A) receives the packet, it determines from the multicast address that this is a multicast packet. The communication manager 802 then checks its records to see if this multicast address X has an external VLAN associated therewith (recall that an external VLAN-multicast address-internal VLAN association may have been saved as part of the registration process for node A). If the multicast address X does not have an external VLAN associated therewith, then the communication manager 802 removes the path selection VLAN information from the packet and forwards it on to node A. On the other hand, if the multicast address X does have an external VLAN associated with it, then the communication manager 802 replaces the path selection VLAN information in the packet with the external VLAN ID. The communication manager 802 then forwards the updated packet on to node A. In this manner, a multicast packet is transported through the network 300.

Egress Functionality

The above discussion describes the ingress functionality of an MPLB 702. The following discussion will describe the egress functionality. This egress functionality enables the MPLB 702, and more specifically, the communication manager 802 of the MPLB 702, to receive a packet from a switch internal to the network 300, and to either forward that packet to an external component or to process the packet in an appropriate manner.

One type of packet that the communication manager 802 of an MPLB 702 may receive from an internal switch is a forwarded TCP/IP or UDP/IP packet. When it receives such a packet, the communication manager 802 processes the packet to find a set of path-selecting VLAN information (this path-selecting VLAN information was added to the packet by another MPLB 702 when it entered the network 300). The communication manager 802 removes this path-selecting VLAN information from the packet and then forwards the packet to an external component. By doing this, the communication manager 802 makes the existence of the internal VLAN's transparent to the external component.

Another type of packet that the communication manager 802 may receive from an internal switch is a GVRP declaration packet originated by one of the root switches q, r, s, t. The purpose of this packet is to set up one or more VLAN's within the network 300 (the declaration packet contains information indicating which VLAN or VLAN's are to be set up). A GVRP declaration packet is propagated from switch to switch until it reaches an MPLB 702. When the communication manager 802 of an MPLB 702 receives a GVRP declaration packet, it does not forward the packet to an external component. Rather, the communication manager 802 sends a response in the form of a GVRP registration packet. The purpose of this response is to acknowledge receipt of the GVRP declaration packet, and to register the one or more VLAN's specified in the declaration packet on the appropriate switches. This GVRP registration packet, which includes information indicating which VLAN or VLAN's are to be registered, is sent by the communication manager 802 to the internal switch to which the MPLB 702 is coupled. For example, if MPLB 702(A) is sending the GVRP registration packet, that packet would be sent to internal switch a. Upon receiving a GVRP registration packet on a particular port, the internal switch registers the VLAN or VLAN's specified in the packet on that particular port. For example, if internal switch a receives a GVRP registration packet from MPLB 702(A) on the port shown in FIG. 7, and if the registration packet indicates that VLAN 1 is to be registered, then switch c registers VLAN 1 on that port. Thereafter, the link between switch c and MPLB(A) will support VLAN 1. In this manner, the communication manager 802 of an MPLB 702 participates in the establishment of an internal VLAN. As an additional note, in one embodiment, when the communication manager 802 of an MPLB 702 participates in the VLAN establishment process, it updates the VLAN storage 806 of the MPLB 702 to include the ID of the newly established VLAN. By doing so, the communication manager 802 enables the path selection manager 804 to select that VLAN in future path selection and load balancing operations.

Other Functionalities

As noted previously, because an MPLB 702 is deployed at the edge of a network, it performs the functions typically performed by an edge port of an edge switch. One of the typical functions that an edge port performs (if it is so configured) is to add a default VLAN tag to packets that it processes. A default VLAN tag may be added to a packet when it leaves the edge port, and/or when it enters the edge port. This functionality is desirable in some contexts. In one embodiment, the communication manager 802 of an MPLB 702 provides this functionality. Specifically, the communication manager 802 may be configured to add a default VLAN tag to packets ingressing the network 300 and/or add a default VLAN tag to packets egressing the network 300. In one embodiment, if the communication manager 802 adds a default VLAN tag to a packet ingressing the network 300, it does so before invoking the path selection manager 804. That way, the path selection manager 804 will add the path-selecting VLAN information (which is different from the default VLAN tag) to the packet after the default VLAN tag is already present. Doing things in this order ensures that it will be the path-selecting VLAN information and not the default VLAN tag that will be used by the internal switches to switch the packet through the network 300.

Adding a default VLAN tag to packets is just one of the functions that can be performed by an edge port of an edge switch. For purposes of the present invention, the communication manager 802 may be endowed with capability to perform any and all functions performed by an edge port of an edge switch.

Further Alternative Embodiment

Thus far, the MPLB 702 has been described as being a separate, standalone component. It should be noted, however, that if so desired, the functionality of the MPLB 702 may be incorporated into one or more of the edge ports of a switch. Also, each MPLB 702 has been shown as being coupled to only one edge port. It should be noted, however, that if so desired, an MPLB 702 may be coupled to multiple edge ports and even to multiple edge switches. These and other embodiments are within the scope of the present invention.

Load Balancing Overview

Thus far, the load balancing function performed by the path selection manager 504 (FIG. 5) of the network interface 302 and the path selection manager 804 (FIG. 8) of the MPLB 702 has been described at a relatively high and general level. The following sections will describe a specific methodology for implementing load balancing in accordance with one embodiment of the present invention. In the following discussion, reference will be made to the network 300 shown in FIG. 7. However, it should be noted that such reference is made for illustrative purposes only. The load balancing concepts taught herein are not limited to implementation within such a network. Rather, they may be applied generally to any network in which multiple paths are provided between component pairs. All such applications are within the scope of the present invention. Also, for the sake of simplicity and example, the following discussion will refer to the path selection manager 804 of the MPLB 702 as performing the load balancing operations to be described. It should be noted that the path selection manager 504 of the network interface 302 may perform the same operations as well. For purposes of the present invention, the functionality of the path selection manager 504, 804 may be realized in any desired manner. For example, the functionality of the path selection manager 504, 804 may be realized using hardware (e.g. hardware logic components, ASIC's, etc.), software (e.g. having one or more processors execute one or more sets of instructions), or a combination thereof.

In one embodiment, the path selection manager 804 performs load balancing on a "per flow" basis. That is, the path selection manager 804 groups packets into flows, and sends packets onto paths as flows. For example, the packets associated with a first flow may be sent along a first path (e.g. a first VLAN), while the packets associated with a second flow may be sent along a second path (e.g. a second VLAN). By putting different flows on different paths, the path selection manager 804 can balance the load across the various paths.

For purposes of the present invention, packets may be associated with a flow based upon any desired criteria. For example, all packets having the same destination address may be associated with the same flow. All packets of the same type may be associated with the same flow. All packets carrying the same type of traffic may be associated with the same flow. Further, flow association may be determined based upon information in the header of the packets (e.g. all packets with the same quintuple may be associated with the same flow), based upon information in the payloads of the packets (determined based upon deep packet inspection), etc. Flow association may also be determined based upon some additional processing. For example, a hashing algorithm may be applied to some of the information in a packet (e.g. the information in the header of the packet). All packets that hash to the same result may be associated with the same flow. These and other methodologies may be used to group packets into flows. Basically, as long as a set of packets has some commonality, they can be grouped together and be associated with the same flow. A flow may be a long-lived flow having a large number of packets, or it may be a short-lived flow having a relatively small number of packets.

In one embodiment, to manage a plurality of packets as a flow, the path selection manager 804 maintains a flow data structure for each flow. Each flow data structure contains information specific to its corresponding flow. The information that may be stored within a flow data structure will be elaborated upon in later sections. Each flow data structure is associated with a unique flow label. In one embodiment, the flow label is a set of information that can be derived from the information in each packet of a flow. For example, a flow label may be a destination address that is specified in the packet (in such a case, all packets going to the same destination address would be part of the same flow). The flow label may also be a hash value that would be derived by applying a hashing algorithm to information contained within the packet. The flow label may be these and other types of information. So long as a set of information can be derived from the information in a packet, it can be used as a flow label. The flow label will be used to determine which packets belong to which flows (put another way, all packets that cause the same flow label to be derived belong to the same flow). For example, if the flow label is a hash value, then all packets that hash to that hash value will belong to the same flow.

In one embodiment, the path selection manager 804 performs load balancing at the time a new flow is started. Specifically, when a new flow is started, the path selection manager 804 determines which paths are available for forwarding packets associated with that flow to a destination, and then selects one of those paths. The path selection manager 804 selects the path in such a manner that traffic load on the various paths is kept relatively balanced. In one embodiment, the path selection manager 804 selects the path that is currently the least congested. In another embodiment, the path selection manager 804 selects the path randomly (if the selection is truly random, it will have the tendency to spread flows evenly across the various paths), in a round robin fashion, etc. These and other methods may be used to select the path for the flow. After the path is selected, the packets associated with the flow are sent to the destination along the selected path.

In one embodiment, the path selection manager 804 performs load balancing even after a path has been selected for a flow. Specifically, while the packets associated with a flow are being forwarded along the selected path, the path selection manager 804 determines how congested the selected path and the other available paths are. If, for example, the selected path becomes significantly more congested than one of the other paths, then the path selection manager 804 may move the flow from the selected path onto the other path. Thus, the path selection manager 804 has to ability to move a flow in "mid-flow" (by "mid-flow", it is meant that the flow has not yet terminated and that the packets associated with the flow are still being forwarded from one component to another). With this ability to move a flow while it is in mid-flow, the path selection manager 804 can balance the traffic load across multiple paths in a very dynamic manner. As traffic conditions on the different paths change, the path selection manager 804 can move flows from path to path to dynamically adapt and adjust to the changes in traffic conditions. By moving flows in this manner, the path selection manager 804 can keep congestion on the multiple paths relatively balanced and minimized.

Load Balancing Example

To illustrate how load balancing may be implemented in accordance with one embodiment of the present invention, reference will now be made to an example. Suppose that MPLB 702(A) (FIG. 7) receives a stream of packets from node A, and that the packets have some commonality so that they can be grouped and associated with the same flow. Suppose further that all of the packets of the flow are destined for node P so that they need to pass through MPLB 702(P). Suppose further that the path selection manager 804 on MPLB 702(A) can use any one of the four VLAN's, and hence, any one of four paths, to forward the packets to node P. In this example, the four possible paths from MPLB 702(A) to MPLB 702(P) are: (1) MPLB 702(A) to switch a to switch i to switch q to switch o to switch h to MPLB 702(P) for VLAN 1; (2) MPLB 702(A) to switch a to switch i to switch r to switch o to switch h to MPLB 702(P) for VLAN 2; (3) MPLB 702(A) to switch a to switch j to switch s to switch p to switch h to MPLB 702(P) for VLAN 3; and (4) MPLB 702(A) to switch a to switch j to switch t to switch p to switch h to MPLB 702(P) for VLAN 4. Given this scenario, load balancing may be implemented as follows. For the sake of simplicity, the path selection manager 804 on MPLB 702(A) will hereinafter be referred to simply as the path selection manager 804, and the path selection manager on MPLB 702(P) will be referred to as the path selection manager on MPLB 702(P).

Initially, node A sends the first packet of the flow to MPLB 702(A). When the communication manager 802 (FIG. 8) on MPLB 702(A) receives this packet, it forwards the packet to the path selection manager 804. When the path selection manager 804 receives the packet, it derives a flow label based upon information in the packet (the flow label may be derived by processing the packet in any desired manner). After the flow label is derived, the path selection manager 804 determines whether there is any existing flow data structure that has that flow label associated therewith. In the current example, this packet is the first packet of the flow; thus, there should be no existing flow data structure having that flow label associated therewith. In such a case, the path selection manager 804 creates a new flow data structure, and associates the newly derived flow label with the newly created flow data structure.

Thereafter, the path selection manager 804 selects one of the VLAN's to use to forward the packet to node P. By selecting one of the VLAN's, the path selection manager 804 is in effect selecting a path through the network 300 that is to be used to transport the packet to node P. In one embodiment, the path selection manager 804 selects the path (i.e. the VLAN) that is currently the least congested. In another embodiment, the path selection manager 804 selects the path (i.e. the VLAN) randomly, in a round robin fashion, etc. These and other methods may be used to select the path. For the sake of example, it will be assumed that the path provided by VLAN 1 is selected. Once VLAN 1 is selected, the path selection manager 804 stores the ID of VLAN 1 into the flow data structure. This serves as an indication that the path provided by VLAN 1 is the path that is to be used to forward packets associated with the flow. This will cause subsequent packets associated with the flow to be sent to node P using VLAN 1.

After VLAN 1 is selected, the path selection manager 804 updates the packet using the ID of VLAN 1 as the path-selecting VLAN information 408 (in the manner previously described with reference to FIGS. 4b and 4c), and sends the packet into the network 300. The switches in the network 300 will thereafter forward the packet to node P via the path provided by VLAN 1 (it is assumed that reverse path learning has already been performed).

Suppose now that the path selection manager 804 receives the second packet of the flow from node A. Again, the path selection manager 804 derives a flow label based upon information in the packet. This flow label should be the same as that derived for the first packet of the flow (all packets of the flow should cause the same flow label to be derived). The path selection manager 804 again determines whether this flow label has an existing flow data structure associated therewith. This time, the path selection manager 804 will find that the flow label is associated with the flow data structure that was previously created. Upon learning this, the path selection manager 804 accesses the flow data structure, and extracts therefrom the ID of VLAN 1, which was previously stored in the flow data structure. The path selection manager 804 then updates the packet using the ID of VLAN 1 as the path-selecting VLAN information 408, and sends the packet into the network 300. The switches in the network 300 will thereafter forward the packet to node P via the path provided by VLAN 1. In this manner, the path selection manager 804 causes the packets associated with the same flow to be sent along the same path.

Figure 10:
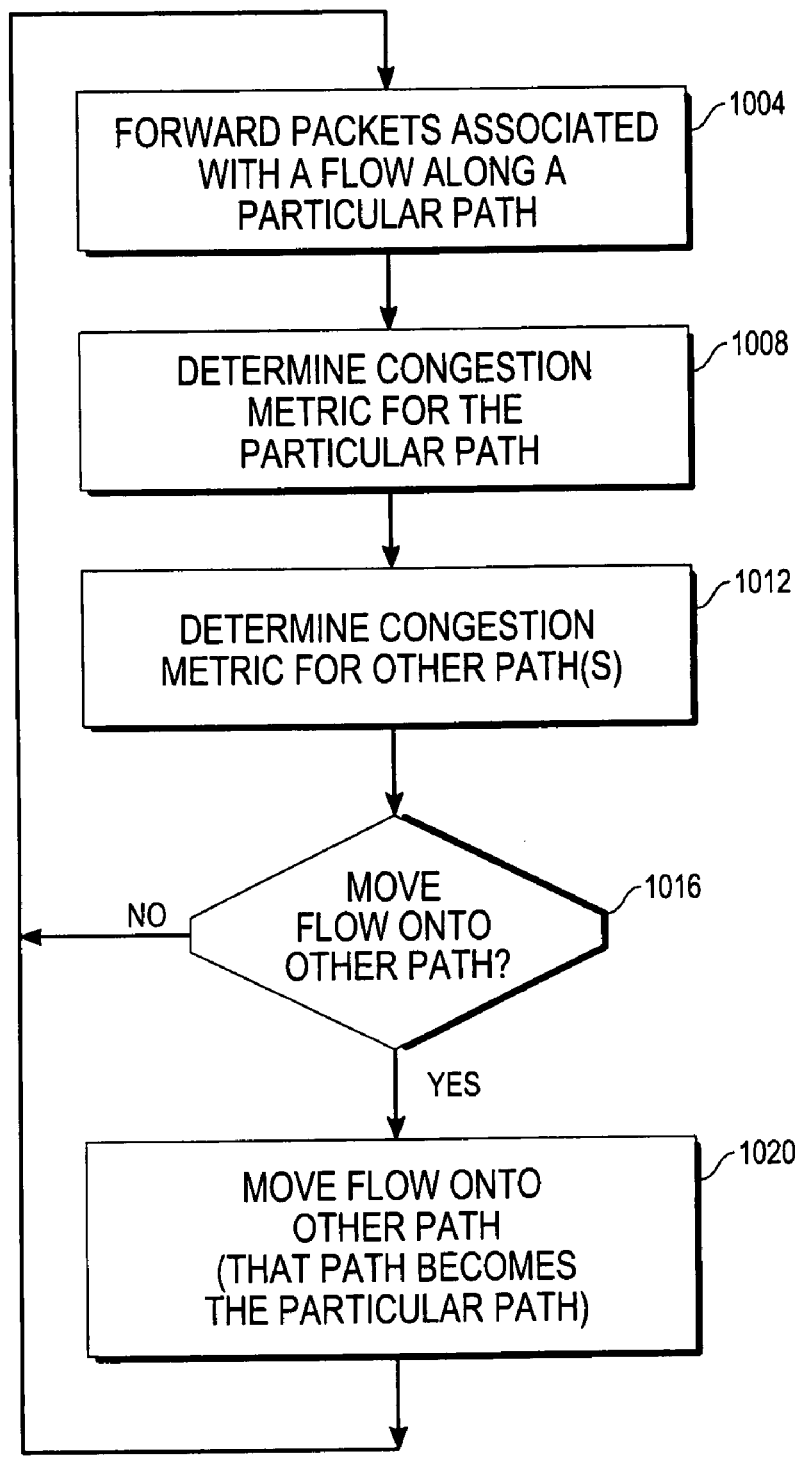
FIG. 10 is a flow diagram illustrating how load balancing may be performed in accordance with one embodiment of the present invention.

In the manner described above, the path selection manager 804 forwards (block 1004 of FIG. 10) one or more packets associated with the flow to node P along the path provided by VLAN 1. As the path selection manager 804 is forwarding packets associated with the flow along this path, the path selection manager 804 monitors the traffic conditions on all of the available paths, including the path provided by VLAN 1 and the other paths provided by VLAN's 2-4. In one embodiment, the path selection manager 804 monitors the traffic conditions on the various paths by determining a congestion metric for each of the paths. Specifically, the path selection manger 804 determines a congestion metric (block 1008) for the path provided by VLAN 1, and determines a congestion metric (block 1012) for each of the other paths provided by VLAN's 2-4. The manner in which these congestion metrics are determined in accordance with one embodiment of the present invention will be elaborated upon in a later section. These congestion metrics basically provide an indication as to how congested each path currently is.

As an alternative to determining a separate congestion metric for each of the other paths provided by VLAN's 2-4, the path selection manager 804 may instead determine (block 1012) a single aggregate congestion metric for those paths. This aggregate congestion metric takes into account the congestion on each of the paths provided by VLAN's 2-4, but provides a single congestion metric for all of those paths. In a sense, the aggregate congestion metric reflects an "average" congestion across the paths provided by VLAN's 2-4. The manner in which the aggregate congestion metric is determined in accordance with one embodiment of the present invention will be elaborated upon in a later section.

Based upon the congestion metrics, the path selection manager 804 determines (block 1016) whether the flow should be moved from the path provided by VLAN 1 to one of the other paths. In the embodiment where the path selection manager 804 determines a separate congestion metric for each of the possible paths, the path selection manager 804 makes this determination by comparing the congestion metric for the path provided by VLAN 1 with the congestion metric for each of the other paths to derive an imbalance metric for each pair of paths. For example, the path selection manager 804 derives an imbalance metric for the path provided by VLAN 1 and the path provided by VLAN 2, derives an imbalance metric for the path provided by VLAN 1 and the path provided by VLAN 3, and derives an imbalance metric for the path provided by VLAN 1 and the path provided by VLAN 4. These imbalance metrics indicate how much congestion difference there is between the other paths and the path provided by VLAN 1. In one embodiment, the largest imbalance metric is selected, and a determination is made as to whether that imbalance metric exceeds a certain threshold. If so, then it may be worthwhile to move the flow from the path provided by VLAN 1 to another path (the one with the largest imbalance metric) provided by one of the other VLAN's. For example, if the imbalance metric shows that one of the other paths is significantly less congested than the path provided by VLAN 1, then it may be worthwhile to move the flow onto that other path.

In the embodiment where the path selection manager 804 determines a single aggregate congestion metric for the other paths provided by VLAN's 2-4, the path selection manager 804 may determine (block 1016) whether the flow should be moved by comparing the congestion metric for the path provided by VLAN 1 with the aggregate congestion metric to derive an imbalance metric. A determination is then made as to whether the imbalance metric exceeds a certain threshold. If so, then it may be worthwhile to move the flow from the path provided by VLAN 1 to one of the other paths (an alternate path) provided by VLAN's 2-4. In this embodiment, because the aggregate congestion metric is an aggregate metric and hence does not provide information as to which of the other paths is currently least congested, it is not immediately clear which of the other paths provided by VLAN's 2-4 the flow should be moved to. In one embodiment, the path selection manager 804 selects one of the other paths provided by VLAN's 2-4 as the alternate path. For purposes of the present invention, the path selection manager 804 may select the alternate path in any desired manner (e.g. randomly, in a round robin fashion, etc.).

If the path selection manager 804 determines that the flow should not be moved to another path, then the path selection manager 804 does not make any changes to the flow data structure. In such a case, the path selection manager 804 loops back to block 1004, and continues to forward packets associated with the flow to node P using the path provided by VLAN 1. The path selection manager 804 also continues to determine (blocks 1008, 1012) congestion metrics for the path provided by VLAN 1 and the other paths provided by the other VLAN's. In addition, the path selection manager 804 continues to determine (block 1016), based upon the congestion metrics for the various paths, whether to move the flow from the path provided by VLAN 1 to another path. Thus, the path selection manager 804 continuously looks for the need and the opportunity to move the flow onto another path to balance the load across the multiple paths.

If, at some point, the path selection manager 804 does determine that the flow should be moved onto another path, then the path selection manager 804, in one embodiment, updates the flow data structure. For example, suppose that the path selection manager 804 determines that the flow should be moved to the path provided by VLAN 4. In such a case, the path selection manager 804 would update the flow data structure by overwriting the ID for VLAN 1 with the ID for VLAN 4. This will cause subsequent packets associated with the flow to be forwarded to node P along the path provided by VLAN 4 instead of the path provided by VLAN 1. In one embodiment, the path selection manager 804 moves the flow from one path to another in such a manner that the packets of the flow will not arrive at the destination out of order; thus, the receiving component will not need to reorder the packets. The manner in which the path selection manager 804 moves a flow from one path to another will be elaborated upon in a later section.

Even after the flow is moved to another path, the path selection manager 804 still remains vigilant with regard to load balancing. Specifically, while the path selection manager 804 is forwarding packets (block 1004) associated with the flow to node P along the new, alternate path, the path selection manager 804 continues to determine (blocks 1008, 1012) congestion metrics for the new path and the other paths provided by the other VLAN's, and continues to determine (block 1016), based upon the congestion metrics of the various paths, whether to move the flow from the new path to another path provided by another VLAN. By constantly looking for load balancing opportunities in this manner, the path selection manager 804 is able to adapt and adjust dynamically to ever changing traffic conditions on the multiple paths.

Determining Congestion Metrics

As noted above, part of the load balancing process involves determining (blocks 1008, 1012) congestion metrics for the paths between a pair of components. To illustrate how a congestion metric can be determined in accordance with one embodiment of the present invention, reference will be made to an example. In the following example, which is a continuation of the above example, the pair of components will be MPLB 702(A) and MPLB 702(P). The example will show how the path selection manager 804 (the one on MPLB 702(A)) can determine a congestion metric for the path provided by VLAN 1 between MPLB 702(A) and MPLB 702(P) (this path would be from MPLB 702(A) to switch a to switch i to switch q to switch o to switch h to MPLB 702(P)). While this example will discuss only the path provided by VLAN 1, it should be noted that the same methodology may be used to determine the congestion metrics for the other paths between MPLB 702(A) and MPLB 702(P) provided by VLAN's 2, 3, and 4.

In one embodiment, determining a congestion metric for a path involves determining one or more latency values for that path. The latency values that are determined for a path may be one-way latency values (indicating how much time is needed to transfer a set of information from a forwarding component to a receiving component along that path) and/or roundtrip latency values (indicating how much time is needed to transfer a set of information from a forwarding component to a receiving component along that path and back to the forwarding component). Determining a congestion metric for a path may also involve determining one or more latency variation values for that path. These latency values and latency variation value(s), viewed alone or together, provide a congestion metric for a path, which in turn, provides an indication as to how congested that path currently is.

To determine the congestion metric for the path provided by VLAN 1, the path selection manager 804 (the one on MPLB 702(A)) may operate as follows. While it is forwarding packets associated with the flow from MPLB 702(A) to node P along the path provided by VLAN 1 (in the manner described above), the path selection manager 804 at some point composes a latency request packet. In the following example, the latency request packet will be described as being a separate packet from the other packets in the flow. However, if so desired, the latency request packet may be piggybacked onto one of the data packets of the flow.

Within the latency request packet, the path selection manager 804 includes several sets of information. These sets of information may include:

(1) a source address (in the current example, the source address may be the address of MPLB 702(A) or the address of node A, which is the source of the flow packets);

(2) a destination address (in the current example, the destination address may be the address of MPLB 702(P) or the address of node P, which is the destination of the flow packets);

(3) a set of information indicating that the packet is a latency request packet;

(4) a current timestamp (referred to as the initial timestamp) provided by a clock on MPLB 702(A); and (5) a set of VLAN selection information (e.g. the ID of VLAN 1) indicating that VLAN 1 is to be used to transport the packet to the destination address.

If so desired, other sets of information may also be included in the latency request packet. These sets of information may include, for example, the flow label of the flow (this allows the latency request packet to be associated directly with the flow), a set of information indicating a priority level for the flow, and a set of information indicating which VLAN should be used to transport a latency response packet back to the path selection manager 804.

After composing the latency request packet, the path selection manager 804 forwards the packet to the communication manager 802 (FIG. 8) of MPLB 702(A), which in turn, sends the packet into the network 300. Because the latency request packet includes VLAN selection information specifying that VLAN 1 is to be used to transport the packet to the destination, the switches in the network 300 will switch the packet to the destination along the path provided by VLAN 1. Thus, the latency request packet will travel from MPLB 702(A) to switch a to switch i to switch q to switch o to switch h to finally arrive at MPLB 702(P) (it is assumed that reverse path learning has already taken place between the two MPLB's).

When the communication manager 802 of MPLB 702(P) receives the packet, it determines, based upon the information in the packet, that the packet is a latency request packet. Thus, it does not forward the packet on to node P. Rather, the communication manager 802 passes the packet to the path selection manager of MPLB 702(P) for further processing.

Seeing that the packet is a latency request packet, the path selection manager of MPLB 702(P) knows that it should compose a latency response packet in response to the latency request packet. In one embodiment, to do so, the path selection manager of MPLB 702(P) starts with the latency request packet, and makes changes and additions to it to transform it into a latency response packet. Specifically, in one embodiment, the path selection manager of MPLB 702(P) performs the following operations:

(1) take the source address specified in the latency request packet and make it the destination address of the latency response packet (this will cause the latency response packet to be sent back to MPLB 702(A);

(2) insert a source address into the latency response packet; in the current example, the inserted source address may be the address of MPLB 702(P) (since MPLB 702(P) is the source of the latency response packet); alternatively, the inserted source address may be an address that is recognized by all of the switches in the network 300 as being an address on which reverse path leaning should not be performed;

(3) change the information in the latency request packet to indicate that the packet is now a latency response packet rather than a latency request packet;

(4) store a new set of VLAN selection information in the latency response packet to indicate which VLAN is to be used to transport the latency response packet back to MPLB 702(A); this VLAN may be the same VLAN (VLAN 1) that was used to transport the latency request packet to MPLB 702(P), or it may be a different VLAN; thus, the latency request and latency response packets may travel along different paths; and (5) add one or more timestamps to the latency response packet; in one embodiment, the path selection manager of MPLB 702(P) adds two timestamps: (i) an arrived timestamp, which approximately indicates a time at which the latency request packet was received by the path selection manager of MPLB 702(P); and (ii) a return timestamp, which approximately indicates a time at which the path selection manager of MPLB 702(P) sends the latency response packet back to MPLB 702(A); in another embodiment, the path selection manager of MPLB 702(P) may add just one timestamp to the latency response packet; in such an embodiment, the timestamp may be either the arrived timestamp or the return timestamp; in either case, the timestamp(s) is/are provided by a clock on the MPLB 702(P).

In addition to the above information, the latency response packet may also include any information that was included in the latency request packet. This may include, for example, the initial timestamp provided by the clock on MPLB 702(A), the flow label of the flow, and the set of information indicating the priority level for the flow. This and other information may be included in the latency response packet.

After composing the latency response packet, the path selection manager of MPLB 702(P) forwards the packet to the communication manager 802 of MPLB 702(P), which in turn, sends the packet into the network 300. Eventually, the latency response packet is transported to MPLB 702(A) (again, it is assumed that reverse path learning has already taken place between the two MPLB's).

When the communication manager 802 of MPLB 702(A) receives the latency response packet, it determines, based upon the information in the packet, that it is a latency response packet. Thus, it does not pass the packet on to node A. Instead, it passes the packet on to the path selection manager 804 (the one on MPLB 702(A)) for further processing.

Upon receiving the latency response packet, the path selection manager 804 obtains a current timestamp (referred to as the received timestamp) from the clock on MPLB 702(A). Then, based upon the received timestamp and the various timestamps in the latency response packet, the path selection manager 804 determines the latencies for the path provided by VLAN 1.

Figure 11A:
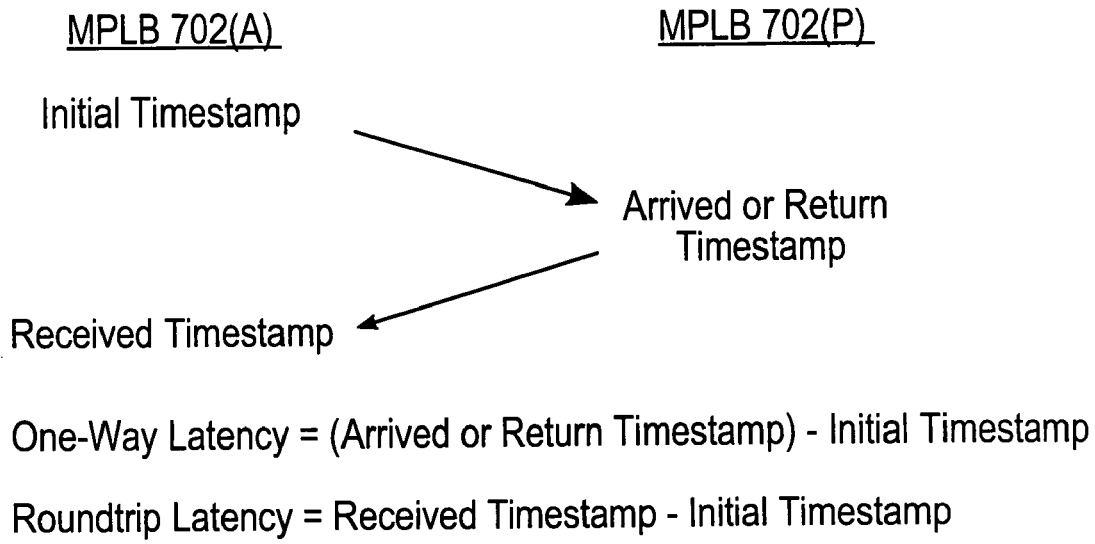
FIGS. 11A and 11B illustrate how latency values may be derived in accordance with one embodiment of the present invention.
Figure 11B:
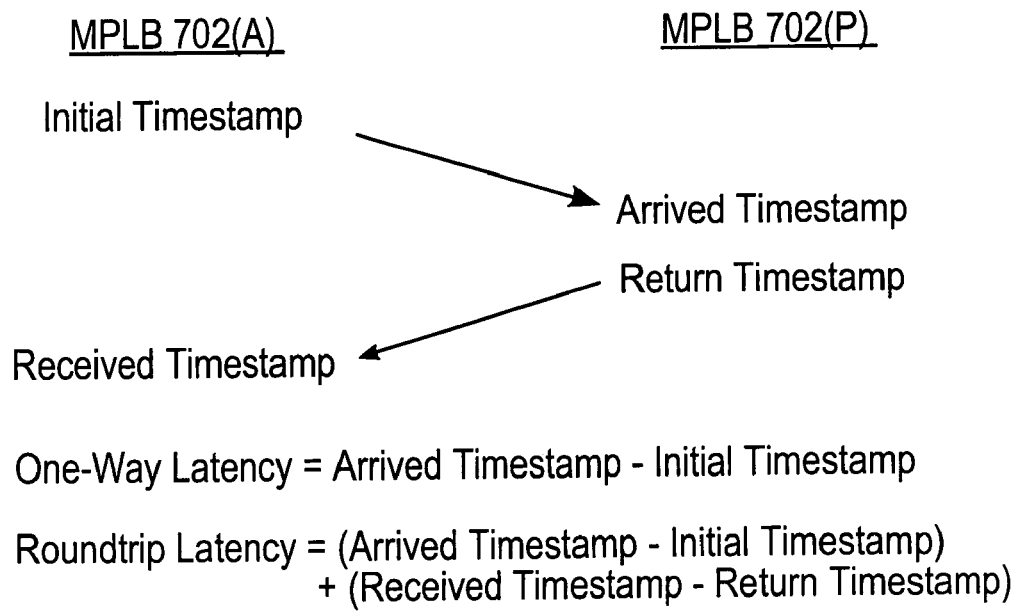

In the embodiment where the path selection manager on MPLB 702(P) provides only one timestamp (the arrived timestamp or the return timestamp), the latencies can be determined as shown in FIG. 11A. Namely, the one-way latency is derived by subtracting the initial timestamp from the arrived or return timestamp (whichever one is provided by the path selection manager on MPLB 702(P)). The roundtrip latency is derived by subtracting the initial timestamp from the received timestamp. In the embodiment where the path selection manager on MPLB 702(P) provides both an arrived timestamp and a return timestamp, the latencies can be derived as shown in FIG. 11B. Namely, the one-way latency is derived by subtracting the initial timestamp from the arrived timestamp. The roundtrip latency is derived by subtracting the initial timestamp from the arrived timestamp, and adding that difference to the difference derived by subtracting the return timestamp from the received timestamp. However it is derived, the one-way latency value indicates how much time is currently needed to transport a set of information from MPLB 702(A) to MPLB 702(P) along the path provided by VLAN 1. The roundtrip latency value indicates how much time is currently needed to transport a set of information from MPLB 702(A) to MPLB 702(P) along the path provided by VLAN 1, and back to MPLB 702(A) (along any path). In this manner, the path selection manager 804 is able to measure how much time is needed to transport information on the path provided by VLAN 1.

In one embodiment, the path selection manager 804 repeatedly sends latency request packets to MPLB 702(P) along the path provided by VLAN 1, and repeatedly receives latency response packets in response to these latency request packets. Thus, the path selection manager 804, over the life of the flow, derives a plurality of one-way latency values and a plurality of roundtrip latency values for the path provided by VLAN 1. Based on this plurality of latency values, the path selection manager is able to determine a plurality of values for the path provided by VLAN 1. In one embodiment, these values include an "average" one-way latency value (AOWL), an "average" roundtrip latency value (ARTL), and a latency variation value (LV). In one embodiment, these values may be derived as follows.

Deriving "Average" One-Way Latency

In one embodiment, the AOWL may be derived using the following equation:

$$AOWL = (1-\rho_L)*\text{previous AOWL} + \rho_L*\text{current one-way latency}.$$

In this equation, $\rho L$ is a constant that is used to weight the various components of the equation to give rise to a smooth "average". In one embodiment, $\rho L$ is a value that is between zero and one. For ease of implementation, $\rho L$ may be set to a value that is a factor of ½ (e.g. ¼, ⅛, 1/16, 1/32, etc.). The optimal value for $\rho L$ may differ from network to network and from implementation to implementation. Thus, the optimal value for $\rho L$ in any particular implementation may be determined experimentally.

To illustrate how this equation may be used, reference will be made to an example, which is a continuation of the above example. Suppose that, for the flow discussed in the above example, the path selection manager 804 has not yet sent any latency request packets. Suppose now that the path selection manager 804 sends a first latency request packet, and receives a first latency response packet. Based upon the received timestamp and the timestamp(s) in the first latency response packet, the path selection manager 804 derives a current one-way latency value for the path provided by VLAN 1 in the manner described in FIGS. 11A and 11B. Once the current one-way latency value is derived, it is multiplied by $\rho L$. This result is added to $(1-\rho L)*$previous AOWL. However, since there is no previous AOWL (this is the first time the AOWL is being derived for this flow), the value of $(1-\rho L)*$previous AOWL is zero. Thus, the newly computed AOWL is equal to $\rho L*$the current one-way latency value. In one embodiment, this new AOWL value is stored in the flow data structure.

Suppose now that the path selection manager 804 sends a second latency request packet, and receives a second latency response packet. Based upon the received timestamp and the timestamp(s) in the second latency response packet, the path selection manager 804 derives another current one-way latency value for the path provided by VLAN 1 in the manner described in FIGS. 11A and 11B. Once the current one-way latency value is derived, it is multiplied by $\rho L$. This result is added to $(1-\rho L)*$previous AOWL. In this case, the previous AOWL is the AOWL value that was previously stored in the flow data structure. After the value for $(1-\rho L)*$previous AOWL is computed, it is added to the value of $\rho L*$current one-way latency to derive the new AOWL. In one embodiment, this new AOWL value is stored in the flow data structure, overwriting the AOWL value that was previously stored therein.

Continuing the example, suppose that the path selection manager 804 sends a third latency request packet, and receives a third latency response packet. Based upon the received timestamp and the timestamp(s) in the third latency response packet, the path selection manager 804 derives another current one-way latency value for the path provided by VLAN 1 in the manner described in FIGS. 11A and 11B. Once the current one-way latency value is derived, it is multiplied by $\rho L$. This result is added to $(1-\rho L)*$previous AOWL. In this case, the previous AOWL is the AOWL value that was previously stored in the flow data structure. After the value for $(1-\rho L)*$previous AOWL is computed, it is added to the value of $\rho L*$current one-way latency to derive the new AOWL. In one embodiment, this new AOWL value is stored in the flow data structure, overwriting the AOWL value that was previously stored therein.

In one embodiment, the process described above is repeated for each set of latency request and latency response packets. As a result, the path selection manager 804 constantly updates the AOWL. Notice that the AOWL is not a true average of all of the one-way latency values (that is, it is not derived by summing up an n number of one-way latency values and then dividing the sum by n). Rather, it is more of a rolling, weighted average. Deriving the AOWL in this manner is simple and requires little storage; thus, from an implementation standpoint, it is advantageous. However, if so desired, the AOWL may be derived in any other desired manner. For purposes of the present invention, any desired methodology may be used to derive the AOWL.

Deriving "Average" Roundtrip Latency

In one embodiment, the ARTL may be derived using the following equation:

$$\text{ARTL}=(1-\rho_R)*\text{previous ARTL}+\rho_R*\text{current roundtrip latency.}$$

In this equation, $\rho R$ is a constant that is used to weight the various components of the equation to give rise to a smooth "average". In one embodiment, $\rho R$ is a value that is between zero and one. For ease of implementation, $\rho R$ may be set to a value that is a factor of $\frac{1}{2}$ (e.g. $\frac{1}{4}$, $\frac{1}{8}$, $\frac{1}{16}$, $\frac{1}{32}$, etc.). The optimal value for $\rho R$ may differ from network to network and from implementation to implementation. Thus, the optimal value for $\rho R$ in any particular implementation may be determined experimentally.

This equation may be used in a manner similar to that described above in connection with the equation for AOWL. Specifically, suppose that, for the flow discussed in the above example, the path selection manager 804 sends a first latency request packet, and receives a first latency response packet (these may be the same packets as those described above in connection with deriving the AOWL). Based upon the received timestamp and the timestamp(s) in the first latency response packet, the path selection manager 804 derives a current roundtrip latency value in the manner described in FIGS. 11A and 11B. Once the current roundtrip latency value is derived, it is multiplied by $\rho R$. This result is added to $(1-\rho R)*$previous ARTL. However, since there is no previous ARTL (this is the first time the ARTL is being derived for this flow), the value of $(1-\rho R)*$previous ARTL is zero. Thus, the newly computed ARTL is equal to $\rho R*$the current roundtrip latency value. In one embodiment, this new ARTL value is stored in the flow data structure.

Suppose now that the path selection manager 804 sends a second latency request packet, and receives a second latency response packet (these may be the same packets as those described above in connection with deriving the AOWL). Based upon the received timestamp and the timestamp(s) in the second latency response packet, the path selection manager 804 derives another current roundtrip latency value in the manner described in FIGS. 11A and 11B. Once the current roundtrip latency value is derived, it is multiplied by $\rho R$. This result is added to $(1-\rho R)*$previous ARTL. In this case, the previous ARTL is the ARTL value that was previously stored in the flow data structure. After the value for $(1-\rho R)*$previous ARTL is computed, it is added to the value of $\rho R*$current roundtrip latency to derive the new ARTL. In one embodiment, this new ARTL value is stored in the flow data structure, overwriting the ARTL value that was previously stored therein.

Continuing the example, suppose that the path selection manager 804 sends a third latency request packet, and receives a third latency response packet (these may be the same packets as those described above in connection with deriving the AOWL). Based upon the received timestamp and the timestamp(s) in the third latency response packet, the path selection manager 804 derives another current roundtrip latency value in the manner described in FIGS. 11A and 11B. Once the current roundtrip latency value is derived, it is multiplied by $\rho R$. This result is added to $(1-\rho R)*$previous ARTL. In this case, the previous ARTL is the ARTL value that was previously stored in the flow data structure. After the value for $(1-\rho R)*$previous ARTL is computed, it is added to the value of $\rho R*$current roundtrip latency to derive the new ARTL. In one embodiment, this new ARTL value is stored in the flow data structure, overwriting the ARTL value that was previously stored therein.

In one embodiment, the process described above is repeated for each set of latency request and latency response packets. As a result, the path selection manager 804 constantly updates the ARTL. Notice that the ARTL is not a true average of all of the roundtrip latency values (that is, it is not derived by summing up an n number of roundtrip latency values and then dividing the sum by n). Rather, it is more of a rolling, weighted average. Deriving the ARTL in this manner is simple and requires little storage; thus, from an implementation standpoint, it is advantageous. However, if so desired, the ARTL may be derived in any other desired manner. For purposes of the present invention, any desired methodology may be used to derive the AOWL.

Deriving Latency Variation

In one embodiment, the LV (latency variation) may be derived using the following equation:

$$\text{LV}=(1-\rho_v)*\text{previous LV}+\rho_v*|\text{current latency value}-\text{previous latency value}|.$$

This equation may be used to derive the latency variation for both one-way latency values and roundtrip latency values. If the equation is used to derive the latency variation for one-way latency values, then the "current latency value" in the equation would be the current one-way latency value, and the "previous latency value" would be the previous one-way latency value. If the equation is used to derive the latency variation for roundtrip latency values, then the "current latency value" in the equation would be the current roundtrip latency value, and the "previous latency value" would be the previous roundtrip latency value.

In this equation, ρV is a constant that is used to weight the various components of the equation. In one embodiment, ρV is a value that is between zero and one. For ease of implementation, ρV may be set to a value that is a factor of ½ (e.g. ¼, ⅛, 1/16, 1/32, etc.). The optimal value for ρV may differ from network to network and from implementation to implementation. Thus, the optimal value for ρV in any particular implementation may be determined experimentally.

To illustrate how this equation may be used, reference will be made to an example, which is a continuation of the above example. In the following example, the equation is used to determine the latency variation for the one-way latency values. It should be noted that the latency variation for roundtrip latency values may be derived in a similar way. Suppose that, for the flow discussed in the above example, the path selection manager 804 sends a first latency request packet, and receives a first latency response packet (these may be the same packets as those described above in connection with deriving the AOWL). Based upon the received timestamp and the timestamp(s) in the first latency response packet, the path selection manager 804 derives a current one-way latency value for the path provided by VLAN 1 in the manner described in FIGS. 11A and 11B. Once the current one-way latency value is derived, the path selection manager 804 obtains from the flow data structure a previous one-way latency value, and subtracts that previous one-way latency value from the current one-way latency value. In the current example, this is the first set of latency request/response packets, so there is no previous one-way latency value. Thus, the result of this subtraction is just the current one-way latency value. Thereafter, the absolute value of this subtraction result is multiplied by ρV. This result is added to (1−ρV)*previous LV. However, since there is no previous LV (this is the first time the LV is being derived for this flow), the value of (1−ρV)*previous LV is zero. Thus, the newly computed LV is equal to ρV*the current one-way latency value. In one embodiment, this new LV value and the current one-way latency value are stored in the flow data structure.

Suppose now that the path selection manager 804 sends a second latency request packet, and receives a second latency response packet (these may be the same packets as those described above in connection with deriving the AOWL). Based upon the received timestamp and the timestamp(s) in the second latency response packet, the path selection manager 804 derives another current one-way latency value for the path provided by VLAN 1 in the manner described in FIGS. 11A and 11B. After the current one-way latency value is derived, the path selection manager 804 obtains from the flow data structure the one-way latency value that was previously stored therein. This previous one-way latency value is subtracted from the current one-way latency value, and the absolute value of the result is multiplied by ρV. This result is added to (1−ρV)*previous LV. In this case, the previous LV is the LV value that was previously stored in the flow data structure. After the value for (1−ρV)*previous LV is computed, it is added to the value of ρV*|current latency value−previous latency value| to derive the new LV. In one embodiment, this new LV value is stored in the flow data structure, overwriting the LV value that was previously stored therein, and the current one-way latency value is stored in the flow data structure, overwriting the one-way latency value that was previously stored therein.

Continuing the example, suppose that the path selection manager 804 sends a third latency request packet, and receives a third latency response packet (these may be the same packets as those described above in connection with deriving the AOWL). Based upon the received timestamp and the timestamp(s) in the third latency response packet, the path selection manager 804 derives another current one-way latency value for the path provided by VLAN 1 in the manner described in FIGS. 11A and 11B. After the current one-way latency value is derived, the path selection manager 804 obtains from the flow data structure the one-way latency value that was previously stored therein. This previous one-way latency value is subtracted from the current one-way latency value, and the absolute value of the result is multiplied by ρV. This result is added to (1−ρV)*previous LV. In this case, the previous LV is the LV value that was previously stored in the flow data structure. After the value for (1−ρV)*previous LV is computed, it is added to the value of ρV*|current latency value−previous latency value| to derive the new LV. In one embodiment, this new LV value is stored in the flow data structure, overwriting the LV value that was previously stored therein, and the current one-way latency value is stored in the flow data structure, overwriting the one-way latency value that was previously stored therein. In one embodiment, the process described above is repeated for each set of latency request and latency response packets. As a result, the path selection manager 804 constantly updates the LV value. In the manner described, the path selection manager 804 can compute and maintain a latency variation value for the one-way latency values and/or the roundtrip latency values.

The above example provides just one way of computing the latency variation value(s). Many other methodologies may be used. For purposes of the present invention, the latency variation value(s) may be computed using any desired methodology.

Congestion Metric

Taken alone or together, the "average" latency value(s) (AOWL and/or ARTL) and the latency variation value(s) provide a congestion metric for the path provided by VLAN 1. This congestion metric in turn provides an indication as to how congested the path provided by VLAN 1 currently is. In one embodiment, the congestion metric for a path is derived by summing a multiple of an "average" latency value for that path with a multiple of a latency variation value for that path. Expressed in equation form, this would be:

Congestion Metric=$A$*"average"latency value+$B$*Latency Variation.

In this equation, A and B are configurable constants. In one embodiment, they are both set to 1; however, in some implementations, it may be desirable to set these constants to other values. The congestion metric for a path may be determined based upon one-way latency values or roundtrip latency values. If the congestion metric is determined based upon one-way latency values, then the equation would be:

Congestion Metric=$A$*AOWL+$B$*One-Way Latency Variation.

If the congestion metric is determined based upon roundtrip latency values, then the equation would be:

Congestion Metric=$A$*ARTL+$B$*Roundtrip Latency Variation.

Once a congestion metric is determined for a path, it can be compared with the congestion metric of another path to derive an imbalance metric. In one embodiment, this imbalance metric may be derived by subtracting one congestion metric from the other. This imbalance metric indicates the difference in congestion between the two paths. If this imbalance metric is large enough (e.g. exceeds a certain threshold), thereby indicating that another path is much less congested than a currently selected path, then it may be worthwhile for the path selection manager 804 to move the flow from the currently selected path to the other path. In one embodiment, a flow is moved from a currently selected path to another path if the following expression is true.

$A*$"average"latency value of current path$+B*$latency variation of current path$\geq C*$"average"latency value of other path$+D*$latency variation of other path.

In one embodiment, A=1, B=1, C=3, and D=−1. If so desired, other values may be used for these constants. This expression basically determines whether the difference in congestion metrics between a current path and another path is sufficiently large enough to justify moving a flow from the current path to the other path. If so, then the move may be made. As will be made clear in a later section, the movement of a flow from one path to another may not be immediate. Thus, the above expression may be true at the time the decision is made to move the flow, but it may no longer be true at the time the flow is actually moved. For this reason, in one embodiment, two thresholds are used. The first threshold is the above expression with A=1, B=1, C=3, and D=−1. The second threshold is the above expression with A=1, B=1, C=3/2, and D=−1/2. The first threshold is used to make the initial determination to move the flow. The second threshold (which is lower than the first threshold) is used at the time the flow is actually to be moved. If, at the time the flow is to be moved, the second threshold is not met, then the movement of the flow is aborted. This may occur, for example, if some other flows have already been moved from the current path to the other path so that the current path is no longer significantly more congested than the other path. If the move is aborted, then the flow simply remains on the current path. In this manner, the path selection manager 804 can determine whether to move a flow from a current path to another path.

The above example shows how the path selection manager 804 can determine a congestion metric for the path provided by VLAN 1. The same methodology may be used to determine the congestion metrics for each of the other paths provided by VLAN's 2-4. All that would need to be changed would be the set of VLAN selection information that is inserted into the latency request packets. For example, to determine the congestion metric for the path provided by VLAN 2, the path selection manager 804 would insert the ID for VLAN 2 into the latency request packets. This will cause the latency request packets to be transported from MPLB 702(A) to MPLB 702(P) along the path provided by VLAN 2, thereby enabling the latency values for that path to be measured.

Aggregate Congestion Metric

The above discussion addresses the embodiment in which a separate congestion metric is determined for each of the possible paths. To describe how an aggregate congestion metric may be determined for a plurality of paths, reference will be made to the following example, which is a continuation of the above example. In the following example, it will be assumed that the path provided by VLAN 1 is the path that is currently being used to forward packets associated with the flow to node P, and that the other available paths (the paths for which an aggregate congestion metric is to be determined) are the paths provided by VLAN's 2-4.

In one embodiment, the aggregate congestion metric for a plurality of paths may be determined using the same equations as those given above for Congestion Metric, AOWL, ARTL, and LV. The difference is that the values that are plugged into the equations are no longer values from just one of the paths but rather are values from multiple paths.

To illustrate, the AOWL value for the plurality of paths provided by VLAN's 2-4 may be computed as follows. Initially, the path selection manager 804 (the one on MPLB 702(A)) sends a latency request packet to MPLB 702(P) via the path provided by VLAN 2, and receives a latency response packet from MPLB 702(P). Based upon various timestamps, the path selection manager 804 determines (in the manner described previously) a current one-way latency value for the path provided by VLAN 2. This current one-way latency value is plugged into the equation for AOWL to derive an updated AOWL (this updated AOWL is stored). Thereafter, the path selection manager 804 sends another latency request packet to MPLB 702(P), this time via the path provided by VLAN 3, and receives another latency response packet from MPLB 702(P). Based upon various timestamps, the path selection manager 804 determines (in the manner described previously) a current one-way latency value for the path provided by VLAN 3. This current one-way latency value is plugged into the equation for AOWL, along with the stored updated AOWL, to derive another updated AOWL (this updated AOWL is stored). Thereafter, the path selection manager 804 sends another latency request packet to MPLB 702(P), this time via the path provided by VLAN 4, and receives another latency response packet from MPLB 702(P). Based upon various timestamps, the path selection manager 804 determines (in the manner described previously) a current one-way latency value for the path provided by VLAN 4. This current one-way latency value is plugged into the equation for AOWL, along with the stored updated AOWL, to derive another updated AOWL (this updated AOWL is stored). This process may be repeated to take into account multiple current one-way latency values from each of the paths provided by VLAN's 2-4. As can be seen, this AOWL is computed based upon one-way latency values from the various paths. Hence, it does not reflect the "average" one-way latency of any one path but rather the "average" one-way latency of the multiple paths. Consequently, it is an aggregate AOWL value for the multiple paths.

An aggregate ARTL value may be computed in a similar fashion. Specifically, the path selection manager 804 sends a latency request packet to MPLB 702(P) via the path provided by VLAN 2, and receives a latency response packet from MPLB 702(P). Based upon various timestamps, the path selection manager 804 determines (in the manner described previously) a current roundtrip latency value for the path provided by VLAN 2. This current roundtrip latency value is plugged into the equation for ARTL to derive an updated ARTL (this updated ARTL is stored). Thereafter, the path selection manager 804 sends another latency request packet to MPLB 702(P), this time via the path provided by VLAN 3, and receives another latency response packet from MPLB 702(P). Based upon various timestamps, the path selection manager 804 determines (in the manner described previously) a current roundtrip latency value for the path provided by VLAN 3. This current roundtrip latency value is plugged into the equation for ARTL, along with the stored updated ARTL, to derive another updated ARTL (this updated ARTL is stored). Thereafter, the path selection manager 804 sends another latency request packet to MPLB 702(P), this time via the path provided by VLAN 4, and receives another latency response packet from MPLB 702(P). Based upon various timestamps, the path selection manager 804 determines (in the manner described previously) a current roundtrip latency value for the path provided by VLAN 4. This current roundtrip latency value is plugged into the equation for ARTL, along with the stored updated ARTL, to derive another updated ARTL (this updated ARTL is stored). This process may be repeated to take into account multiple current roundtrip latency values from each of the paths provided by VLAN's 2-4. As can be seen, this ARTL is computed based upon roundtrip latency values from the various paths. Hence, it is an aggregate ARTL that reflects the "average" roundtrip latency values on those multiple paths.

An aggregate LV value may be computed in a similar fashion. In the following example, the LV equation is used to determine the latency variation for one-way latency values, but it should be noted that the latency variation for roundtrip latency values may be derived in a similar fashion. Initially, the path selection manager 804 sends a latency request packet to MPLB 702(P) via the path provided by VLAN 2, and receives a latency response packet from MPLB 702(P). Based upon various timestamps, the path selection manager 804 determines (in the manner described previously) a current one-way latency value for the path provided by VLAN 2. This current one-way latency value is plugged into the equation for LV to derive an updated LV. The current one-way latency value for the path provided by VLAN 2 is stored as the previous one-way latency value, and the updated LV is stored as well. Thereafter, the path selection manager 804 sends another latency request packet to MPLB 702(P), this time via the path provided by VLAN 3, and receives another latency response packet from MPLB 702(P). Based upon various timestamps, the path selection manager 804 determines (in the manner described previously) a current one-way latency value for the path provided by VLAN 3. This current one-way latency value is plugged into the equation for LV, along with the previous one-way latency value and the stored updated LV, to derive another updated LV. The current one-way latency value for the path provided by VLAN 3 is stored as the previous one-way latency value, and the updated LV is stored as well. Thereafter, the path selection manager 804 sends another latency request packet to MPLB 702(P), this time via the path provided by VLAN 4, and receives another latency response packet from MPLB 702(P). Based upon various timestamps, the path selection manager 804 determines (in the manner described previously) a current one-way latency value for the path provided by VLAN 4. This current one-way latency value is plugged into the equation for LV, along with the previous one-way latency value and the stored updated LV, to derive another updated LV. The current one-way latency value for the path provided by VLAN 4 is stored as the previous one-way latency value, and the updated LV is stored as well. This process may be repeated to take into account multiple current one-way latency values from each of the paths provided by VLAN's 2-4. As can be seen, this LV is computed based upon one-way latency values from the various paths. Hence, it is an aggregate LV that reflects the "average" latency variation across the multiple paths.

After the aggregate AOWL, ARTL, and LV values are determined, they may be inserted into the Congestion Metric equation to compute the aggregate congestion metric for the plurality of paths provided by VLAN's 2-4. This aggregate congestion metric reflects an "average" congestion across the multiple paths. In the manner described, an aggregate congestion metric may be determined for a plurality of paths.

Determining and Using Clock Offset Value

In the above discussion, various timestamps are used to determine the latency values. Some of these timestamps (e.g. the initial timestamp and the received timestamp) are provided by the clock on MPLB 702(A), while other timestamps (e.g. the arrived timestamp and the return timestamp) are provided by the clock on MPLB 702(P). If these two clocks are synchronized, then the one-way latency values derived from these timestamps will be accurate. However, if the clocks are not synchronized, then the one-way latency values will be off by the difference in the clocks. For example, if the clock on MPLB 702(P) is faster than the clock on MPLB 702(A) by 300 milliseconds, then the derived one-way latency values will be 300 milliseconds longer than they should be, which will make the path appear to be slower than it is. Unfortunately, in most implementations, it is very difficult if not impossible to keep all of the clocks on all of the components in a network synchronized. As a result, clock offsets are almost inevitable.

In one embodiment, the path selection manager 804 compensates for clock offset by determining at least an approximation of the clock offset value between two clocks, and then taking this clock offset value into account when determining one-way latency values. By doing so, the path selection manager 804 is able to derive more accurate measurements of absolute one-way latency values.

To illustrate how a clock offset value may be determined in accordance with one embodiment of the present invention, reference will again be made to the above example. As described above, the path selection manager 804 (the one on MPLB 702(A)) sends a latency request packet to MPLB 702(P) along the path provided by VLAN 1. When the path selection manager 804 receives a latency response packet in response to this latency request packet, the path selection manager 804 obtains a received timestamp from the clock on MPLB 702(A). Based upon the received timestamp and the one or more timestamps in the latency response packet (e.g. initial timestamp, arrived timestamp, return timestamp), the path selection manager 804 determines a current roundtrip latency value (this roundtrip latency value may be derived in the manner described above with reference to FIGS. 11*a* and 11*b*).

In one embodiment, after the current roundtrip latency value is derived, the path selection manager 804 determines whether the current roundtrip latency value is less than a previously established minimum roundtrip latency value. The previously established minimum roundtrip latency value may be stored within the flow data structure or in some other data structure, and is initially set to a high value. If the current roundtrip latency value is less than the previously established minimum roundtrip latency value, then the path selection manager 804 will perform a clock offset computation. Before or after the clock offset computation is performed, the path selection manager 804 overwrites the previously established minimum roundtrip latency value with the current roundtrip latency value. This establishes the current roundtrip latency value as the new previously established minimum roundtrip latency value for future calculations.

To compute the clock offset value, the path selection manager 804 initially determines an estimated one-way latency value for the path provided by VLAN 1. In one embodiment, the path selection manager 804 derives this estimated one-way latency value by dividing the current roundtrip latency value by two (if so desired, the estimated one-way latency value may be derived using some other computation). This estimation assumes that it takes approximately the same amount of time to travel from MPLB 702(A) to MPLB 702(P) along the path provided by VLAN 1 as it does to travel from MPLB 702(P) back to MPLB 702(A). In this regard, the use of the minimum roundtrip latency value (which the current roundtrip latency value is) is significant because it is likely to produce the least amount of estimation error in the estimated one-way latency value.

Figure 12A:
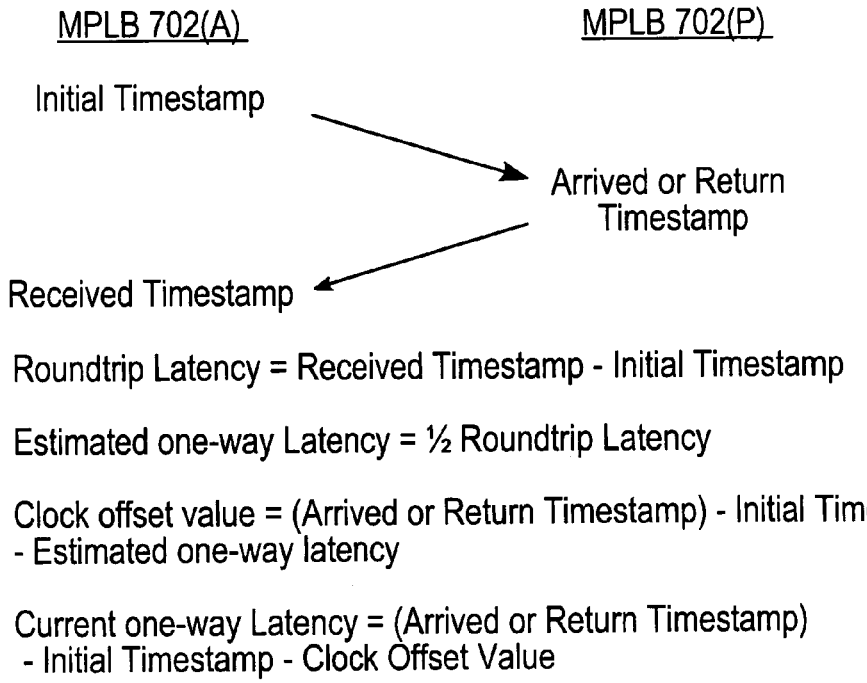
FIGS. 12A and 12B illustrate how a clock offset value and latency values may be derived in accordance with one embodiment of the present invention.

Once the estimated one-way latency value is calculated, the estimated clock offset value between the clocks on MPLB 702(A) and MPLB 702(P) may be computed as follows. In the embodiment where the path selection manager on MPLB 702(P) provides only one timestamp (the arrived timestamp or the return timestamp) in the latency request packet, the following equation may be used to compute the clock offset value:

Clock offset value=(AT or RT)−IT−estimated one-way latency value;

where AT is the arrived timestamp (if any) specified in the latency response packet, RT is the return timestamp (if any) specified in the latency response packet, and IT is the initial timestamp specified in the latency response packet (see FIG. 12A).

Figure 12B:
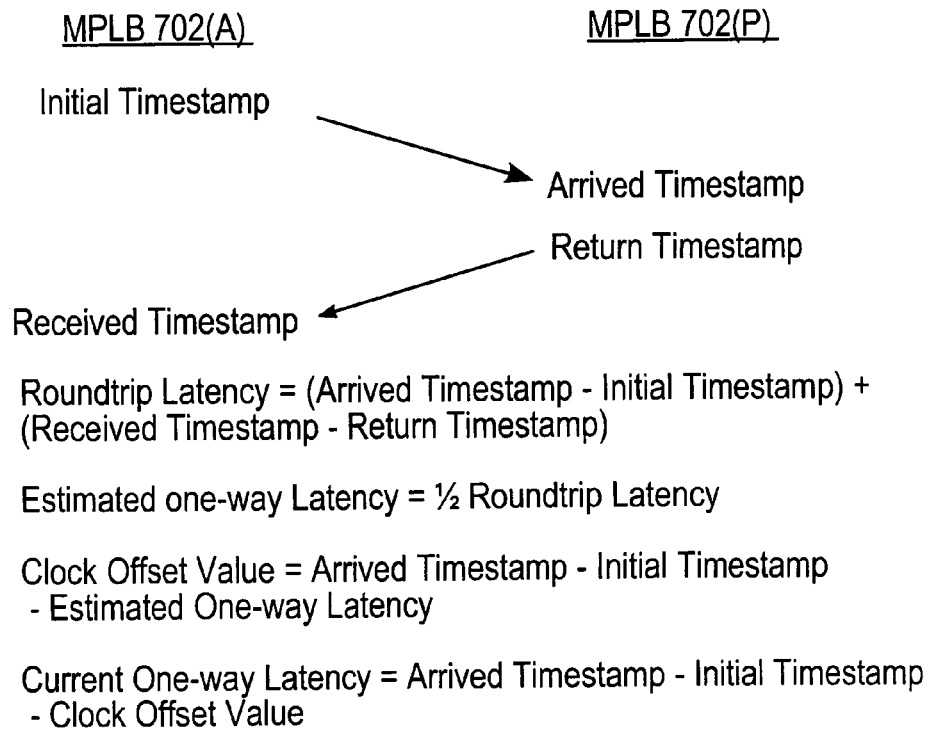

In the embodiment where the path selection manager on MPLB 702(P) provides both an arrived timestamp and a return timestamp in the latency response packet, the following equation may be used to compute the clock offset value:

Clock offset value=AT−IT−estimated one-way latency value;

where AT is the arrived timestamp specified in the latency response packet and IT is the initial timestamp specified in the latency response packet (see FIG. 12B).

It should be noted that this clock offset value is an estimation of the actual clock offset between the clocks on MPLB 702(A) and MPLB 702(P). Nonetheless, it can be used effectively to derive more accurate one-way latency values. The clock offset value may be used as follows.

In the embodiment where the path selection manager on MPLB 702(P) provides only one timestamp (the arrived timestamp or the return timestamp) in the latency response packet, the following equation may be used to derive the current one-way latency value for the path provided by VLAN 1:

Current one-way latency value=(AT or RT)−IT−clock offset value;

where AT is the arrived timestamp (if any) specified in the latency response packet, RT is the return timestamp (if any) specified in the latency response packet, and IT is the initial timestamp specified in the latency response packet (again, see FIG. 12A).

In the embodiment where the path selection manager on MPLB 702(P) provides both an arrived timestamp and a return timestamp in the latency response packet, the following equation may be used to derive the current one-way latency value for the path provided by VLAN 1:

Current one-way latency value=AT−IT−clock offset value;

where AT is the arrived timestamp specified in the latency response packet and IT is the initial timestamp specified in the latency response packet (again, see FIG. 12B).

By calculating the clock offset value, and by taking it into account in this manner, the path selection manager 804 is able to derive much more accurate absolute one-way latency values for a path. These more accurate absolute one-way latency values in turn may be used to derive more accurate AOWL values, and more accurate one-way latency variation values.

In one embodiment, after the clock offset value is computed, it is stored in either the flow data structure or another data structure for future reference. In a future sending of a latency request packet and receiving of a latency response packet, the calculated roundtrip latency value for that latency response packet may not be less than the previously established minimum roundtrip latency value. In such a case, the path selection manager 804 will not recalculate the clock offset value. Instead, it will access the clock offset value calculated above and use it to derive the one-way latency value for that latency response packet. Thus, once calculated, the clock offset value may be used over and over again.

In addition to having clock offset, multiple clocks may also have clock drift. That is, their clock offset may change over time. For example, at time X, the clock on MPLB 702(P) may be faster than the clock on MPLB 702(A) by 300 milliseconds but at time Y, it may be faster by 600 milliseconds. To correct for this clock drift, the path selection manager 804, in one embodiment, periodically increases the previously established minimum roundtrip latency value. The larger the previously established minimum roundtrip latency value becomes, the more likely it will be that a calculated roundtrip latency value for a latency response packet will be smaller than the previously established minimum roundtrip latency value. This in turn makes it more likely that the clock offset value will be recalculated. When the clock offset value is recalculated, the clock drift will be detected and compensated for.

Controlling the Number of Latency Packets

As noted previously, over the life of the flow, the path selection manager 804 may send a large number of latency request packets and receive a large number of latency response packets. The sending and receiving of these latency packets has the potential of flooding and hence overburdening the network. In one embodiment, to prevent this from happening, the path selection manager 804 limits the number of latency request packets that are sent.

In one embodiment, the path selection manager 804 determines the number of latency request packets to send based upon the rate of the flow. Specifically, the path selection manager 804 determines a rate for the flow (i.e. the rate at which information associated with the flow is received from node A and forwarded to node P). Then, it limits the sending of the latency request packets to a rate that is a certain percentage of the rate of the flow. Thus, if the rate of the flow is X, then the rate at which the latency request packets are sent will be a certain percentage of X (1 to 3 percent, for example). By maintaining proportionality between the rate of the flow and the rate of the latency request packets, the path selection manager 804 ensures that the latency request packets will not flood or overburden the network.

As an alternative, the path selection manager 804 may keep a count of how much information (in terms of bits or bytes) has been received and forwarded for the flow. At one or more certain points, a determination is made as to whether the information count has reached a certain amount. When the count reaches a certain amount, a latency request packet is sent. At that point, the count is cleared, and the counting of information restarts. When the count again reaches a certain amount, another latency request packet is sent, and the count is restarted. By metering the latency request packets in this manner, the path selection manager 804 ensures that the network traffic generated by the latency request packets will be kept in proportion to the network traffic generated by the flow. These and other methods may be used to control the number of latency request packets that are sent by the path selection manager 804.

Moving a Flow Without Requiring Packet Reordering

As noted previously, when traffic conditions warrant, the path selection manager 804 may move a flow from one path to another. When a flow is moved from one path to another, there is a potential that the packets of the flow may arrive at the destination out of order. To illustrate, suppose that a packet of a flow is forwarded to a destination along a first path. Suppose further that after forwarding that packet, the path selection manager 804 decides to move the flow to a second path. When the path selection manager 804 receives the next packet in that flow, it will forward that packet to the destination along the second path. When that happens, a race condition arises. If conditions are right, the packet sent along the second path may arrive at the destination before the packet sent along the first path. In such a case, the packets will be out of order, which will require the destination to reorder the packets. Packet reordering is burdensome and adds overhead and complexity; thus, if possible, it is desirable to avoid it.

In one embodiment of the present invention, the path selection manager 804 moves a flow from one path to another in such a manner that it is ensured that the packets of the flow will not arrive at the destination out of order. Thus, it is ensured that the destination will not have to perform packet reordering.

To illustrate how this may be done in accordance with one embodiment of the present invention, reference will again be made to the above example. Initially, the path selection manager 804 (the one on MPLB 702(A)) forwards packets associated with the flow to node P along the path provided by VLAN 1. Suppose at some point that the path selection manager 804 determines that the flow should be moved to the path provided by VLAN 4. In one embodiment, after making this determination, the path selection manager 804 does not immediately update the flow data structure to indicate VLAN 4 instead of VLAN 1; hence, it does not immediately start sending packets associated with the flow along the path provided by VLAN 4. Rather, the path selection manager 804 first sends a request packet to MPLB 702(P) along the path provided by VLAN 1. This request packet may be one of the latency request packets discussed above. In one embodiment, at the time that it sends the request packet, the path selection manager 804 sets a "path clear" flag.

At some point, the path selection manager on MPLB 702 (P) will receive the request packet. When it does so, the path selection manager on MPLB 702(P) composes and sends a response packet back to MPLB 702(A). This response packet may be one of the latency response packets discussed previously.

When the path selection manager 804 (the one on MPLB 702(A)) receives the response packet, it determines whether the "path clear" flag is still set. In one embodiment, this flag will still be set if no packets associated with the flow were received and forwarded by the path selection manager 804 between the sending of the request packet and the receiving of the response packet. If the "path clear" flag is still set, then it means that all previously sent flow packets have reached MPLB 702(A). In such a case, it is known that the path is clear of flow packets; thus, the path selection manager 804 can move the flow to the path provided by VLAN 4, knowing that no packet reordering will need to be done by the destination. Thus, at that point, the path selection manager 804 updates the flow data structure to replace the ID for VLAN 1 with the ID for VLAN 4. Future packets associated with the flow will be forwarded to the destination via the path provided by VLAN 4 instead of the path provided by VLAN 1.

On the other hand, if the "path clear" flag is no longer set, then it means that one or more intervening flow packets were received and forwarded by the path selection manager 804 between the sending of the request packet and the receiving of the response packet. In such a case, the path selection manager 804 will repeat the above process. Namely, it will send another request packet, set the "path clear" flag, receive another response packet, and check to see if the "path clear" flag is still set at that time. Until it encounters an instance in which a request packet is received and the "path clear" flag is still set, the path selection manager 804 will not move the flow onto the path provided by VLAN 4.

In one embodiment, when the path selection manager 804 (the one on MPLB 702(A)) receives a packet associated with the flow, it checks the "path clear" flag. If the flag is set, it clears the flag (thereby indicating that the path is no longer clear). It then sends the packet to node P along the path provided by VLAN 1 (this is so despite the fact that the path selection manager 804 has already determined that the flow should be moved to the path provided by VLAN 4). By doing so, the path selection manager 804 in effect causes the path provided by VLAN 1 to still be used. It will continue to use the path provided by VLAN 1 until it can move the flow to the path provided by VLAN 4 in such a manner that it is ensured that the destination will not need to perform packet reordering.

Using Latencies to Determine Link Failure Timeout Period

As described previously, the path selection manager 804 can use latency request packets and latency response packets to determine a plurality of latency values for a path. With these latency values, the path selection manager 804 can derive an estimated latency value for that path. For example, the plurality of latency values may be averaged to give rise to the estimated latency value. These and other methods may be used to derive the estimated latency value. In one embodiment of the present invention, this estimated latency value may be used to derive a more accurate link failure timeout period that will enable link failures to be detected more quickly and accurately.

To elaborate, a link failure is typically detected by sending a packet to a receiving node along a certain path, and then waiting for a response. If the response is not received within a certain timeout period, then it is concluded that a link failure has occurred. Typically, the timeout period is a static value that is pre-established by a network administrator. This static value has no correlation with the actual performance of any path at any time. If the timeout period is set too short, then there will be an excessive number of false positives (i.e. false conclusions that a link failure has occurred when it actually has not). To avoid this result, most administrators set the timeout period to a long period. The problem with this approach is that the link failure will not be detected for a long period of time. Thus, reaction to the link failure will be undesirably slow.

To enable link failures to be detected more quickly and accurately, one embodiment of the present invention derives a link failure timeout period for a path based upon the estimated latency value for that path. For purposes of the present invention, the estimated latency value may be an estimated one-way latency value or an estimated roundtrip latency value. Because each path may perform differently, each path may have a different link failure timeout period. In one embodiment, the link failure timeout period is set to a value that is a multiple of the estimated latency value (for example, the multiple may be in the range of 10 to 30). Because this link failure timeout period is determined based upon the actual latency on a path, it will provide a more realistic and accurate timeout period with which to judge whether a link has failed or not. If the proper multiple is used for the proper network, then the optimal link failure timeout period will be derived which will enable link failures to be determined with fewer, if any, false positives, and link failures to be detected faster. Also, as the latency on the path changes, the link failure timeout period also changes. As a result, the link failure timeout period adapts to the performance changes of the path.

In accordance with one embodiment of the present invention, link failure may be detected as follows. Initially, the path selection manager 804 sends a plurality of latency request packets to another component (e.g. MPLB 702(P) of FIG. 7) in the network 300 along a particular path (e.g. the path provided by VLAN 1). The path selection manager 804 also receives a plurality of latency response packets from the other component. Based upon various timestarnps, and in the manner described above, the path selection manager 804 determines from these latency response packets a plurality of latency values. Based upon these latency values, the path selection manager 804 determines an estimated latency value (for example, by averaging the latency values). Then, based upon the estimated latency value, the path selection manager 804 determines a link failure timeout period (for example, by multiplying the estimated latency value by a certain factor).

Thereafter, the path selection manager 804 sends another latency request packet to the other component along the same path. If the path selection manager 804 determines that a latency response packet, which should be sent by the other component in response to the latency request packet, has not been received prior to expiration of the link failure time period, then the path selection manager 804 concludes that a link failure has occurred. At that point, the path selection manager 804 can take whatever steps are necessary (e.g. moving a flow onto another path) to react to the link failure. By using a link failure timeout period that reflects the actual latency on a path, the path selection manager 804 is able to detect link failures more quickly and accurately.

Flow Control at Network Border

Most switches in a network have the ability to instruct an upstream component (e.g. an upstream switch) to stop sending packets, or at least, to slow down the rate at which packets are being sent. A switch may do this, for example, when it detects that its buffers are full or are about to be full, and if the packet reception rate is not decreased, then the switch will have to start dropping packets. The problem with a switch within the heart of a network exercising this capability is that it can lead to a chain reaction of switches exercising this capability. For example, a switch may instruct an upstream switch to stop sending packets to it, which may cause that switch to instruct an upstream switch to stop sending packets to it, which may cause that switch to instruct an upstream switch to stop sending packets to it, and so forth. Under certain conditions, this chain reaction may cause the overall network to become gridlocked.

To prevent this from occurring, one embodiment of the present invention exercises flow control at the border of the network. More specifically, in one embodiment, it is the path selection managers (on either the MPLB's 702 or the network interfaces 502) that exercise flow control. To illustrate how this can be done, reference will again be made to the example discussed previously, in which: (1) node A (FIG. 7) sends a plurality of packets associated with a flow to MPLB 702(A); (2) all of the packets of the flow are destined for node P; and (3) the path selection manager 804 (the one on MPLB 702(A)) has selected the path provided by VLAN 1 to be the path to use to transport the packets to node P.

In such a scenario, the path selection manager 804 receives the flow packets from node A at a particular flow rate, and forwards the flow packets to node P via the path provided by VLAN 1. As the path selection manager 804 is doing so, it determines a congestion metric for the path provided by VLAN 1 (in the manner described previously). Part of the congestion metric will be one or more latency values for the path provided by VLAN 1. Based at least partially upon this congestion metric, the path selection manager 804 determines whether a certain congestion threshold has been reached. This congestion threshold may, for example, be a certain latency value. For instance, suppose that the path selection manager 804 is aware that the latency on the path provided by VLAN 1 can only get so high before the switches in that path start dropping packets. In such a case, the latency value at which the switches start dropping packets may be the congestion threshold. If the path selection manager 804 determines that the congestion on the path provided by VLAN 1 has reached this congestion threshold, then it instructs the source (node A in this example) to stop sending flow packets, or at least, to slow the rate at which the flow packets are being sent. In one embodiment, as part of this instruction, the path selection manager 804 may provide to node A sufficient information for node A to specifically identify the flow. That way, node A can stop sending packets, or slow down the sending of packets, just for that flow. By exercising flow control in this manner, the path selection manager 804 ensures that the network 300 will not become overly congested, which in turn, eliminates the need for the switches within the network 300 to exercise flow control. Thus, gridlock caused by a chain reaction of switches exercising flow control is prevented.

At this point, it should be noted that although the invention has been described with reference to one or more specific embodiments, it should not be construed to be so limited. Various modifications may be made by those of ordinary skill in the art with the benefit of this disclosure without departing from the spirit of the invention. For example, the network 300 shown in FIG. 3 is just a sample network. This switching topology can be extended to include more switches, to switches with fewer or more ports, to fewer or more hierarchical levels of switches, to fewer or more VLAN's and VLAN paths, etc. These and other modifications and extensions are possible. Thus, the invention should not be limited by the specific embodiments used to illustrate it but only by the scope of the issued claims and the equivalents thereof.

What is claimed is:

1. A method for implementing dynamic load balancing, comprising:

dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components, the plurality of possible paths resulting a plurality of overlapping loop-free topologies having been established within the Layer 2 network in which each of the plurality of components is reachable by any other of the plurality of components via each of the plurality of overlapping loop-free topologies;

forwarding the one or more initial packets associated with the flow from the first component to the second component via the particular path, wherein the particular path is one of the plurality of possible paths in the Layer 2 network between the first component and the second component;

determining a congestion metric for the particular path;

determining a congestion metric for a set of one or more other paths, wherein the set of one or more other paths comprise a subset of the plurality of possible paths between the first component and the second component;

determining, based at least partially upon the congestion metric for the particular path and the congestion metric for the set of one or more other paths, whether the flow should be moved; and in response to a determination that the flow should be moved, moving the flow from the particular path to an alternate path in the Layer 2 network associated with a second loop-free topology of the plurality of overlapping loop-free topologies such that at least some future packets associated with the flow are forwarded from the first component to the second component via the alternate path instead of the particular path, wherein the alternate path is a path in the set of one or more other paths.

2. The method of claim 1, wherein the congestion metric for the particular path is determined mid-flow such that the congestion metric for the particular path is determined while packets associated with the flow are still being forwarded from the first component to the second component.

3. The method of claim 2, wherein the congestion metric for the set of one or more other paths is determined mid-flow such that the congestion metric for the set of one or more other paths is determined while packets associated with the flow are still being forwarded from the first component to the second component.

4. The method of claim 1, wherein the network comprises a plurality of virtual networks including a particular virtual network that provides the particular path between the first component and the second component, and another virtual network that provides the alternate path between the first component and the second component, and wherein moving the flow from the particular path to the alternate path comprises:

moving the flow from the particular virtual network to the other virtual network.

5. The method of claim 4, wherein each of the particular virtual network and the other virtual network is a loop-free, reverse path learning network.

6. The method of claim 4, wherein the flow has a corresponding flow data structure, wherein the flow data structure contains a virtual network indicator that currently indicates that the particular virtual network is to be used for forwarding packets associated with the flow from the first component to the second component, and wherein moving the flow from the particular virtual network to the other virtual network comprises:

updating the virtual network indicator in the flow data structure to indicate the other virtual network instead of the particular virtual network.

7. The method of claim 1, wherein the set of one or more other paths consists of just the alternate path, so that determining the congestion metric for the set of one or more other paths comprises determining a congestion metric for the alternate path.

8. The method of claim 7, wherein the congestion metric for the particular path comprises a latency component which includes a one-way latency value for the particular path which indicates how much time is needed for a set of information to travel from the first component to the second component along the particular path, and wherein the congestion metric for the alternate path comprises a latency component which includes a one-way latency value for the alternate path which indicates how much time is needed for a set of information to travel from the first component to the second component along the alternate path.

9. The method of claim 8, wherein the congestion metric for the particular path further comprises a latency variation component which indicates variation in one-way latency values on the particular path, and wherein the congestion metric for the alternate path further comprises a latency variation component which indicates variation in one-way latency values on the alternate path.

10. The method of claim 7, wherein the congestion metric for the particular path comprises a latency component which includes a roundtrip latency value for the particular path which indicates how much time is needed for a set of information to travel from the first component to the second component along the particular path and back to the first component, and wherein the congestion metric for the alternate path comprises a latency component which includes a roundtrip latency value for the alternate path which indicates how much time is needed for a set of information to travel from the first component to the second component along the alternate path and back to the first component.

11. The method of claim 10, wherein the congestion metric for the particular path further comprises a latency variation component which indicates variation in roundtrip latency values on the particular path, and wherein the congestion metric for the alternate path further comprises a latency variation component which indicates variation in roundtrip latency values on the alternate path.

12. The method of claim 7, wherein determining whether the flow should be moved comprises:

computing an imbalance metric based at least partially upon the congestion metric for the particular path and the congestion metric for the alternate path, wherein the imbalance metric indicates a degree of load imbalance between the particular path and the alternate path.

13. The method of claim 12, wherein determining whether the flow should be moved further comprises:

determining whether the imbalance metric exceeds a threshold.

14. The method of claim 12, wherein the congestion metric for the particular path comprises a latency component which includes a one-way latency value for the particular path which indicates how much time is needed for a set of information to travel from the first component to the second component along the particular path, and wherein the congestion metric for the alternate path comprises a latency component which includes a one-way latency value for the alternate path which indicates how much time is needed for a set of information to travel from the first component to the second component along the alternate path.

15. The method of claim 14, wherein the congestion metric for the particular path further comprises a latency variation component which indicates variation in one-way latency values on the particular path, and wherein the congestion metric for the alternate path further comprises a latency variation component which indicates variation in one-way latency values on the alternate path.

16. The method of claim 12, wherein the congestion metric for the particular path comprises a latency component which includes a roundtrip latency value for the particular path which indicates how much time is needed for a set of information to travel from the first component to the second component along the particular path and back to the first component, and wherein the congestion metric for the alternate path comprises a latency component which includes a roundtrip latency value for the alternate path which indicates how much time is needed for a set of information to travel from the first component to the second component along the alternate path and back to the first component.

17. The method of claim 16, wherein the congestion metric for the particular path further comprises a latency variation component which indicates variation in roundtrip latency values on the particular path, and wherein the congestion metric for the alternate path further comprises a latency variation component which indicates variation in roundtrip latency values on the alternate path.

18. The method of claim 1, wherein the set of one or more other paths comprises a plurality of other paths, including the alternate path, and wherein determining the congestion metric for the set of one or more other paths comprises determining an aggregate congestion metric for the plurality of other paths, wherein the aggregate congestion metric reflects congestion across the plurality of other paths.

19. The method of claim 18, wherein the aggregate congestion metric reflects an average congestion across the plurality of other paths.

20. The method of claim 18, wherein the congestion metric for the particular path comprises a latency component which includes a one-way latency value for the particular path which indicates how much time is needed for a set of information to travel from the first component to the second component along the particular path, and wherein the aggregate congestion metric comprises a latency component which includes an aggregate one-way latency value for the plurality of other paths, wherein the aggregate one-way latency value is derived from one-way latency values from each of the plurality of other paths.

21. The method of claim 20, wherein the congestion metric for the particular path further comprises a latency variation component which indicates variation in one-way latency values on the particular path, and wherein the aggregate congestion metric further comprises a latency variation component which indicates variation in aggregate one-way latency values for the plurality of other paths.

22. The method of claim 18, wherein the congestion metric for the particular path comprises a latency component which includes a roundtrip latency value for the particular path which indicates how much time is needed for a set of information to travel from the first component to the second component along the particular path and back to the first component, and wherein the aggregate congestion metric comprises a latency component which includes an aggregate roundtrip latency value for the plurality of other paths, wherein the aggregate roundtrip latency value is derived from roundtrip latency values from each of the plurality of other paths.

23. The method of claim 22, wherein the congestion metric for the particular path further comprises a latency variation component which indicates variation in roundtrip latency values on the particular path, and wherein the aggregate congestion metric further comprises a latency variation component which indicates variation in aggregate roundtrip latency values for the plurality of other paths.

24. The method of claim 18, wherein determining whether the flow should be moved comprises:
 computing an imbalance metric based at least partially upon the congestion metric for the particular path and the aggregate congestion metric for the plurality of other paths, wherein the imbalance metric indicates a degree of load imbalance between the particular path and the plurality of other paths.

25. The method of claim 24, wherein determining whether the flow should be moved further comprises:

determining whether the imbalance metric exceeds a threshold.

26. The method of claim 24, wherein the congestion metric for the particular path comprises a latency component which includes a one-way latency value for the particular path which indicates how much time is needed for a set of information to travel from the first component to the second component along the particular path, and wherein the aggregate congestion metric comprises a latency component which includes an aggregate one-way latency value for the plurality of other paths, wherein the aggregate one-way latency value is derived from one-way latency values from each of the plurality of other paths.

27. The method of claim 26, wherein the congestion metric for the particular path further comprises a latency variation component which indicates variation in one-way latency values on the particular path, and wherein the aggregate congestion metric further comprises a latency variation component which indicates variation in aggregate one-way latency values for the plurality of other paths.

28. The method of claim 24, wherein the congestion metric for the particular path comprises a latency component which includes a roundtrip latency value for the particular path which indicates how much time is needed for a set of information to travel from the first component to the second component along the particular path and back to the first component, and wherein the aggregate congestion metric comprises a latency component which includes an aggregate roundtrip latency value for the plurality of other paths, wherein the aggregate roundtrip latency value is derived from roundtrip latency values from each of the plurality of other paths.

29. The method of claim 28, wherein the congestion metric for the particular path further comprises a latency variation component which indicates variation in roundtrip latency values on the particular path, and wherein the aggregate congestion metric further comprises a latency variation component which indicates variation in aggregate roundtrip latency values for the plurality of other paths.

30. The method of claim 18, wherein moving the flow from the particular path to the alternate path comprises:
 selecting the alternate path from the plurality of other paths as the path to which the flow is to be moved.

31. The method of claim 30, wherein the alternate path is selected randomly.

32. The method of claim 30, wherein the alternate path is selected in a round-robin fashion.

33. The method of claim 1, wherein determining the congestion metric for the particular path comprises:
 determining at least one one-way latency value for the particular path which indicates how much time is needed for a set of information to travel from the first component to the second component along the particular path.

34. The method of claim 33, wherein determining at least one one-way latency value for the particular path comprises:
 (a) sending a latency request packet from the first component to the second component via the particular path, wherein the latency request packet comprises an initial timestamp provided by the first component;
 (b) receiving, by the first component, a latency response packet sent by the second component in response to the latency request packet, wherein the latency response packet comprises a timestamp provided by the second component; and
 (c) deriving a one-way latency value for the particular path based at least partially upon the initial timestamp and the timestamp provided by the second component.

35. The method of claim 34, wherein the set of one or more other paths consists of just the alternate path, so that determining the congestion metric for the set of one or more other paths comprises determining a congestion metric for the alternate path, and wherein determining the congestion metric for the alternate path comprises:
  determining at least one one-way latency value for the alternate path which indicates how much time is needed for a set of information to travel from the first component to the second component along the alternate path.

36. The method of claim 35, wherein determining at least one one-way latency value for the alternate path comprises:
  (d) sending another latency request packet from the first component to the second component via the alternate path, wherein the other latency request packet comprises another initial timestamp provided by the first component;
  (e) receiving, by the first component, another latency response packet sent by the second component in response to the other latency request packet, wherein the other latency response packet comprises another timestamp provided by the second component; and
  (f) deriving a one-way latency value for the alternate path based at least partially upon the other initial timestamp and the other timestamp provided by the second component.

37. The method of claim 34, wherein the set of one or more other paths comprises a plurality of other paths, including the alternate path, wherein determining the congestion metric for the set of one or more other paths comprises determining an aggregate congestion metric for the plurality of other paths, wherein the aggregate congestion metric reflects congestion across the plurality of other paths, and wherein determining the aggregate congestion metric for the plurality of other paths comprises:
  determining at least one one-way latency value for each of the plurality of other paths, which indicates how much time is needed for a set of information to travel from the first component to the second component along each of the plurality of other paths; and
  deriving an aggregate one-way latency value based upon the one-way latency value from each of the plurality of other paths.

38. The method of claim 34, wherein (a), (b), and (c) are repeated a plurality of times to derive a plurality of one-way latency values for the particular path.

39. The method of claim 38, wherein determining the congestion metric for the particular path further comprises:
  computing, based at least partially upon the plurality of one-way latency values for the particular path, a latency variation value which indicates variation in one-way latency values on the particular path.

40. The method of claim 39, wherein a source component is sending packets associated with the flow to the first component at a particular rate, and wherein the method further comprises:
  determining, based at least partially upon the congestion metric for the particular path, whether the particular path has reached a congestion threshold; and
  in response to a determination that the particular path has reached a congestion threshold, instructing the source component to limit the rate at which the source component is sending packets associated with the flow.

41. The method of claim 40, wherein instructing the source component comprises:
  providing information to the source component that can be used by the source component to identify the flow.

42. The method of claim 40, wherein the congestion threshold represents a congestion level at which packets sent along the particular path are likely to be dropped by one or more switches in the particular path.

43. The method of claim 40, wherein the method is performed by the first component, and wherein the first component is a border component which is situated at a border of the network, and which provides access to the network by one or more external components, such as the source component.

44. The method of claim 40, wherein the method is performed by the first component, and wherein the first component is a network interface which is situated at a border of the network.

45. The method of claim 38, wherein the first component receives packets associated with the flow from a source at a particular flow rate, wherein the first component sends a plurality of latency request packets to the second component, and wherein the first component sends the plurality of latency request packets to the second component at a rate which is proportional to the particular flow rate.

46. The method of claim 38, wherein the first component receives packets associated with the flow from a source, and wherein sending a latency request packet from the first component to the second component via the particular path comprises:
  determining whether a certain amount of information associated with the flow has been received by the first component since an information count was last cleared;
  in response to a determination that a certain amount of information associated with the flow has been received by the first component since the information count was last cleared, sending a latency request packet from the first component to the second component via the particular path; and
  clearing the information count.

47. The method of claim 1, wherein the first component has a first clock and the second component has a second clock, wherein the first and second clocks are not synchronized with each other, and wherein determining the congestion metric for the particular path comprises:
  determining a clock offset value that represents a difference in time values provided by the first clock and the second clock; and
  determining at least one one-way latency value for the particular path which indicates how much time is needed for a set of information to travel from the first component to the second component along the particular path, wherein the at least one one-way latency value is determined in such a manner that the clock offset value is taken into account.

48. The method of claim 47, wherein determining at least one one-way latency value for the particular path comprises:
  sending a latency request packet from the first component to the second component via the particular path, wherein the latency request packet comprises an initial timestamp provided by the first clock of the first component;
  receiving, by the first component, a latency response packet sent by the second component in response to the latency request packet, wherein the latency response packet comprises a timestamp provided by the second clock of the second component; and
  deriving a one-way latency value for the particular path based at least partially upon the initial timestamp, the timestamp provided by the second clock of the second component, and the clock offset value.

49. The method of claim 47, wherein determining the clock offset value comprises:

sending a latency request packet from the first component to the second component via the particular path, wherein the latency request packet comprises an initial timestamp provided by the first clock of the first component;

receiving, by the first component, a latency response packet sent by the second component in response to the latency request packet, wherein the latency response packet comprises a timestamp provided by the second clock of the second component;

obtaining a received timestamp from the first clock of the first component, wherein the received timestamp approximately indicates a time at which the latency response packet was received by the first component;

determining, based at least partially upon the initial timestamp and the received timestamp, a roundtrip latency value which indicates how much time is needed for a set of information to travel from the first component to the second component along the particular path and back to the first component;

determining whether the roundtrip latency value is less than a previously established minimum roundtrip latency value;

in response to a determination that the roundtrip latency value is less than the previously established minimum roundtrip latency value, deriving an estimated one-way latency value based upon the roundtrip latency value, wherein the estimated one-way latency value indicates how much time is estimated to be needed for a set of information to travel from the first component to the second component along the particular path; and computing the clock offset value based at least partially upon the initial timestamp, the timestamp provided by the second clock of the second component, and the estimated one-way latency value.

50. The method of claim 49, wherein determining the clock offset value further comprises:

in response to a determination that the roundtrip latency value is less than the previously established minimum roundtrip latency value, establishing the roundtrip latency value as the previously established minimum roundtrip latency value.

51. The method of claim 50, wherein determining the clock offset value further comprises:

periodically increasing the previously established minimum roundtrip latency value.

52. The method of claim 49, wherein determining the roundtrip latency value comprises:

determining a difference between the initial timestamp and the received timestamp.

53. The method of claim 52, wherein deriving the estimated one-way latency value comprises:

dividing the roundtrip latency value by two.

54. The method of claim 49, wherein the latency response packet comprises (a) an arrived timestamp provided by the second clock of the second component approximately indicating a time at which the latency request packet was received by the second component and (b) a return timestamp provided by the second clock of the second component approximately indicating a time at which the latency response packet was sent by the second component, and wherein determining the roundtrip latency value comprises:

determining a difference between the arrived timestamp and the initial timestamp to derive a first difference;

determining a difference between the received timestamp and the return timestamp to derive a second difference; and adding the first difference and the second difference to derive the roundtrip latency value.

55. The method of claim 54, wherein deriving the estimated one-way latency value comprises:

dividing the roundtrip latency value by two.

56. The method of claim 1, wherein determining the congestion metric for the particular path comprises:

determining at least one roundtrip latency value for the particular path which indicates how much time is needed for a set of information to travel from the first component to the second component along the particular path and back to the first component.

57. The method of claim 56, wherein determining at least one roundtrip latency value for the particular path comprises:

(a) sending a latency request packet from the first component to the second component via the particular path, wherein the latency request packet comprises an initial timestamp provided by the first component;

(b) receiving, by the first component, a latency response packet sent by the second component in response to the latency request packet;

(c) obtaining a received timestamp which approximately indicates a time at which the latency response packet was received by the first component; and (d) deriving a roundtrip latency value for the particular path based at least partially upon the initial timestamp and the received timestamp.

58. The method of claim 57, wherein the set of one or more other paths consists of just the alternate path, so that determining the congestion metric for the set of one or more other paths comprises determining a congestion metric for the alternate path, and wherein determining the congestion metric for the alternate path comprises:

determining at least one roundtrip latency value for the alternate path which indicates how much time is needed for a set of information to travel from the first component to the second component along the alternate path and back to the first component.

59. The method of claim 58, wherein determining at least one roundtrip latency value for the alternate path comprises:

(e) sending another latency request packet from the first component to the second component via the alternate path, wherein the other latency request packet comprises another initial timestamp provided by the first component;

(f) receiving, by the first component, another latency response packet sent by the second component in response to the other latency request packet;

(g) obtaining another received timestamp which approximately indicates a time at which the other latency response packet was received by the first component; and (h) deriving a roundtrip latency value for the other path based at least partially upon the other initial timestamp and the other received timestamp.

60. The method of claim 57, wherein the set of one or more other paths comprises a plurality of other paths, including the alternate path, wherein determining the congestion metric for the set of one or more other paths comprises determining an aggregate congestion metric for the plurality of other paths, wherein the aggregate congestion metric reflects congestion across the plurality of other paths, and wherein determining the aggregate congestion metric for the plurality of other paths comprises:

determining at least one roundtrip latency value for each of the plurality of other paths; and deriving an aggregate roundtrip latency value based upon the roundtrip latency value from each of the plurality of other paths.

61. The method of claim 57, wherein (a), (b), (c), and (d) are repeated a plurality of times to derive a plurality of roundtrip latency values for the particular path.

62. The method of claim 61, wherein determining the congestion metric for the particular path further comprises:

computing, based at least partially upon the plurality of roundtrip latency values for the particular path, a latency variation value which indicates variation in roundtrip latency values on the particular path.

63. The method of claim 61, wherein the first component receives packets associated with the flow from a source at a particular flow rate, wherein the first component sends a plurality of latency request packets to the second component, and wherein the first component sends the plurality of latency request packets to the second component at a rate which is proportional to the particular flow rate.

64. The method of claim 61, wherein the first component receives packets associated with the flow from a source, and wherein sending a latency request packet from the first component to the second component via the particular path comprises:

determining whether a certain amount of information associated with the flow has been received by the first component since an information count was last cleared;

in response to a determination that a certain amount of information associated with the flow has been received by the first component since the information count was last cleared, sending a latency request packet from the first component to the second component via the particular path; and clearing the information count.

65. The method of claim 1, wherein moving the flow from the particular path to the alternate path comprises:

sending a request packet from the first component to the second component via the particular path;

receiving, by the first component, a response packet sent by the second component in response to the request packet;

determining whether any packets associated with the flow were received by the first component between sending the request packet and receiving the response packet;

in response to a determination that no packets associated with the flow were received by the first component between sending the request packet and receiving the response packet, causing future packets associated with the flow to be forwarded from the first component to the second component via the alternate path instead of the particular path.

66. The method of claim 65, wherein moving the flow from the particular path to the alternate path further comprises:

receiving, by the first component, one or more intervening packets associated with the flow between sending the request packet and receiving the response packet; and forwarding the one or more intervening packets associated with the flow from the first component to the second component via the particular path.

67. The method of claim 65, wherein moving the flow from the particular path to the alternate path further comprises:

in response to a determination that one or more intervening packets associated with the flow were received by the first component between sending the request packet and receiving the response packet, sending another request packet from the first component to the second component via the particular path;

receiving, by the first component, another response packet sent by the second component in response to the other request packet;

determining whether any packets associated with the flow were received by the first component between sending the other request packet and receiving the other response packet;

in response to a determination that no packets associated with the flow were received by the first component between sending the other request packet and receiving the other response packet, causing future packets associated with the flow to be forwarded from the first component to the second component via the alternate path instead of the particular path.

68. The method of claim 65, wherein the flow has a corresponding flow data structure, wherein the flow data structure currently contains a path indicator indicating that the particular path is to be used for forwarding packets associated with the flow from the first component to the second component, and wherein causing future packets associated with the flow to be forwarded from the first component to the second component via the alternate path instead of the particular path comprises:

updating the path indicator in the flow data structure to indicate the alternate path instead of the particular path.

69. The method of claim 1, wherein determining the congestion metric for the particular path comprises:

sending, by the first component, a plurality of latency request packets to the second component via the particular path;

receiving, by the first component, a plurality of latency response packets sent by the second component in response to the plurality of latency request packets;

determining, based at least partially upon timestamp information contained in the plurality of latency response packets, an estimated latency between the first and the second components;

deriving a link failure timeout period based upon the estimated latency;

sending an additional latency request packet from the first component to the second component via the particular path;

determining that an additional latency response packet, which should be sent by the second component in response to the additional latency request packet, has not been received by the first component prior to expiration of the link failure timeout period; and in response to such a determination, concluding that a link failure has occurred.

70. The method of claim 69, wherein the estimated latency is an estimated one-way latency which indicates how much time is estimated to be required for a set of information to travel from the first component to the second component along the particular path.

71. The method of claim 69, wherein the estimated latency is an estimated roundtrip latency which indicates how much time is estimated to be required for a set of information to travel from the first component to the second component and back to the first component.

72. The method of claim 69, further comprising:

in response to concluding that a link failure has occurred, moving the flow from the particular path to the alternate path so that at least some future packets associated with the flow are forwarded from the first component to the second component via the alternate path instead of the particular path.

73. The method of claim 1, wherein a source component is sending packets associated with the flow to the first component at a particular rate, and wherein the method further comprises:
   determining, based at least partially upon the congestion metric for the particular path, whether the particular path has reached a congestion threshold; and in response to a determination that the particular path has reached a congestion threshold, instructing the source component to limit the rate at which the source component is sending packets associated with the flow.

74. The method of claim 73, wherein instructing the source component comprises:
   providing information to the source component that can be used by the source component to identify the flow.

75. The method of claim 73, wherein the congestion threshold represents a congestion level at which packets sent along the particular path are likely to be dropped by one or more switches in the particular path.

76. The method of claim 73, wherein the method is performed by the first component, and wherein the first component is a border component which is situated at a border of the network, and which provides access to the network by one or more external components, such as the source component.

77. The method of claim 73, wherein the method is performed by the first component, and wherein the first component is a network interface which is situated at a border of the network.

78. The method of claim 1, wherein said dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components comprises a network interface of the first component randomly selecting from among the plurality of possible paths.

79. The method of claim 1, wherein said dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components comprises a network interface of the first component selecting from among the plurality of possible paths in a round-robin fashion.

80. The method of claim 1, wherein said dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components comprises a network interface of the first component selecting from among the plurality of possible paths based upon current traffic conditions associated with the plurality of possible paths.

81. The method of claim 80, wherein said selecting from among the plurality of possible paths based upon current traffic conditions associated with the plurality of possible paths comprises selecting a path of the plurality of possible paths that is currently experiencing a lowest traffic load.

82. The method of claim 80, wherein said selecting from among the plurality of possible paths based upon current traffic conditions associated with the plurality of possible paths comprises selecting a path of the plurality of possible paths that has a highest available capacity for carrying traffic.

83. A method, comprising:
   dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components, the plurality of possible paths resulting a plurality of overlapping loop-free topologies having been established within the Layer 2 network in which each of the plurality of components is reachable by any other of the plurality of components via each of the plurality of overlapping loop-free topologies;
   forwarding the one or more initial packets associated with the flow from the first component to the second component via the particular path;
   determining that the flow should be moved from the particular path to another path in the Layer 2 network that couples the first component with the second component and which is associated with a second loop-free topology of the plurality of overlapping loop-free topologies;
   sending a request packet from the first component to the second component via the particular path;
   receiving, by the first component, a response packet sent by the second component in response to the request packet;
   determining whether any packets associated with the flow were received by the first component between sending the request packet and receiving the response packet; and
   in response to a determination that no packets associated with the flow were received by the first component between sending the request packet and receiving the response packet, moving the flow from the particular path to the other path so that future packets associated with the flow are forwarded from the first component to the second component via the other path instead of the particular path.

84. The method of claim 83, further comprising:
   receiving, by the first component, one or more intervening packets associated with the flow between sending the request packet and receiving the response packet; and
   forwarding the one or more intervening packets associated with the flow from the first component to the second component via the particular path.

85. The method of claim 83, further comprising:
   in response to a determination that one or more intervening packets associated with the flow were received by the first component between sending the request packet and receiving the response packet, sending another request packet from the first component to the second component via the particular path;
   receiving, by the first component, another response packet sent by the second component in response to the other request packet;
   determining whether any packets associated with the flow were received by the first component between sending the other request packet and receiving the other response packet;
   in response to a determination that no packets associated with the flow were received by the first component between sending the other request packet and receiving the other response packet, causing future packets associated with the flow to be forwarded from the first component to the second component via the other path instead of the particular path.

86. The method of claim 83, wherein the flow has a corresponding flow data structure, wherein the flow data structure currently contains a path indicator indicating that the particular path is to be used for forwarding packets associated with the flow from the first component to the second component, and wherein moving the flow from the particular path to the other path comprises:
updating the path indicator in the flow data structure to indicate the other path instead of the particular path.

87. The method of claim 83, wherein the network comprises a plurality of virtual networks including a particular virtual network that provides the particular path between the first component and the second component, and another virtual network that provides the other path between the first component and the second component, and wherein moving the flow from the particular path to the other path comprises:
moving the flow from the particular virtual network to the other virtual network.

88. The method of claim 87, wherein each of the particular virtual network and the other virtual network is a loop-free, reverse path learning network.

89. The method of claim 87, wherein the flow has a corresponding flow data structure, wherein the flow data structure currently contains a virtual network indicator indicating that the particular virtual network is to be used for forwarding packets associated with the flow from the first component to the second component, and wherein moving the flow from the particular virtual network to the other virtual network comprises:
updating the virtual network indicator in the flow data structure to indicate the other virtual network instead of the particular virtual network.

90. The method of claim 83, wherein said dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components comprises a network interface of the first component randomly selecting from among the plurality of possible paths.

91. The method of claim 83, wherein said dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components comprises a network interface of the first component selecting from among the plurality of possible paths in a round-robin fashion.

92. The method of claim 83, wherein said dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components comprises a network interface of the first component selecting from among the plurality of possible paths based upon current traffic conditions associated with the plurality of possible paths.

93. The method of claim 92, wherein said selecting from among the plurality of possible paths based upon current traffic conditions associated with the plurality of possible paths comprises selecting a path of the plurality of possible paths that is currently experiencing a lowest traffic load.

94. The method of claim 92, wherein said selecting from among the plurality of possible paths based upon current traffic conditions associated with the plurality of possible paths comprises selecting a path of the plurality of possible paths that has a highest available capacity for carrying traffic.

95. An apparatus for implementing dynamic load balancing, comprising:
means for dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components, the plurality of possible paths resulting a plurality of overlapping loop-free topologies having been established within the Layer 2 network in which each of the plurality of components is reachable by any other of the plurality of components via each of the plurality of overlapping loop-free topologies;
means for forwarding the one or more initial packets associated with the flow from the first component to the second component via the particular path, wherein the particular path is one of the plurality of possible paths in the Layer 2 network between the first component and the second component;
means for determining a congestion metric for the particular path;
means for determining a congestion metric for a set of one or more other paths, wherein the set of one or more other paths comprise a subset of the plurality of possible paths between the first component and the second component;
means for determining, based at least partially upon the congestion metric for the particular path and the congestion metric for the set of one or more other paths, whether the flow should be moved; and
means for moving, in response to a determination that the flow should be moved, the flow from the particular path to an alternate path in the Layer 2 network associated with a second loop-free topology of the plurality of overlapping loop-free topologies such that at least some future packets associated with the flow are forwarded from the first component to the second component via the alternate path instead of the particular path, wherein the alternate path is a path in the set of one or more other paths.

96. The apparatus of claim 95, wherein the congestion metric for the particular path is determined mid-flow such that the congestion metric for the particular path is determined while packets associated with the flow are still being forwarded from the first component to the second component.

97. The apparatus of claim 96, wherein the congestion metric for the set of one or more other paths is determined mid-flow such that the congestion metric for the set of one or more other paths is determined while packets associated with the flow are still being forwarded from the first component to the second component.

98. The apparatus of claim 95, wherein the network comprises a plurality of virtual networks including a particular virtual network that provides the particular path between the first component and the second component, and another virtual network that provides the alternate path between the first component and the second component, and wherein the means for moving the flow from the particular path to the alternate path comprises:

means for moving the flow from the particular virtual network to the other virtual network.

99. The apparatus of claim 98, wherein each of the particular virtual network and the other virtual network is a loop-free, reverse path learning network.

100. The apparatus of claim 98, wherein the flow has a corresponding flow data structure, wherein the flow data structure contains a virtual network indicator that currently indicates that the particular virtual network is to be used for forwarding packets associated with the flow from the first component to the second component, and wherein the means for moving the flow from the particular virtual network to the other virtual network comprises:

means for updating the virtual network indicator in the flow data structure to indicate the other virtual network instead of the particular virtual network.

101. The apparatus of claim 95, wherein the set of one or more other paths consists of just the alternate path, so that the means for determining the congestion metric for the set of one or more other paths comprises means for determining a congestion metric for the alternate path.

102. The apparatus of claim 101, wherein the congestion metric for the particular path comprises a latency component which includes a one-way latency value for the particular path which indicates how much time is needed for a set of information to travel from the first component to the second component along the particular path, and wherein the congestion metric for the alternate path comprises a latency component which includes a one-way latency value for the alternate path which indicates how much time is needed for a set of information to travel from the first component to the second component along the alternate path.

103. The apparatus of claim 102, wherein the congestion metric for the particular path further comprises a latency variation component which indicates variation in one-way latency values on the particular path, and wherein the congestion metric for the alternate path further comprises a latency variation component which indicates variation in one-way latency values on the alternate path.

104. The apparatus of claim 101, wherein the congestion metric for the particular path comprises a latency component which includes a roundtrip latency value for the particular path which indicates how much time is needed for a set of information to travel from the first component to the second component along the particular path and back to the first component, and wherein the congestion metric for the alternate path comprises a latency component which includes a roundtrip latency value for the alternate path which indicates how much time is needed for a set of information to travel from the first component to the second component along the alternate path and back to the first component.

105. The apparatus of claim 104, wherein the congestion metric for the particular path further comprises a latency variation component which indicates variation in roundtrip latency values on the particular path, and wherein the congestion metric for the alternate path further comprises a latency variation component which indicates variation in roundtrip latency values on the alternate path.

106. The apparatus of claim 101, wherein the means for determining whether the flow should be moved comprises:

means for computing an imbalance metric based at least partially upon the congestion metric for the particular path and the congestion metric for the alternate path, wherein the imbalance metric indicates a degree of load imbalance between the particular path and the alternate path.

107. The apparatus of claim 106, wherein the means for determining whether the flow should be moved further comprises:

means for determining whether the imbalance metric exceeds a threshold.

108. The apparatus of claim 106, wherein the congestion metric for the particular path comprises a latency component which includes a one-way latency value for the particular path which indicates how much time is needed for a set of information to travel from the first component to the second component along the particular path, and wherein the congestion metric for the alternate path comprises a latency component which includes a one-way latency value for the alternate path which indicates how much time is needed for a set of information to travel from the first component to the second component along the alternate path.

109. The apparatus of claim 108, wherein the congestion metric for the particular path further comprises a latency variation component which indicates variation in one-way latency values on the particular path, and wherein the congestion metric for the alternate path further comprises a latency variation component which indicates variation in one-way latency values on the alternate path.

110. The apparatus of claim 106, wherein the congestion metric for the particular path comprises a latency component which includes a roundtrip latency value for the particular path which indicates how much time is needed for a set of information to travel from the first component to the second component along the particular path and back to the first component, and wherein the congestion metric for the alternate path comprises a latency component which includes a roundtrip latency value for the alternate path which indicates how much time is needed for a set of information to travel from the first component to the second component along the alternate path and back to the first component.

111. The apparatus of claim 110, wherein the congestion metric for the particular path further comprises a latency variation component which indicates variation in roundtrip latency values on the particular path, and wherein the congestion metric for the alternate path further comprises a latency variation component which indicates variation in roundtrip latency values on the alternate path.

112. The apparatus of claim 95, wherein the set of one or more other paths comprises a plurality of other paths, including the alternate path, and wherein the means for determining the congestion metric for the set of one or more other paths comprises means for determining an aggregate congestion metric for the plurality of other paths, wherein the aggregate congestion metric reflects congestion across the plurality of other paths.

113. The apparatus of claim 112, wherein the aggregate congestion metric reflects an average congestion across the plurality of other paths.

114. The apparatus of claim 112, wherein the congestion metric for the particular path comprises a latency component which includes a one-way latency value for the particular path which indicates how much time is needed for a set of information to travel from the first component to the second component along the particular path, and wherein the aggregate congestion metric comprises a latency component which includes an aggregate one-way latency value for the plurality of other paths, wherein the aggregate one-way latency value is derived from one-way latency values from each of the plurality of other paths.

115. The apparatus of claim 114, wherein the congestion metric for the particular path further comprises a latency variation component which indicates variation in one-way latency values on the particular path, and wherein the aggregate congestion metric further comprises a latency variation component which indicates variation in aggregate one-way latency values for the plurality of other paths.

116. The apparatus of claim 112, wherein the congestion metric for the particular path comprises a latency component which includes a roundtrip latency value for the particular path which indicates how much time is needed for a set of information to travel from the first component to the second component along the particular path and back to the first component, and wherein the aggregate congestion metric comprises a latency component which includes an aggregate roundtrip latency value for the plurality of other paths, wherein the aggregate roundtrip latency value is derived from roundtrip latency values from each of the plurality of other paths.

117. The apparatus of claim 116, wherein the congestion metric for the particular path further comprises a latency variation component which indicates variation in roundtrip latency values on the particular path, and wherein the aggregate congestion metric further comprises a latency variation component which indicates variation in aggregate roundtrip latency values for the plurality of other paths.

118. The apparatus of claim 112, wherein the means for determining whether the flow should be moved comprises:
means for computing an imbalance metric based at least partially upon the congestion metric for the particular path and the aggregate congestion metric for the plurality of other paths, wherein the imbalance metric indicates a degree of load imbalance between the particular path and the plurality of other paths.

119. The apparatus of claim 118, wherein the means for determining whether the flow should be moved further comprises:
means for determining whether the imbalance metric exceeds a threshold.

120. The apparatus of claim 118, wherein the congestion metric for the particular path comprises a latency component which includes a one-way latency value for the particular path which indicates how much time is needed for a set of information to travel from the first component to the second component along the particular path, and wherein the aggregate congestion metric comprises a latency component which includes an aggregate one-way latency value for the plurality of other paths, wherein the aggregate one-way latency value is derived from one-way latency values from each of the plurality of other paths.

121. The apparatus of claim 120, wherein the congestion metric for the particular path further comprises a latency variation component which indicates variation in one-way latency values on the particular path, and wherein the aggregate congestion metric further comprises a latency variation component which indicates variation in aggregate one-way latency values for the plurality of other paths.

122. The apparatus of claim 118, wherein the congestion metric for the particular path comprises a latency component which includes a roundtrip latency value for the particular path which indicates how much time is needed for a set of information to travel from the first component to the second component along the particular path and back to the first component, and wherein the aggregate congestion metric comprises a latency component which includes an aggregate roundtrip latency value for the plurality of other paths, wherein the aggregate roundtrip latency value is derived from roundtrip latency values from each of the plurality of other paths.

123. The apparatus of claim 122, wherein the congestion metric for the particular path further comprises a latency variation component which indicates variation in roundtrip latency values on the particular path, and wherein the aggregate congestion metric further comprises a latency variation component which indicates variation in aggregate roundtrip latency values for the plurality of other paths.

124. The apparatus of claim 112, wherein the means for moving the flow from the particular path to the alternate path comprises:
means for selecting the alternate path from the plurality of other paths as the path to which the flow is to be moved.

125. The apparatus of claim 124, wherein the alternate path is selected randomly.

126. The apparatus of claim 124, wherein the alternate path is selected in a round-robin fashion.

127. The apparatus of claim 95, wherein the means for determining the congestion metric for the particular path comprises:
means for determining at least one one-way latency value for the particular path which indicates how much time is needed for a set of information to travel from the first component to the second component along the particular path.

128. The apparatus of claim 127, wherein the means for determining at least one one-way latency value for the particular path comprises:
means for sending a latency request packet from the first component to the second component via the particular path, wherein the latency request packet comprises an initial timestamp provided by the first component;
means for receiving a latency response packet sent by the second component in response to the latency request packet, wherein the latency response packet comprises a timestamp provided by the second component; and
means for deriving a one-way latency value for the particular path based at least partially upon the initial timestamp and the timestamp provided by the second component.

129. The apparatus of claim 128, wherein the set of one or more other paths consists of just the alternate path, so that the means for determining the congestion metric for the set of one or more other paths comprises means for determining a congestion metric for the alternate path, and wherein the means for determining the congestion metric for the alternate path comprises:
means for determining at least one one-way latency value for the alternate path which indicates how much time is needed for a set of information to travel from the first component to the second component along the alternate path.

130. The apparatus of claim 129, wherein the means for determining at least one one-way latency value for the alternate path comprises:
means for sending another latency request packet from the first component to the second component via the alternate path, wherein the other latency request packet comprises another initial timestamp provided by the first component;
means for receiving another latency response packet sent by the second component in response to the other latency request packet, wherein the other latency response packet comprises another timestamp provided by the second component; and means for deriving a one-way latency value for the alternate path based at least partially upon the other initial timestamp and the other timestamp provided by the second component.

131. The apparatus of claim 128, wherein the set of one or more other paths comprises a plurality of other paths, including the alternate path, wherein the means for determining the congestion metric for the set of one or more other paths comprises means for determining an aggregate congestion metric for the plurality of other paths, wherein the aggregate congestion metric reflects congestion across the plurality of other paths, and wherein the means for determining the aggregate congestion metric for the plurality of other paths comprises:
 means for determining at least one one-way latency value for each of the plurality of other paths, which indicates how much time is needed for a set of information to travel from the first component to the second component along each of the plurality of other paths; and
 means for deriving an aggregate one-way latency value based upon the one-way latency value from each of the plurality of other paths.

132. The apparatus of claim 128, wherein the means for determining at least one one-way latency value for the particular path determines a plurality of one-way latency values for the particular path.

133. The apparatus of claim 132, wherein the means for determining the congestion metric for the particular path further comprises:
 means for computing, based at least partially upon the plurality of one-way latency values for the particular path, a latency variation value which indicates variation in one-way latency values on the particular path.

134. The apparatus of claim 133, wherein the apparatus is at least a part of the first component, wherein a source component is sending packets associated with the flow to the first component at a particular rate, and wherein the apparatus further comprises:
 means for determining, based at least partially upon the congestion metric for the particular path, whether the particular path has reached a congestion threshold; and
 means for instructing, in response to a determination that the particular path has reached a congestion threshold, the source component to limit the rate at which the source component is sending packets associated with the flow.

135. The apparatus of claim 134, wherein the means for instructing the source component comprises:
 means for providing information to the source component that can be used by the source component to identify the flow.

136. The apparatus of claim 134, wherein the congestion threshold represents a congestion level at which packets sent along the particular path are likely to be dropped by one or more switches in the particular path.

137. The apparatus of claim 134, wherein the first component is a border component which is situated at a border of the network and provides access to the network by one or more external components, such as the source component.

138. The apparatus of claim 134, wherein the first component is a network interface which is situated at a border of the network.

139. The apparatus of claim 132, wherein the apparatus is at least a part of the first component, wherein the first component receives packets associated with the flow from a source at a particular flow rate, wherein the apparatus sends a plurality of latency request packets to the second component, and wherein the apparatus sends the plurality of latency request packets to the second component at a rate which is proportional to the particular flow rate.

140. The apparatus of claim 132, wherein the apparatus is at least a part of the first component, wherein the first component receives packets associated with the flow from a source, and wherein the means for sending a latency request packet from the first component to the second component via the particular path comprises:
 means for determining whether a certain amount of information associated with the flow has been received by the first component since an information count was last cleared;
 means for sending, in response to a determination that a certain amount of information associated with the flow has been received by the first component since the information count was last cleared, a latency request packet from the first component to the second component via the particular path; and
 means for clearing the information count.

141. The apparatus of claim 95, wherein the first component has a first clock and the second component has a second clock, wherein the first and second clocks are not synchronized with each other, and wherein the means for determining the congestion metric for the particular path comprises:
 means for determining a clock offset value that represents a difference in time values provided by the first clock and the second clock; and
 means for determining at least one one-way latency value for the particular path which indicates how much time is needed for a set of information to travel from the first component to the second component along the particular path, wherein the at least one one-way latency value is determined in such a manner that the clock offset value is taken into account.

142. The apparatus of claim 141, wherein the means for determining at least one one-way latency value for the particular path comprises:
 means for sending a latency request packet from the first component to the second component via the particular path, wherein the latency request packet comprises an initial timestamp provided by the first clock of the first component;
 means for receiving a latency response packet sent by the second component in response to the latency request packet, wherein the latency response packet comprises a timestamp provided by the second clock of the second component; and
 means for deriving a one-way latency value for the particular path based at least partially upon the initial timestamp, the timestamp provided by the second clock of the second component, and the clock offset value.

143. The apparatus of claim 141, wherein the means for determining the clock offset value comprises:
 means for sending a latency request packet from the first component to the second component via the particular path, wherein the latency request packet comprises an initial timestamp provided by the first clock of the first component;
 means for receiving a latency response packet sent by the second component in response to the latency request packet, wherein the latency response packet comprises a timestamp provided by the second clock of the second component;
 means for obtaining a received timestamp from the first clock of the first component, wherein the received timestamp approximately indicates a time at which the latency response packet was received by the first component;

means for determining, based at least partially upon the initial timestamp and the received timestamp, a roundtrip latency value which indicates how much time is needed for a set of information to travel from the first component to the second component along the particular path and back to the first component;

means for determining whether the roundtrip latency value is less than a previously established minimum roundtrip latency value;

means for deriving, in response to a determination that the roundtrip latency value is less than the previously established minimum roundtrip latency value, an estimated one-way latency value based upon the roundtrip latency value, wherein the estimated one-way latency value indicates how much time is estimated to be needed for a set of information to travel from the first component to the second component along the particular path; and means for computing the clock offset value based at least partially upon the initial timestamp, the timestamp provided by the second clock of the second component, and the estimated one-way latency value.

144. The apparatus of claim 143, wherein the means for determining the clock offset value further comprises:

means for establishing, in response to a determination that the roundtrip latency value is less than the previously established minimum roundtrip latency value, the roundtrip latency value as the previously established minimum roundtrip latency value.

145. The apparatus of claim 144, wherein the means for determining the clock offset value further comprises:

means for periodically increasing the previously established minimum roundtrip latency value.

146. The apparatus of claim 143, wherein the means for determining the roundtrip latency value comprises:

means for determining a difference between the initial timestamp and the received timestamp.

147. The apparatus of claim 146, wherein the means for deriving the estimated one-way latency value comprises:

means for dividing the roundtrip latency value by two.

148. The apparatus of claim 143, wherein the latency response packet comprises (a) an arrived timestamp provided by the second clock of the second component approximately indicating a time at which the latency request packet was received by the second component and (b) a return timestamp provided by the second clock of the second component approximately indicating a time at which the latency response packet was sent by the second component, and wherein the means for determining the roundtrip latency value comprises:

means for determining a difference between the arrived timestamp and the initial timestamp to derive a first difference;

means for determining a difference between the received timestamp and the return timestamp to derive a second difference; and means for adding the first difference and the second difference to derive the roundtrip latency value.

149. The apparatus of claim 148, wherein the means for deriving the estimated one-way latency value comprises:

means for dividing the roundtrip latency value by two.

150. The apparatus of claim 95, wherein the means for determining the congestion metric for the particular path comprises:

means for determining at least one roundtrip latency value for the particular path which indicates how much time is needed for a set of information to travel from the first component to the second component along the particular path and back to the first component.

151. The apparatus of claim 150, wherein the means for determining at least one roundtrip latency value for the particular path comprises:

means for sending a latency request packet from the first component to the second component via the particular path, wherein the latency request packet comprises an initial timestamp provided by the first component;

means for receiving a latency response packet sent by the second component in response to the latency request packet;

means for obtaining a received timestamp which approximately indicates a time at which the latency response packet was received by the first component; and means for deriving a roundtrip latency value for the particular path based at least partially upon the initial timestamp and the received timestamp.

152. The apparatus of claim 151, wherein the set of one or more other paths consists of just the alternate path, so that the means for determining the congestion metric for the set of one or more other paths comprises means for determining a congestion metric for the alternate path, and wherein the means for determining the congestion metric for the alternate path comprises:

means for determining at least one roundtrip latency value for the alternate path which indicates how much time is needed for a set of information to travel from the first component to the second component along the alternate path and back to the first component.

153. The apparatus of claim 152, wherein the means for determining at least one roundtrip latency value for the alternate path comprises:

means for sending another latency request packet from the first component to the second component via the alternate path, wherein the other latency request packet comprises another initial timestamp provided by the first component;

means for receiving another latency response packet sent by the second component in response to the other latency request packet;

means for obtaining another received timestamp which approximately indicates a time at which the other latency response packet was received by the first component; and means for deriving a roundtrip latency value for the other path based at least partially upon the other initial timestamp and the other received timestamp.

154. The apparatus of claim 151, wherein the set of one or more other paths comprises a plurality of other paths, including the alternate path, wherein the means for determining the congestion metric for the set of one or more other paths comprises means for determining an aggregate congestion metric for the plurality of other paths, wherein the aggregate congestion metric reflects congestion across the plurality of other paths, and wherein the means for determining the aggregate congestion metric for the plurality of other paths comprises:

means for determining at least one roundtrip latency value for each of the plurality of other paths; and means for deriving an aggregate roundtrip latency value based upon the roundtrip latency value from each of the plurality of other paths.

155. The apparatus of claim 151, wherein the means for determining at least one roundtrip latency value for the particular path determines a plurality of roundtrip latency values for the particular path.

156. The apparatus of claim 155, wherein the means for determining the congestion metric for the particular path further comprises:
means for computing, based at least partially upon the plurality of roundtrip latency values for the particular path, a latency variation value which indicates variation in roundtrip latency values on the particular path.

157. The apparatus of claim 155, wherein the apparatus is at least a part of the first component, wherein the first component receives packets associated with the flow from a source at a particular flow rate, wherein the apparatus sends a plurality of latency request packets to the second component, and wherein the apparatus sends the plurality of latency request packets to the second component at a rate which is proportional to the particular flow rate.

158. The apparatus of claim 155, wherein the apparatus is at least a part of the first component, wherein the first component receives packets associated with the flow from a source, and wherein the means for sending a latency request packet from the first component to the second component via the particular path comprises:
means for determining whether a certain amount of information associated with the flow has been received by the first component since an information count was last cleared;
means for sending, in response to a determination that a certain amount of information associated with the flow has been received by the first component since the information count was last cleared, a latency request packet from the first component to the second component via the particular path; and
means for clearing the information count.

159. The apparatus of claim 95, wherein the means for moving the flow from the particular path to the alternate path comprises:
means for sending a request packet from the first component to the second component via the particular path;
means for receiving a response packet sent by the second component in response to the request packet;
means for determining whether any packets associated with the flow were received by the first component between sending the request packet and receiving the response packet; and
means for causing, in response to a determination that no packets associated with the flow were received by the first component between sending the request packet and receiving the response packet, future packets associated with the flow to be forwarded from the first component to the second component via the alternate path instead of the particular path.

160. The apparatus of claim 159, wherein the apparatus is at least a part of the first component, and wherein the means for moving the flow from the particular path to the alternate path further comprises:
means for receiving one or more intervening packets associated with the flow between sending the request packet and receiving the response packet; and
means for forwarding the one or more intervening packets associated with the flow from the first component to the second component via the particular path.

161. The apparatus of claim 159, wherein the means for moving the flow from the particular path to the alternate path further comprises:

means for sending, in response to a determination that one or more intervening packets associated with the flow were received by the first component between sending the request packet and receiving the response packet, another request packet from the first component to the second component via the particular path;
means for receiving another response packet sent by the second component in response to the other request packet;
means for determining whether any packets associated with the flow were received by the first component between sending the other request packet and receiving the other response packet; and
means for causing, in response to a determination that no packets associated with the flow were received by the first component between sending the other request packet and receiving the other response packet, future packets associated with the flow to be forwarded from the first component to the second component via the alternate path instead of the particular path.

162. The apparatus of claim 159, wherein the flow has a corresponding flow data structure, wherein the flow data structure currently contains a path indicator indicating that the particular path is to be used for forwarding packets associated with the flow from the first component to the second component, and wherein the means for causing future packets associated with the flow to be forwarded from the first component to the second component via the alternate path instead of the particular path comprises:
means for updating the path indicator in the flow data structure to indicate the alternate path instead of the particular path.

163. The apparatus of claim 95, wherein the means for determining the congestion metric for the particular path comprises:
means for sending a plurality of latency request packets to the second component via the particular path;
means for receiving a plurality of latency response packets sent by the second component in response to the plurality of latency request packets;
means for determining, based at least partially upon timestamp information contained in the plurality of latency response packets, an estimated latency between the first and the second components;
means for deriving a link failure timeout period based upon the estimated latency;
means for sending an additional latency request packet from the first component to the second component via the particular path;
means for determining that an additional latency response packet, which should be sent by the second component in response to the additional latency request packet, has not been received prior to expiration of the link failure timeout period; and
means for concluding, in response to such a determination, that a link failure has occurred.

164. The apparatus of claim 163, wherein the estimated latency is an estimated one-way latency which indicates how much time is estimated to be required for a set of information to travel from the first component to the second component along the particular path.

165. The apparatus of claim 163, wherein the estimated latency is an estimated roundtrip latency which indicates how much time is estimated to be required for a set of information to travel from the first component to the second component and back to the first component.

166. The apparatus of claim 163, further comprising: means for moving, in response to concluding that a link failure has occurred, the flow from the particular path to the alternate path so that at least some future packets associated with the flow are forwarded from the first component to the second component via the alternate path instead of the particular path.

167. The apparatus of claim 95, wherein a source component is sending packets associated with the flow to the first component at a particular rate, and wherein the apparatus further comprises:
means for determining, based at least partially upon the congestion metric for the particular path, whether the particular path has reached a congestion threshold; and
means for instructing, in response to a determination that the particular path has reached a congestion threshold, the source component to limit the rate at which the source component is sending packets associated with the flow.

168. The apparatus of claim 167, wherein the means for instructing the source component comprises:
means for providing information to the source component that can be used by the source component to identify the flow.

169. The apparatus of claim 167, wherein the congestion threshold represents a congestion level at which packets sent along the particular path are likely to be dropped by one or more switches in the particular path.

170. The apparatus of claim 167, wherein the apparatus is at least a part of the first component, and wherein the first component is a border component which is situated at a border of the network and provides access to the network by one or more external components, such as the source component.

171. The apparatus of claim 167, wherein the apparatus is at least a part of the first component, and wherein the first component is a network interface which is situated at a border of the network.

172. The apparatus of claim 95, wherein said means for dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components comprises a network interface configured to randomly select from among the plurality of possible paths.

173. The apparatus of claim 95, wherein said means for dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components comprises a network interface configured to select from among the plurality of possible paths in a round-robin fashion.

174. The apparatus of claim 95, wherein said means for dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components comprises a network interface configured to select from among the plurality of possible paths based upon current traffic conditions associated with the plurality of possible paths.

175. The apparatus of claim 174, wherein the network interface selects from among the plurality of possible paths based upon current traffic conditions associated with the plurality of possible paths comprises selecting a path of the plurality of possible paths that is currently experiencing a lowest traffic load.

176. The apparatus of claim 174, wherein the network interface selects from among the plurality of possible paths based upon current traffic conditions associated with the plurality of possible paths comprises selecting a path of the plurality of possible paths that has a highest available capacity for carrying traffic.

177. The apparatus of claim 95, wherein said means for dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components comprises a multi-path load balancing (MPLB) component configured to randomly select from among the plurality of possible paths.

178. The apparatus of claim 95, wherein said means for dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components comprises a multi-path load balancing (MPLB) component configured to select from among the plurality of possible paths in a round-robin fashion.

179. The apparatus of claim 95, wherein said means for dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components comprises a multi-path load balancing (MPLB) component configured to select from among the plurality of possible paths based upon current traffic conditions associated with the plurality of possible paths.

180. The apparatus of claim 179, wherein the MPLB component selects from among the plurality of possible paths based upon current traffic conditions associated with the plurality of possible paths comprises selecting a path of the plurality of possible paths that is currently experiencing a lowest traffic load.

181. The apparatus of claim 179, wherein the MPLB component selects from among the plurality of possible paths based upon current traffic conditions associated with the plurality of possible paths comprises selecting a path of the plurality of possible paths that has a highest available capacity for carrying traffic.

182. An apparatus, comprising:
means for dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components, the plurality of possible paths resulting from a plurality of overlapping loop-free topologies having been established within the Layer 2 network in which each of the plurality of components is reachable by any other of the plurality of components via each of the plurality of overlapping loop-free topologies;

means for forwarding the one or more initial packets associated with the flow from the first component to the second component via the particular path;

means for determining that the flow should be moved from the particular path to another path in the Layer 2 network that couples the first component with the second component and which is associated with a second loop-free topology of the plurality of overlapping loop-free topologies;

means for sending a request packet from the first component to the second component via the particular path;

means for receiving a response packet sent by the second component in response to the request packet;

means for determining whether any packets associated with the flow were received by the first component between sending the request packet and receiving the response packet; and means for moving, in response to a determination that no packets associated with the flow were received by the first component between sending the request packet and receiving the response packet, the flow from the particular path to the other path so that future packets associated with the flow are forwarded from the first component to the second component via the other path instead of the particular path.

183. The apparatus of claim 182, wherein the apparatus is at least a part of the first component, and wherein the apparatus further comprises:

means for receiving one or more intervening packets associated with the flow between sending the request packet and receiving the response packet; and means for forwarding the one or more intervening packets associated with the flow from the first component to the second component via the particular path.

184. The apparatus of claim 182, further comprising:

means for sending, in response to a determination that one or more intervening packets associated with the flow were received by the first component between sending the request packet and receiving the response packet, another request packet from the first component to the second component via the particular path;

means for receiving another response packet sent by the second component in response to the other request packet;

means for determining whether any packets associated with the flow were received by the first component between sending the other request packet and receiving the other response packet; and means for causing, in response to a determination that no packets associated with the flow were received by the first component between sending the other request packet and receiving the other response packet, future packets associated with the flow to be forwarded from the first component to the second component via the other path instead of the particular path.

185. The apparatus of claim 182, wherein the flow has a corresponding flow data structure, wherein the flow data structure currently contains a path indicator indicating that the particular path is to be used for forwarding packets associated with the flow from the first component to the second component, and wherein the means for moving the flow from the particular path to the other path comprises:

means for updating the path indicator in the flow data structure to indicate the other path instead of the particular path.

186. The apparatus of claim 182, wherein the network comprises a plurality of virtual networks including a particular virtual network that provides the particular path between the first component and the second component, and another virtual network that provides the other path between the first component and the second component, and wherein the means for moving the flow from the particular path to the other path comprises:

means for moving the flow from the particular virtual network to the other virtual network.

187. The apparatus of claim 186, wherein each of the particular virtual network and the other virtual network is a loop-free, reverse path learning network.

188. The apparatus of claim 186, wherein the flow has a corresponding flow data structure, wherein the flow data structure currently contains a virtual network indicator indicating that the particular virtual network is to be used for forwarding packets associated with the flow from the first component to the second component, and wherein the means for moving the flow from the particular virtual network to the other virtual network comprises:

means for updating the virtual network indicator in the flow data structure to indicate the other virtual network instead of the particular virtual network.

189. The apparatus of claim 182, wherein said means for dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components comprises a network interface configured to randomly select from among the plurality of possible paths.

190. The apparatus of claim 182, wherein said means for dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components comprises a network interface configured to select from among the plurality of possible paths in a round-robin fashion.

191. The apparatus of claim 182, wherein said means for dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components comprises a network interface configured to select from among the plurality of possible paths based upon current traffic conditions associated with the plurality of possible paths.

192. The apparatus of claim 191, wherein the network interface selects from among the plurality of possible paths based upon current traffic conditions associated with the plurality of possible paths comprises selecting a path of the plurality of possible paths that is currently experiencing a lowest traffic load.

193. The apparatus of claim 191, wherein the network interface selects from among the plurality of possible paths based upon current traffic conditions associated with the plurality of possible paths comprises selecting a path of the plurality of possible paths that has a highest available capacity for carrying traffic.

194. The apparatus of claim 182, wherein said means for dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components comprises a multi-path load balancing (MPLB) component configured to randomly select from among the plurality of possible paths.

195. The apparatus of claim 182, wherein said means for dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components comprises a multi-path load balancing (MPLB) component configured to select from among the plurality of possible paths in a round-robin fashion.

196. The apparatus of claim 182, wherein said means for dynamically selecting, by a first component of a plurality of components within a Layer 2 network, a particular path in the Layer 2 network from among a plurality of possible paths between each pair of components of the plurality of components over which to send one or more initial packets associated with a flow from the first component to a second component of the plurality of components comprises a multi-path load balancing (MPLB) component configured to select from among the plurality of possible paths based upon current traffic conditions associated with the plurality of possible paths.

197. The apparatus of claim 196, wherein the MPLB component selects from among the plurality of possible paths based upon current traffic conditions associated with the plurality of possible paths comprises selecting a path of the plurality of possible paths that is currently experiencing a lowest traffic load.

198. The apparatus of claim 196, wherein the MPLB component selects from among the plurality of possible paths based upon current traffic conditions associated with the plurality of possible paths comprises selecting a path of the plurality of possible paths that has a highest available capacity for carrying traffic.

\* \* \* \* \*

UNITED STATES PATENT AND TRADEMARK OFFICE
CERTIFICATE OF CORRECTION

| | |
|---|---|
| PATENT NO. | : 8,223,634 B2 |
| APPLICATION NO. | : 11/732601 |
| DATED | : July 17, 2012 |
| INVENTOR(S) | : Bert H. Tanaka et al. |

It is certified that error appears in the above-identified patent and that said Letters Patent is hereby corrected as shown below:

Claim 1:

Column 46, Line 55, insert --from-- after "resulting"

Claim 83:

Column 58, Line 14, insert --from-- after "resulting"

Claim 95:

Column 60, Line 21, insert --from-- after "resulting"

Signed and Sealed this

Fourteenth Day of August, 2012

David J. Kappos
*Director of the United States Patent and Trademark Office*